US009483157B2

(12) United States Patent
Leacock et al.

(10) Patent No.: US 9,483,157 B2
(45) Date of Patent: Nov. 1, 2016

(54) INTERFACING WITH A SPATIAL VIRTUAL COMMUNICATION ENVIRONMENT

(71) Applicant: Social Communications Company, Eugene, OR (US)

(72) Inventors: Matthew Leacock, Sunnyvale, CA (US); David Van Wie, Eugene, OR (US); Paul J. Brody, Palo Alto, CA (US)

(73) Assignee: Sococo, Inc., Eugene, OR (US)

( * ) Notice: Subject to any disclaimer, the term of this patent is extended or adjusted under 35 U.S.C. 154(b) by 804 days.

(21) Appl. No.: 13/666,717

(22) Filed: Nov. 1, 2012

(65) Prior Publication Data

US 2013/0100142 A1   Apr. 25, 2013

Related U.S. Application Data

(63) Continuation of application No. 12/354,709, filed on Jan. 15, 2009, now Pat. No. 8,397,168.

(60) Provisional application No. 61/042,714, filed on Apr. 5, 2008.

(51) Int. Cl.
*G06F 3/0481* (2013.01)
*H04L 12/18* (2006.01)
(Continued)

(52) U.S. Cl.
CPC ............ *G06F 3/04815* (2013.01); *G06T 13/80* (2013.01); *H04L 12/1827* (2013.01); *H04L 67/38* (2013.01)

(58) Field of Classification Search
CPC .................................................... G06F 3/04815
USPC ......................................................... 715/757
See application file for complete search history.

(56) References Cited

U.S. PATENT DOCUMENTS 4,280,135 A   7/1981   Schlossberg
5,414,801 A   5/1995   Smith et al.
(Continued)

FOREIGN PATENT DOCUMENTS

CN   1678994 A   10/2005
CN   1701568     11/2005
(Continued)

OTHER PUBLICATIONS

Screenshot of Windows for Workgroups 3.11, manufactured by Microsoft, released on Dec. 31, 1993.*
(Continued)

*Primary Examiner* — Reza Nabi
(74) *Attorney, Agent, or Firm* — Edouard Garcia

(57) ABSTRACT

A spatial layout of zones of a virtual area in a network communication environment is displayed. A user can have a respective presence in each of one or more of the zones. Navigation controls and interaction controls are presented. The navigation controls enable the user to specify where to establish a presence in the virtual area. The interaction controls enable the user to manage interactions with one or more other communicants in the network communication environment. A respective presence of the user is established in each of one or more of the zones on response to input received via the navigation controls. Respective graphical representations of the communicants are depicted in each of the zones where the communicants respectively have presence.

20 Claims, 22 Drawing Sheets

(51) Int. Cl.
  *G06T 13/80*  (2011.01)
  *H04L 29/06*  (2006.01)

(56) References Cited

U.S. PATENT DOCUMENTS

| | | | |
|---|---|---|---|
| 5,471,318 A * | 11/1995 | Ahuja | H04L 12/1813 358/400 |
| 5,491,743 A * | 2/1996 | Shiio | H04L 12/1822 348/14.01 |
| 5,627,978 A | 5/1997 | Altom | |
| 5,727,155 A | 3/1998 | Dawson | |
| 5,737,533 A * | 4/1998 | de Hond | G06F 17/30873 707/E17.01 |
| 5,758,110 A | 5/1998 | Boss | |
| 5,764,916 A | 6/1998 | Busey | |
| 5,774,628 A | 6/1998 | Hemphill | |
| 5,793,365 A * | 8/1998 | Tang | G06Q 10/10 715/758 |
| 5,880,731 A | 3/1999 | Liles et al. | |
| 5,889,843 A | 3/1999 | Singer et al. | |
| 5,896,129 A | 4/1999 | Murphy et al. | |
| 5,926,179 A | 7/1999 | Matsuda et al. | |
| 5,933,597 A | 8/1999 | Hogan | |
| 5,938,724 A | 8/1999 | Pommier | |
| 5,944,791 A | 8/1999 | Scherpbier | |
| 5,949,414 A | 9/1999 | Namikata | |
| 5,949,866 A | 9/1999 | Coiera et al. | |
| 5,956,038 A * | 9/1999 | Rekimoto | A63F 13/12 345/419 |
| 5,982,372 A * | 11/1999 | Brush, II | G06F 17/30014 345/418 |
| 5,995,096 A | 11/1999 | Kitahara | |
| 5,999,206 A | 12/1999 | Inoue et al. | |
| 5,999,208 A * | 12/1999 | McNerney | H04N 7/15 348/14.03 |
| 6,005,578 A * | 12/1999 | Cole | G06F 3/04815 715/854 |
| 6,009,460 A | 12/1999 | Ohno et al. | |
| 6,014,145 A | 1/2000 | Bardon et al. | |
| 6,047,314 A | 4/2000 | Pommier | |
| 6,057,856 A * | 5/2000 | Miyashita | G06T 15/00 345/633 |
| 6,094,189 A | 7/2000 | Quillen et al. | |
| 6,119,147 A * | 9/2000 | Toomey | G06Q 10/109 709/204 |
| 6,119,166 A | 9/2000 | Bergman | |
| 6,166,727 A | 12/2000 | Kozuka | |
| 6,167,432 A | 12/2000 | Jiang | |
| 6,175,831 B1 | 1/2001 | Weinreich | |
| 6,215,498 B1 | 4/2001 | Filo et al. | |
| 6,219,045 B1 * | 4/2001 | Leahy | H04L 65/403 709/204 |
| 6,226,655 B1 | 5/2001 | Borman et al. | |
| 6,237,025 B1 | 5/2001 | Ludwig | |
| 6,275,490 B1 | 8/2001 | Mattaway | |
| 6,275,493 B1 | 8/2001 | Morris et al. | |
| 6,304,283 B1 | 10/2001 | Kitagawa | |
| 6,304,893 B1 | 10/2001 | Gish | |
| 6,308,199 B1 | 10/2001 | Katsurabayashi | |
| 6,310,629 B1 | 10/2001 | Muthusamy et al. | |
| 6,323,857 B1 | 11/2001 | Mielekamp et al. | |
| 6,335,927 B1 * | 1/2002 | Elliott | H04L 12/14 370/352 |
| 6,342,906 B1 | 1/2002 | Kumar et al. | |
| 6,362,817 B1 | 3/2002 | Powers et al. | |
| 6,370,565 B1 | 4/2002 | Gong | |
| 6,380,952 B1 | 4/2002 | Mass | |
| 6,392,760 B1 | 5/2002 | Ahuja | |
| 6,396,509 B1 * | 5/2002 | Cheng | G06F 3/011 345/419 |
| 6,396,837 B1 | 5/2002 | Wang et al. | |
| 6,400,381 B1 | 6/2002 | Barrett et al. | |
| 6,421,047 B1 | 7/2002 | Groot | |
| 6,426,778 B1 | 7/2002 | Valdez | |
| 6,473,096 B1 | 10/2002 | Kobayashi et al. | |
| 6,480,191 B1 | 11/2002 | Balabanovic | |
| 6,493,001 B1 | 12/2002 | Takagi et al. | |
| 6,559,863 B1 | 5/2003 | Megiddo | |
| 6,567,980 B1 | 5/2003 | Jain et al. | |
| 6,570,587 B1 | 5/2003 | Efrat et al. | |
| 6,572,476 B2 | 6/2003 | Shoji | |
| 6,580,441 B2 | 6/2003 | Schileru-Key | |
| 6,608,636 B1 | 8/2003 | Roseman | |
| 6,636,242 B2 | 10/2003 | Bowman-Amuah | |
| 6,671,818 B1 | 12/2003 | Mikurak | |
| 6,704,784 B2 * | 3/2004 | Matsuda | A63F 13/12 709/224 |
| 6,708,172 B1 * | 3/2004 | Wong | G06F 17/30873 |
| 6,714,222 B1 * | 3/2004 | Åkerberg | G06F 3/0481 715/773 |
| 6,721,741 B1 | 4/2004 | Eyal et al. | |
| 6,728,356 B1 | 4/2004 | Carroll | |
| 6,731,314 B1 * | 5/2004 | Cheng | G06F 17/30873 707/E17.111 |
| 6,763,371 B1 | 7/2004 | Jandel | |
| 6,772,195 B1 * | 8/2004 | Hatlelid | G06F 3/04815 345/419 |
| 6,784,901 B1 * | 8/2004 | Harvey | H04L 12/1827 709/204 |
| 6,785,708 B1 | 8/2004 | Busey | |
| 6,789,119 B1 | 9/2004 | Zhu | |
| 6,789,120 B1 | 9/2004 | Lee | |
| 6,832,245 B1 | 12/2004 | Isaacs | |
| 6,833,863 B1 | 12/2004 | Clemens | |
| 6,862,625 B1 * | 3/2005 | Busey | H04L 29/06 709/203 |
| 6,909,443 B1 | 6/2005 | Robertson | |
| 6,912,565 B1 | 6/2005 | Powers | |
| 6,999,945 B1 | 2/2006 | Freeny | |
| 7,006,616 B1 | 2/2006 | Christofferson et al. | |
| 7,016,978 B2 | 3/2006 | Malik | |
| 7,036,082 B1 * | 4/2006 | Dalrymple | G06F 3/011 370/352 |
| 7,047,202 B2 | 5/2006 | Jaipuria et al. | |
| 7,058,896 B2 * | 6/2006 | Hughes | G06F 3/04815 345/419 |
| 7,069,308 B2 | 6/2006 | Abrams | |
| 7,080,096 B1 * | 7/2006 | Imamura | G06Q 30/06 |
| 7,086,005 B1 | 8/2006 | Matsuda | |
| 7,124,164 B1 | 10/2006 | Chemtob | |
| 7,133,900 B1 | 11/2006 | Szeto | |
| 7,145,898 B1 * | 12/2006 | Elliott | H04L 12/66 370/352 |
| 7,165,213 B1 * | 1/2007 | Busey | H04L 12/1813 709/202 |
| 7,168,048 B1 | 1/2007 | Goossen | |
| 7,168,051 B2 | 1/2007 | Robinson | |
| 7,181,690 B1 | 2/2007 | Leahy | |
| 7,184,037 B2 | 2/2007 | Gallery | |
| 7,188,317 B1 | 3/2007 | Hazel | |
| 7,191,394 B1 | 3/2007 | Ardeleanu | |
| 7,194,542 B2 | 3/2007 | Segan | |
| 7,200,675 B2 | 4/2007 | Wang | |
| 7,240,008 B2 | 7/2007 | Hitotsumatsu | |
| 7,240,826 B2 | 7/2007 | Abecassis | |
| 7,260,784 B2 | 8/2007 | Crichton | |
| 7,263,526 B1 | 8/2007 | Busey | |
| 7,293,243 B1 | 11/2007 | Ben-Shachar | |
| 7,298,834 B1 | 11/2007 | Homeier et al. | |
| 7,305,438 B2 * | 12/2007 | Christensen | H04L 51/04 709/204 |
| 7,308,080 B1 | 12/2007 | Moriuchi et al. | |
| 7,336,779 B2 | 2/2008 | Boyer | |
| 7,342,587 B2 | 3/2008 | Danzig | |
| 7,346,654 B1 | 3/2008 | Weiss | |
| 7,356,563 B1 | 4/2008 | Leichtling | |
| 7,363,229 B1 | 4/2008 | Falcon et al. | |
| 7,392,306 B1 | 6/2008 | Donner | |
| 7,418,664 B2 | 8/2008 | Ben-Shachar | |
| 7,426,540 B1 | 9/2008 | Matsumoto | |
| 7,451,181 B2 | 11/2008 | Sasaki | |
| 7,467,356 B2 * | 12/2008 | Gettman | G06F 3/04815 707/E17.111 |
| 7,474,741 B2 | 1/2009 | Brunson | |

(56) References Cited

U.S. PATENT DOCUMENTS

| | | | |
|---|---|---|---|
| 7,478,086 B2 | 1/2009 | Samn | |
| 7,499,926 B1 | 3/2009 | Burckart | |
| 7,503,006 B2* | 3/2009 | Danieli | A63F 13/12 |
| | | | 463/42 |
| 7,506,072 B2 | 3/2009 | Waldorf | |
| 7,516,411 B2 | 4/2009 | Beaton | |
| 7,529,796 B2 | 5/2009 | Riddle | |
| 7,530,028 B2* | 5/2009 | Mulcahy | G06Q 10/10 |
| | | | 715/706 |
| 7,533,346 B2* | 5/2009 | McGrath | H04L 12/1822 |
| | | | 715/757 |
| 7,587,317 B2 | 9/2009 | Falcon | |
| 7,594,179 B2 | 9/2009 | Takemura et al. | |
| 7,616,624 B2 | 11/2009 | John | |
| 7,630,986 B1 | 12/2009 | Herz | |
| 7,640,300 B2* | 12/2009 | Wohlgemuth | H04L 63/0209 |
| | | | 455/416 |
| 7,676,542 B2 | 3/2010 | Moser | |
| 7,680,098 B2 | 3/2010 | John | |
| 7,680,480 B2 | 3/2010 | John | |
| 7,680,885 B2 | 3/2010 | Schauser | |
| 7,707,249 B2 | 4/2010 | Spataro | |
| 7,720,678 B2 | 5/2010 | Falcon et al. | |
| 7,730,063 B2 | 6/2010 | Eder | |
| 7,734,691 B2 | 6/2010 | Creamer | |
| 7,734,692 B1* | 6/2010 | Kaplan | H04L 12/1822 |
| | | | 709/204 |
| 7,747,719 B1 | 6/2010 | Horovitz | |
| 7,765,259 B2 | 7/2010 | MacVarish | |
| 7,769,606 B2 | 8/2010 | Boone | |
| 7,769,806 B2 | 8/2010 | Wie et al. | |
| 7,805,406 B2 | 9/2010 | Craig | |
| 7,813,488 B2* | 10/2010 | Kozdon | G07C 9/00158 |
| | | | 379/201.04 |
| 7,827,288 B2 | 11/2010 | Da Palma | |
| 7,840,668 B1 | 11/2010 | Sylvain | |
| 7,843,959 B2 | 11/2010 | Kampmann et al. | |
| 7,844,724 B2* | 11/2010 | Van Wie | H04L 12/1827 |
| | | | 709/223 |
| 7,895,208 B2 | 2/2011 | Konopnicki | |
| 7,904,194 B2 | 3/2011 | Brown et al. | |
| 7,908,663 B2* | 3/2011 | Horvitz | G06Q 10/10 |
| | | | 380/255 |
| 7,930,212 B2 | 4/2011 | Perry et al. | |
| 7,958,453 B1* | 6/2011 | Taing | H04L 12/1827 |
| | | | 709/204 |
| 7,979,574 B2* | 7/2011 | Gillo | A63F 13/31 |
| | | | 463/1 |
| 8,000,328 B1 | 8/2011 | Kandekar et al. | |
| 8,028,021 B2 | 9/2011 | Reisinger | |
| 8,051,195 B1 | 11/2011 | Kandekar | |
| 8,078,468 B2 | 12/2011 | Andreasson | |
| 8,082,245 B2 | 12/2011 | Bates et al. | |
| 8,135,018 B1 | 3/2012 | Kandekar | |
| 8,135,868 B2 | 3/2012 | Shelby | |
| 8,191,001 B2* | 5/2012 | Van Wie | H04L 12/1822 |
| | | | 707/724 |
| 8,231,465 B2 | 7/2012 | Yee et al. | |
| 8,285,785 B2* | 10/2012 | Ekholm | G06F 3/0488 |
| | | | 455/566 |
| 8,316,095 B1 | 11/2012 | Wheeler, Jr. | |
| 8,392,459 B2 | 3/2013 | Dempski | |
| 8,397,168 B2* | 3/2013 | Leacock et al. | 715/757 |
| 8,424,075 B1 | 4/2013 | Walsh et al. | |
| 8,447,616 B2 | 5/2013 | Falcon et al. | |
| 8,453,219 B2 | 5/2013 | Shuster | |
| 8,473,851 B2 | 6/2013 | DeGrazia | |
| 8,542,264 B2 | 9/2013 | Lu et al. | |
| 8,578,000 B2 | 11/2013 | Van Wie | |
| 8,935,328 B2 | 1/2015 | Tumuluri | |
| 2001/0023450 A1 | 9/2001 | Chu | |
| 2001/0034740 A1 | 10/2001 | Kerne | |
| 2001/0046228 A1 | 11/2001 | Tahtinen et al. | |
| 2002/0013813 A1 | 1/2002 | Matsuoka | |
| 2002/0019833 A1 | 2/2002 | Hanamoto | |
| 2002/0026388 A1* | 2/2002 | Roebuck | G06Q 30/02 |
| | | | 705/27.2 |
| 2002/0033844 A1 | 3/2002 | Levy et al. | |
| 2002/0033848 A1* | 3/2002 | Sciammarella | G06F 3/0481 |
| | | | 715/838 |
| 2002/0049814 A1* | 4/2002 | Yoo | G06F 17/30884 |
| | | | 709/205 |
| 2002/0052918 A1* | 5/2002 | Rekimoto | G06F 3/04815 |
| | | | 709/204 |
| 2002/0073150 A1 | 6/2002 | Wilcock | |
| 2002/0080193 A1 | 6/2002 | Muthusamy et al. | |
| 2002/0080195 A1 | 6/2002 | Carlson | |
| 2002/0085035 A1 | 7/2002 | Orbanes | |
| 2002/0087328 A1 | 7/2002 | Denenberg et al. | |
| 2002/0097267 A1 | 7/2002 | Dinan | |
| 2002/0109680 A1 | 8/2002 | Orbanes | |
| 2002/0112028 A1 | 8/2002 | Colwill | |
| 2002/0143916 A1 | 10/2002 | Mendiola et al. | |
| 2002/0158873 A1 | 10/2002 | Williamson | |
| 2002/0165922 A1 | 11/2002 | Wei | |
| 2002/0169829 A1 | 11/2002 | Shuster | |
| 2002/0178096 A1 | 11/2002 | Marshall | |
| 2002/0188959 A1 | 12/2002 | Piotrowski | |
| 2003/0002634 A1 | 1/2003 | Gupta | |
| 2003/0009469 A1 | 1/2003 | Platt et al. | |
| 2003/0037112 A1 | 2/2003 | Fitzpatrick et al. | |
| 2003/0043200 A1 | 3/2003 | Faieta | |
| 2003/0046374 A1 | 3/2003 | Hilt | |
| 2003/0050977 A1 | 3/2003 | Puthenkulam | |
| 2003/0052911 A1 | 3/2003 | Cohen-Solal | |
| 2003/0055898 A1 | 3/2003 | Yeager et al. | |
| 2003/0065558 A1* | 4/2003 | Shaw | G06Q 30/02 |
| | | | 705/14.47 |
| 2003/0077561 A1 | 4/2003 | Alsop | |
| 2003/0093585 A1 | 5/2003 | Allan | |
| 2003/0107569 A1 | 6/2003 | Endo et al. | |
| 2003/0149731 A1* | 8/2003 | Ohwa | G06Q 10/107 |
| | | | 709/206 |
| 2003/0158731 A1 | 8/2003 | Falcon et al. | |
| 2003/0158953 A1 | 8/2003 | Lal | |
| 2003/0177019 A1 | 9/2003 | Santos et al. | |
| 2003/0177187 A1 | 9/2003 | Levine et al. | |
| 2003/0182001 A1 | 9/2003 | Radenkovic et al. | |
| 2003/0184579 A1 | 10/2003 | Zhang et al. | |
| 2003/0187988 A1 | 10/2003 | Lee | |
| 2003/0189599 A1 | 10/2003 | Ben-Shachar et al. | |
| 2003/0191799 A1 | 10/2003 | Araujo | |
| 2003/0192049 A1 | 10/2003 | Schneider et al. | |
| 2003/0197739 A1 | 10/2003 | Bauer | |
| 2003/0212746 A1 | 11/2003 | Fitzpatrick | |
| 2003/0215779 A1* | 11/2003 | Dupont | G09B 7/00 |
| | | | 434/350 |
| 2003/0222902 A1 | 12/2003 | Chupin | |
| 2004/0030741 A1 | 2/2004 | Wolton | |
| 2004/0030783 A1 | 2/2004 | Hwang | |
| 2004/0030797 A1 | 2/2004 | Akinlar et al. | |
| 2004/0075646 A1 | 4/2004 | Waters | |
| 2004/0078444 A1 | 4/2004 | Malik | |
| 2004/0128350 A1 | 7/2004 | Topfl | |
| 2004/0158610 A1 | 8/2004 | Davis | |
| 2004/0179038 A1* | 9/2004 | Blattner | G06T 13/40 |
| | | | 715/751 |
| 2004/0183827 A1 | 9/2004 | Putterman et al. | |
| 2004/0210634 A1 | 10/2004 | Ferrer et al. | |
| 2004/0210847 A1 | 10/2004 | Berson | |
| 2004/0268451 A1* | 12/2004 | Robbin | G06F 9/4443 |
| | | | 715/738 |
| 2005/0004995 A1 | 1/2005 | Stochosky | |
| 2005/0021624 A1* | 1/2005 | Herf | H04L 12/1822 |
| | | | 709/204 |
| 2005/0058094 A1 | 3/2005 | Lazaridis et al. | |
| 2005/0062844 A1 | 3/2005 | Ferren et al. | |
| 2005/0071426 A1 | 3/2005 | Shah | |
| 2005/0075885 A1* | 4/2005 | Danieli | A63F 13/12 |
| | | | 704/276 |
| 2005/0080866 A1* | 4/2005 | Kent | G06Q 10/107 |
| | | | 709/207 |
| 2005/0086612 A1* | 4/2005 | Gettman | G06F 3/04815 |
| | | | 715/848 |

(56) References Cited

U.S. PATENT DOCUMENTS

| | | |
|---|---|---|
| 2005/0088452 A1 | 4/2005 | Hanggie et al. |
| 2005/0108033 A1 | 5/2005 | Everett-Church |
| 2005/0120105 A1 | 6/2005 | Popescu et al. |
| 2005/0128212 A1 | 6/2005 | Edecker et al. |
| 2005/0132299 A1 | 6/2005 | Jones |
| 2005/0138570 A1 | 6/2005 | Good |
| 2005/0144247 A1* | 6/2005 | Christensen ............ H04L 51/04 709/207 |
| 2005/0154574 A1 | 7/2005 | Takemura et al. |
| 2005/0160094 A1 | 7/2005 | Morgenstern et al. |
| 2005/0163311 A1 | 7/2005 | Fowler |
| 2005/0166154 A1* | 7/2005 | Wilson .................. G06F 3/0481 715/751 |
| 2005/0171955 A1 | 8/2005 | Hull |
| 2005/0181872 A1 | 8/2005 | Acharya et al. |
| 2005/0182844 A1 | 8/2005 | Johnson et al. |
| 2005/0183092 A1 | 8/2005 | Christensen |
| 2005/0198290 A1 | 9/2005 | Berkey et al. |
| 2005/0210008 A1 | 9/2005 | Tran |
| 2005/0215252 A1 | 9/2005 | Jung |
| 2005/0226196 A1 | 10/2005 | Suh |
| 2005/0232168 A1 | 10/2005 | Schauser |
| 2005/0235034 A1 | 10/2005 | Chen |
| 2005/0261980 A1* | 11/2005 | Hadi ...................... G06Q 30/06 705/26.43 |
| 2005/0283537 A1 | 12/2005 | Li |
| 2006/0005187 A1 | 1/2006 | Neil |
| 2006/0010240 A1 | 1/2006 | Chuah |
| 2006/0020882 A1 | 1/2006 | Beezer et al. |
| 2006/0031779 A1 | 2/2006 | Theurer et al. |
| 2006/0041684 A1 | 2/2006 | Daniell et al. |
| 2006/0041943 A1 | 2/2006 | Singer et al. |
| 2006/0042483 A1 | 3/2006 | Work |
| 2006/0048064 A1 | 3/2006 | Vronay |
| 2006/0053016 A1 | 3/2006 | Falcon et al. |
| 2006/0067500 A1 | 3/2006 | Christofferson et al. |
| 2006/0069747 A1 | 3/2006 | Matsushita |
| 2006/0077205 A1 | 4/2006 | Guymon et al. |
| 2006/0117264 A1 | 6/2006 | Beaton |
| 2006/0121987 A1 | 6/2006 | Bortnik et al. |
| 2006/0121990 A1 | 6/2006 | O'Kelley |
| 2006/0132482 A1 | 6/2006 | Oh |
| 2006/0136837 A1* | 6/2006 | Ben-Shachar ......... G06Q 10/10 715/783 |
| 2006/0161624 A1 | 7/2006 | Montgomery |
| 2006/0167972 A1 | 7/2006 | Zombek |
| 2006/0167996 A1* | 7/2006 | Orsolini .................. G06Q 10/10 709/204 |
| 2006/0184886 A1* | 8/2006 | Chung ............. G06F 17/30873 715/758 |
| 2006/0187860 A1 | 8/2006 | Li |
| 2006/0200435 A1 | 9/2006 | Flinn |
| 2006/0212147 A1* | 9/2006 | McGrath ............. H04L 12/1822 700/94 |
| 2006/0227785 A1 | 10/2006 | Cournut et al. |
| 2006/0230156 A1 | 10/2006 | Shappir et al. |
| 2006/0242235 A1 | 10/2006 | Classen et al. |
| 2006/0244818 A1 | 11/2006 | Majors et al. |
| 2006/0248144 A1 | 11/2006 | Zhu |
| 2006/0248159 A1 | 11/2006 | Polan |
| 2006/0248573 A1 | 11/2006 | Pannu et al. |
| 2006/0253539 A1 | 11/2006 | Casperson |
| 2006/0253584 A1 | 11/2006 | Dixon |
| 2006/0271460 A1 | 11/2006 | Hanif |
| 2006/0271877 A1 | 11/2006 | Theurer |
| 2006/0282493 A1 | 12/2006 | Iwamura et al. |
| 2006/0293103 A1* | 12/2006 | Mendelsohn .......... G06Q 30/02 463/42 |
| 2007/0002057 A1 | 1/2007 | Danzig et al. |
| 2007/0011232 A1 | 1/2007 | Manion |
| 2007/0038701 A1 | 2/2007 | Majors et al. |
| 2007/0047700 A1 | 3/2007 | Mohler |
| 2007/0050716 A1 | 3/2007 | Leahy et al. |
| 2007/0050838 A1 | 3/2007 | Liu et al. |
| 2007/0061399 A1 | 3/2007 | Schmieder |
| 2007/0070066 A1* | 3/2007 | Bakhash ............ G06F 3/04815 345/419 |
| 2007/0074114 A1 | 3/2007 | Adjali |
| 2007/0077993 A1 | 4/2007 | Midgley et al. |
| 2007/0094325 A1 | 4/2007 | Ih et al. |
| 2007/0097885 A1 | 5/2007 | Traversat et al. |
| 2007/0098238 A1 | 5/2007 | Obrador |
| 2007/0101282 A1 | 5/2007 | Goossen |
| 2007/0127670 A1 | 6/2007 | Morishima et al. |
| 2007/0133436 A1 | 6/2007 | Provino et al. |
| 2007/0135099 A1 | 6/2007 | Taylor |
| 2007/0136686 A1 | 6/2007 | Price |
| 2007/0150498 A1 | 6/2007 | Li et al. |
| 2007/0156810 A1 | 7/2007 | Kumar |
| 2007/0156908 A1* | 7/2007 | Szomolanyi ........ H04L 12/1822 709/227 |
| 2007/0162432 A1 | 7/2007 | Armstrong et al. |
| 2007/0177529 A1 | 8/2007 | Provino et al. |
| 2007/0184855 A1* | 8/2007 | Klassen ................ G01S 5/0072 455/457 |
| 2007/0192299 A1 | 8/2007 | Zuckerberg et al. |
| 2007/0192427 A1* | 8/2007 | Berstis ................... G06Q 10/10 709/207 |
| 2007/0198645 A1 | 8/2007 | Chen |
| 2007/0198726 A1 | 8/2007 | Marco et al. |
| 2007/0204047 A1 | 8/2007 | Parker et al. |
| 2007/0214424 A1 | 9/2007 | Gilead |
| 2007/0219645 A1 | 9/2007 | Thomas et al. |
| 2007/0220111 A1 | 9/2007 | Lin |
| 2007/0226357 A1* | 9/2007 | McMurry ........... H04L 12/5815 709/229 |
| 2007/0226742 A1 | 9/2007 | Hung et al. |
| 2007/0233785 A1* | 10/2007 | Abraham ............. G06Q 10/107 709/204 |
| 2007/0233839 A1 | 10/2007 | Gaos |
| 2007/0234212 A1 | 10/2007 | de Souza |
| 2007/0240119 A1 | 10/2007 | Ducheneaut et al. |
| 2007/0242129 A1 | 10/2007 | Ferren et al. |
| 2007/0255831 A1 | 11/2007 | Hayashi et al. |
| 2007/0274291 A1 | 11/2007 | Diomelli |
| 2007/0279484 A1* | 12/2007 | Derocher ................. H04N 7/15 348/14.09 |
| 2007/0286366 A1 | 12/2007 | Deboy et al. |
| 2007/0291034 A1 | 12/2007 | Dones |
| 2007/0291706 A1 | 12/2007 | Miller et al. |
| 2007/0299778 A1 | 12/2007 | Haveson et al. |
| 2008/0005282 A1 | 1/2008 | Gaedcke |
| 2008/0019285 A1 | 1/2008 | John |
| 2008/0021870 A1 | 1/2008 | Birnbaum et al. |
| 2008/0021949 A1 | 1/2008 | John |
| 2008/0034364 A1 | 2/2008 | Lam |
| 2008/0039124 A1 | 2/2008 | Linder et al. |
| 2008/0046585 A1 | 2/2008 | Blumofe |
| 2008/0052373 A1 | 2/2008 | Pousti |
| 2008/0052387 A1 | 2/2008 | Heinz et al. |
| 2008/0059570 A1 | 3/2008 | Bill |
| 2008/0075118 A1 | 3/2008 | Knight |
| 2008/0086696 A1* | 4/2008 | Sri Prakash et al. .. G06Q 10/00 715/204 |
| 2008/0091692 A1* | 4/2008 | Keith .................. G06F 17/3089 |
| 2008/0098121 A1 | 4/2008 | Wu |
| 2008/0098123 A1 | 4/2008 | Huang et al. |
| 2008/0101561 A1 | 5/2008 | Choi et al. |
| 2008/0159490 A1 | 7/2008 | Gaudin |
| 2008/0163090 A1 | 7/2008 | Cortright |
| 2008/0163379 A1 | 7/2008 | Robinson |
| 2008/0168154 A1 | 7/2008 | Skyrm |
| 2008/0170065 A1 | 7/2008 | Gyorfi et al. |
| 2008/0209075 A1 | 8/2008 | Shamma |
| 2008/0214204 A1 | 9/2008 | Ramer |
| 2008/0214253 A1 | 9/2008 | Gillo et al. |
| 2008/0215679 A1 | 9/2008 | Gillo et al. |
| 2008/0215971 A1 | 9/2008 | Gillo et al. |
| 2008/0215972 A1 | 9/2008 | Zalewski et al. |
| 2008/0215973 A1 | 9/2008 | Zalewski et al. |
| 2008/0215974 A1 | 9/2008 | Harrison et al. |
| 2008/0215975 A1 | 9/2008 | Harrison et al. |
| 2008/0215994 A1 | 9/2008 | Harrison et al. |

(56) References Cited

U.S. PATENT DOCUMENTS

| | | | |
|---|---|---|---|
| 2008/0221998 A1* | 9/2008 | Mendelsohn | G06Q 30/02 705/14.12 |
| 2008/0222295 A1 | 9/2008 | Robinson et al. | |
| 2008/0235582 A1 | 9/2008 | Zalewski et al. | |
| 2008/0239997 A1 | 10/2008 | Walker et al. | |
| 2008/0244458 A1 | 10/2008 | Brugiolo | |
| 2008/0250115 A1* | 10/2008 | Iyer | G06Q 10/10 709/207 |
| 2008/0252637 A1* | 10/2008 | Berndt | G06T 19/00 345/419 |
| 2008/0256091 A1 | 10/2008 | Kampmann et al. | |
| 2008/0262910 A1* | 10/2008 | Altberg | G06Q 30/02 705/14.69 |
| 2008/0262911 A1* | 10/2008 | Altberg | G06Q 30/02 705/14.73 |
| 2008/0263460 A1* | 10/2008 | Altberg | G06Q 30/02 715/757 |
| 2008/0285388 A1 | 11/2008 | Ohguri et al. | |
| 2008/0301557 A1* | 12/2008 | Kotlyar | G06Q 10/10 715/706 |
| 2009/0018912 A1* | 1/2009 | Altberg | G06Q 30/02 705/14.56 |
| 2009/0063677 A1 | 3/2009 | Forlenza | |
| 2009/0077475 A1 | 3/2009 | Koster et al. | |
| 2009/0079816 A1* | 3/2009 | Qvarfordt | G06K 9/00335 348/14.16 |
| 2009/0089293 A1 | 4/2009 | Garritano | |
| 2009/0089364 A1* | 4/2009 | Hamilton, II | G06F 17/30873 709/203 |
| 2009/0089685 A1* | 4/2009 | Mordecai | G06F 3/011 715/757 |
| 2009/0096810 A1 | 4/2009 | Green | |
| 2009/0100355 A1 | 4/2009 | Takemura et al. | |
| 2009/0106376 A1 | 4/2009 | Tom | |
| 2009/0106671 A1 | 4/2009 | Olson et al. | |
| 2009/0112997 A1* | 4/2009 | Parker, II | H04L 67/24 709/206 |
| 2009/0113053 A1 | 4/2009 | Wie et al. | |
| 2009/0113066 A1* | 4/2009 | Van Wie | H04L 12/1827 709/231 |
| 2009/0113314 A1* | 4/2009 | Dawson | G06F 3/011 715/757 |
| 2009/0128567 A1* | 5/2009 | Shuster | H04L 12/1827 345/473 |
| 2009/0132943 A1 | 5/2009 | Minsky et al. | |
| 2009/0170479 A1 | 7/2009 | Jarenskog | |
| 2009/0177659 A1 | 7/2009 | Kim et al. | |
| 2009/0193077 A1* | 7/2009 | Horii | G06F 17/30 709/203 |
| 2009/0193431 A1 | 7/2009 | Beard | |
| 2009/0199095 A1* | 8/2009 | Nicol, II | G06F 3/0481 715/704 |
| 2009/0199275 A1 | 8/2009 | Brock | |
| 2009/0204673 A1 | 8/2009 | Tian | |
| 2009/0222742 A1 | 9/2009 | Pelton | |
| 2009/0234948 A1 | 9/2009 | Garbow et al. | |
| 2009/0235180 A1 | 9/2009 | Liu et al. | |
| 2009/0241037 A1 | 9/2009 | Hyndman | |
| 2009/0247196 A1 | 10/2009 | Kim | |
| 2009/0251457 A1* | 10/2009 | Walker | G06T 17/10 345/418 |
| 2009/0254840 A1* | 10/2009 | Churchill | G06F 3/0481 715/753 |
| 2009/0254842 A1* | 10/2009 | Leacock | H04L 12/1827 715/757 |
| 2009/0254843 A1* | 10/2009 | Van Wie | H04L 12/1822 715/757 |
| 2009/0259948 A1* | 10/2009 | Hamilton, II | A63F 13/12 715/757 |
| 2009/0286605 A1* | 11/2009 | Hamilton, II | G06N 3/006 463/42 |
| 2009/0288001 A1 | 11/2009 | Hamilton | |
| 2009/0288007 A1* | 11/2009 | Leacock | G06Q 10/10 715/716 |
| 2009/0300521 A1 | 12/2009 | Jerrard-Dunne et al. | |
| 2009/0307189 A1 | 12/2009 | Bobbitt | |
| 2009/0307620 A1* | 12/2009 | Hamilton, II | A63F 13/12 715/764 |
| 2009/0316683 A1 | 12/2009 | Gass | |
| 2009/0327484 A1 | 12/2009 | Chen | |
| 2010/0008356 A1 | 1/2010 | Boni | |
| 2010/0020075 A1 | 1/2010 | Edecker et al. | |
| 2010/0037151 A1 | 2/2010 | Ackerman et al. | |
| 2010/0058229 A1 | 3/2010 | Mercer | |
| 2010/0077034 A1* | 3/2010 | Alkov | A63F 13/12 709/206 |
| 2010/0100487 A1 | 4/2010 | Lingafelt | |
| 2010/0100851 A1 | 4/2010 | Clark et al. | |
| 2010/0138492 A1 | 6/2010 | Guzman | |
| 2010/0142542 A1 | 6/2010 | Wie et al. | |
| 2010/0146118 A1 | 6/2010 | Wie | |
| 2010/0162121 A1 | 6/2010 | Yoakum | |
| 2010/0164956 A1 | 7/2010 | Hyndman | |
| 2010/0169796 A1* | 7/2010 | Lynk | A63F 13/10 715/757 |
| 2010/0169799 A1 | 7/2010 | Hyndman | |
| 2010/0169801 A1* | 7/2010 | Blattner | H04L 12/1822 715/758 |
| 2010/0169837 A1* | 7/2010 | Hyndman | G06F 3/04815 715/848 |
| 2010/0169888 A1 | 7/2010 | Hare | |
| 2010/0185733 A1 | 7/2010 | Hon | |
| 2010/0198653 A1 | 8/2010 | Bromenshenkel | |
| 2010/0211880 A1* | 8/2010 | Haggar | G06F 3/04815 715/738 |
| 2010/0214243 A1 | 8/2010 | Birnbaum et al. | |
| 2010/0216553 A1 | 8/2010 | Chudley | |
| 2010/0221693 A1* | 9/2010 | Gupta | G09B 5/14 434/362 |
| 2010/0228547 A1* | 9/2010 | Scott | G06Q 30/02 704/235 |
| 2010/0228560 A1 | 9/2010 | Balasaygun | |
| 2010/0235501 A1 | 9/2010 | Klemm | |
| 2010/0241432 A1 | 9/2010 | Michaelis | |
| 2010/0246570 A1 | 9/2010 | Chavez | |
| 2010/0246571 A1 | 9/2010 | Geppert | |
| 2010/0246800 A1* | 9/2010 | Geppert | G06F 3/04817 379/265.09 |
| 2010/0251119 A1 | 9/2010 | Geppert | |
| 2010/0251124 A1 | 9/2010 | Geppert | |
| 2010/0251127 A1 | 9/2010 | Geppert | |
| 2010/0251141 A1 | 9/2010 | Sabin et al. | |
| 2010/0251142 A1 | 9/2010 | Geppert | |
| 2010/0251158 A1 | 9/2010 | Geppert | |
| 2010/0251177 A1* | 9/2010 | Geppert | G06F 3/04817 715/821 |
| 2010/0257450 A1* | 10/2010 | Go | G06F 3/0481 715/733 |
| 2010/0262550 A1 | 10/2010 | Burritt | |
| 2010/0274848 A1* | 10/2010 | Altmaier | H04L 67/104 709/203 |
| 2010/0287274 A1 | 11/2010 | Martinez et al. | |
| 2010/0322395 A1 | 12/2010 | Michaelis | |
| 2010/0325206 A1 | 12/2010 | Dayal et al. | |
| 2010/0332998 A1 | 12/2010 | Sun | |
| 2011/0004701 A1 | 1/2011 | Panda | |
| 2011/0029898 A1* | 2/2011 | Malik | G06Q 10/107 715/758 |
| 2011/0029907 A1* | 2/2011 | Bakhash | G06F 3/04815 715/769 |
| 2011/0032354 A1 | 2/2011 | Ulichney et al. | |
| 2011/0060587 A1 | 3/2011 | Phillips | |
| 2011/0169927 A1* | 7/2011 | Mages | G06F 3/04815 348/51 |
| 2011/0196930 A1 | 8/2011 | Chawla | G06Q 10/10 709/204 |
| 2011/0231781 A1* | 9/2011 | Betzler | A63F 13/12 715/757 |
| 2011/0231917 A1 | 9/2011 | Chaturvedi | |
| 2011/0274104 A1* | 11/2011 | Cozzi | H04W 4/021 370/352 |
| 2011/0296319 A1 | 12/2011 | Dinan | |
| 2011/0302509 A1* | 12/2011 | Leacock | G06Q 10/10 715/756 |

(56) References Cited

U.S. PATENT DOCUMENTS

| | | |
|---|---|---|
| 2011/0312425 A1 | 12/2011 | Inaba |
| 2012/0016678 A1 | 1/2012 | Grubber |
| 2012/0050257 A1 | 3/2012 | Clarke |
| 2012/0066306 A1* | 3/2012 | Leacock ............... H04L 51/043 709/204 |
| 2012/0179672 A1 | 7/2012 | Wie et al. |
| 2012/0216131 A1* | 8/2012 | Moyers ............... H04L 65/1069 715/757 |
| 2012/0246582 A1* | 9/2012 | Leacock ................ G06Q 10/10 715/753 |
| 2012/0254858 A1* | 10/2012 | Moyers ............... H04L 12/1818 717/177 |
| 2012/0262537 A1 | 10/2012 | Baker |
| 2012/0268468 A1 | 10/2012 | Elenzil |
| 2013/0027404 A1 | 1/2013 | Sarnoff |
| 2013/0073978 A1* | 3/2013 | Butler ..................... H04L 67/38 715/741 |
| 2013/0109418 A1 | 5/2013 | Lazaridis et al. |
| 2013/0125349 A1 | 5/2013 | Ahmadshahi |
| 2013/0132058 A1 | 5/2013 | Butler et al. |
| 2013/0143669 A1 | 6/2013 | Muller |
| 2013/0212228 A1 | 8/2013 | Butler et al. |
| 2013/0275886 A1 | 10/2013 | Haswell et al. |
| 2013/0283166 A1 | 10/2013 | Wie |
| 2013/0283169 A1 | 10/2013 | Wie |
| 2014/0213309 A1 | 7/2014 | Lazaridis et al. |

FOREIGN PATENT DOCUMENTS

| | | |
|---|---|---|
| CN | 1835479 | 9/2006 |
| CN | 1835479 A | 9/2006 |
| CN | 1968109 A | 5/2007 |
| CN | 101043295 A | 9/2007 |
| CN | 101499080 A | 8/2009 |
| EP | 0950956 A1 | 10/1999 |
| EP | 1844827 A1 | 10/2007 |
| EP | 01964597 A1 | 3/2008 |
| EP | 1964597 A1 | 9/2008 |
| EP | 2237537 | 10/2010 |
| EP | 2239930 | 10/2010 |
| FR | 2864659 | 7/2005 |
| JP | 10055261 A | 2/1998 |
| JP | 10075307 A | 3/1998 |
| JP | H11177628 | 2/1999 |
| JP | 11177628 A | 7/1999 |
| JP | 2002123478 | 4/2002 |
| JP | 2002123479 | 4/2002 |
| JP | 2002149580 | 5/2002 |
| JP | 2002224447 | 8/2002 |
| JP | 2003067317 | 3/2003 |
| JP | 2004272579 | 9/2004 |
| JP | 2004343779 A | 12/2004 |
| JP | 2005182331 A | 7/2005 |
| JP | 2005326987 | 11/2005 |
| JP | 2007072739 A | 3/2007 |
| JP | 2007506309 A | 3/2007 |
| JP | 2007122443 A | 5/2007 |
| JP | 2008182670 A | 8/2008 |
| JP | 2010086163 A | 4/2010 |
| JP | 2010535363 A | 11/2010 |
| KR | 1019990078775 | 11/1999 |
| KR | 1020000030491 | 6/2000 |
| KR | 1020010100589 | 11/2001 |
| KR | 1020030043910 | 6/2003 |
| KR | 1020030054874 | 7/2003 |
| KR | 1020040011825 | 2/2004 |
| KR | 1020050061548 | 6/2005 |
| KR | 1020060060788 | 6/2006 |
| KR | 1020070057578 | 6/2007 |
| KR | 1020070105088 | 10/2007 |
| KR | 1020090016692 A | 2/2009 |
| TW | I249922 B | 2/2006 |
| TW | I286896 B | 9/2007 |
| TW | 200737880 | 10/2007 |
| TW | 200833028 | 8/2008 |
| WO | 0070557 A2 | 11/2000 |
| WO | 0184334 A1 | 11/2001 |
| WO | 01/91868 | 12/2001 |
| WO | 0191867 | 12/2001 |
| WO | 0191867 A1 | 12/2001 |
| WO | 0191868 A1 | 12/2001 |
| WO | WO0191868 | 12/2001 |
| WO | 0211327 A2 | 2/2002 |
| WO | 0237471 A2 | 5/2002 |
| WO | 0237784 A2 | 5/2002 |
| WO | 02011327 | 7/2002 |
| WO | 03058518 A2 | 7/2003 |
| WO | 03091894 A1 | 11/2003 |
| WO | 2004004273 A1 | 1/2004 |
| WO | 2004036458 A2 | 4/2004 |
| WO | 2005015880 A1 | 2/2005 |
| WO | 2005076218 A1 | 8/2005 |
| WO | 2006003709 A1 | 1/2006 |
| WO | 2006127429 | 11/2006 |
| WO | 2007018694 A1 | 2/2007 |
| WO | 2005079538 | 3/2007 |
| WO | 2007064174 A1 | 6/2007 |
| WO | 2007076150 | 7/2007 |
| WO | 2008008806 | 1/2008 |
| WO | 2008106196 A1 | 9/2008 |
| WO | 2008112944 A1 | 9/2008 |
| WO | 2009000028 A1 | 12/2008 |

OTHER PUBLICATIONS

Search report and written opinion issued on Aug. 13, 2010, in counterpart International Application No. PCT/US2010/020596.

Chris Greenhalgh et al., "Massive: a collaborative virtual environment for teleconferencing," ACM Transactions on Computer-Human Interaction (TOCHI), vol. 2 , Issue 3, pp. 239-261 (Sep. 1995).

Steve Benford et al., "Crowded collaborative virtual environments,"Conference on Human Factors in Computing Systems, Proceedings of the SIGCHI conference on Human factors in computing systems, Atlanta, Georgia, United States, pp. 59-66 (1997).

"Jiaxing Song, Relation Grid: A Social Relationship Network Model, Proceedings of the International Conference on Sematics, Knowledge and Grid (SKG 2005), Nov. 27-29, 2005, Beijing, China."

"Larry Page et al., The PageRank Citation Ranking: Bringing Order to the Web. Technical report, Stanford University Database Group, 1998. http://citeseer.nj.nec.com/368196.html."

"Peter Mika, Ontologies Are Us: A Unified Model of Social Networks and Semantics, Proceedings of 4th International Semantic Conference (ISWC2005), 2005, p. 522-536."

"WebEx Meeting Center User Guide: For Hosts, Presenters, and Participants," Cisco, 8.17/v 27.25, 303 pages (Jul. 23, 2010).

Bagein, M. et al., "Enabling Speech Based Access to Information Management Systems over Wireless Network", Proc. of the 3rd workshop on Applications and Services in Wireless Networks (ASWN 2003), Berne (Switzerland), (Jul. 2003).

Carman Neustaedter et al., The Social Network and Relationship Finder: Social Sorting for Email Triage, Proceedings of the 2005 Conference on Email and Anti-Spam, 2005, CEAS.

Chris Greenhalgh, "Dynamic, embodied multicast groups in Massive-2," The University of Nottingham, Department of Computer Science, Technical Report NOTTCS-TR-96-8, pp. 1-14 (1996).

Duncan J. Watts et al., Identity and Search in Social Media, Science, Apr. 2, 2002, p. 1302-1305, vol. 296.

English language computer translation of JP 2002123478, published Apr. 26, 2002, to Kamijo Satoshi.

English language computer translation of JP 2004272579, published Sep. 30, 2004, to Sakai Atsushi.

Flavio Paiva Junqueira et al., "Multicast Communication for Distributed Virtual Environments based on Active Networks," Grupo de Teleinformatica e Automacao—GTA Universidade Federal do Rio de Janeiro (2001).

Hee-Chui Choi et al., Trust Models for Community-Aware Identity Management, Proceedings of the Identity, Reference, and the Web Workshop (IRW06), May 23-26, 2006, Edinburgh, Scotland.

(56) References Cited

OTHER PUBLICATIONS http://wiki.secondlife.com/wiki/Main_Page last modified on Feb. 23, 2010 ("2LWiki").

International Preliminary Report on Patentability issued in counterpart International Application No. PCT/US2012/030766 (mailed Oct. 1, 2013).

International Preliminary Report on Patentability mailed in counterpart International Patent Application No. PCT/US2012/065274, dated Jun. 5, 2014.

International Preliminary Report on Patentability received in counterpart International Application No. PCT/US2013/042083 dated Dec. 11, 2014.

International Search Report and Written Opinion issued in counterpart International Application No. PCT/US2012/030766 (mailed Oct. 19, 2012).

International Search Report and Written Opinion received in counterpart International Application No. PCT/US2011/047724, mailed Mar. 6, 2012.

International search report and written opinion received in counterpart International application No. PCTIUS2010/028088, mailed Oct. 27, 2010.

Jennifer Golbeck et al., Inferring Trust Relationships in Web-based Social Networks, ACM Transactions on InternetTechnology (TOIT), Nov. 2006, p. 497-529, vol. 6, No. 4.

Lik Mui et al., A Computational Model of Trust and Reputation, Proceedings of the 35th Annual Hawaii International Conference on System Sciences (HICSS'02), Jan. 7-10, 2002, vol. 7, p. 188, IEEE Computer Society, Washington, DC, USA.

Maja Matijasevic, "A review of networked multi-user virtual environments," Tech. Rep. TR97-8-1, Center for Advanced Computer Studies, Virtual Reality and Multimedia Laboratory, University of Southwestern Lousiana, USA (1997).

Micheal Gardner et al., Formation Process Tools for Creating Sustainable Virtual Research Communities, Proceedings of the 2004 ACM Conference on Computer Supported Cooperative Work, CSCW04 Workshop on Social Networks, Nov. 6-10, 2004, Chicago, Illinois.

Nakanishi, H. et al., "FreeWalk: a 3D virtual space for casual meetings," Multimedia, IEEE, vol. 6, Issue 2, pp. 20-28 (Apr.-Jun. 1999).

PCT Search Report and Written Opinion in counterpart application PCTIUS2009/039470.

Search report and written opinion in PCT/US2008/080219, mailed Mar. 31, 2009.

Search report and written opinion in PCT/US2008/080226, mailed May 27, 2009.

Search report and written opinion issued in counterpart International Application No. PCT/US2012/025655 (dated Dec. 26, 2012).

Search Report and Written Opinion issued in counterpart International Patent Application No. PCT/US2012/047523, mailed Dec. 27, 2012.

Search Report and Written Opinion issued in counterpart International Patent Application No. PCT/US2012/047532, mailed Dec. 26, 2012.

Search report and written opinion issued on Aug. 13, 2010, in counterpart PCT Application No. PCT/US2010/020596.

Search Report and Written Opinion mailed in counterpart International Patent Application No. PCT/US2012/065274, dated Mar. 28, 2013.

Second Life for Dummies, Published Jan. 15, 2008 by Wiley Publishing, Inc. ("Robbins").

Shunsuke Konagai, "Discussion of an audio communication method in multiuser virtual space", the Institute ofImage Information and Television Engineers Technical Report, vol. 24, No. 15, Japan, the Institute ofImage Information and Television Engineers, Feb. 21, 2000, p. 61-66.

Stephan P. Marsh, Formalizing Trust as a Computational Concept, PhD thesis, 1994, University of Stirling, Department of Computer Science and Mathematics, Stirling, Scotland.

Vauhini Vara, Facebook Gets Personal With Ad Targeting Plan, The Wall Street Journal, Aug. 23, 2007, p. B1.

Yankelovich et al., "Porta-Person: Telepresence for the Connected Conference Room," CHI 2007, Apr. 28-May 3, 2007, San Jose, California, USA.

Yusuke Gotoh, "A Scheduling Scheme ofContinuous Media Data Broadcasting using P2P Networks", Multimedia, Distributed, Cooperation, and Mobile (DICOM02007) Symposium Collection ofPapers; Information Processing Society Symposium Series; vol. 2007; No. 1; [CD-ROM]; Japan; Information Processing Society; Jul. 4, 2007; p. 1448-1455.

\* cited by examiner

INTERFACING WITH A SPATIAL VIRTUAL COMMUNICATION ENVIRONMENT

CROSS-REFERENCE TO RELATED APPLICATIONS

This application is a continuation of prior U.S. patent application Ser. No. 12/354,709, filed Jan. 15, 2009, which claims the benefit of U.S. Provisional Application No. 61/042,714, filed Apr. 5, 2008, the entirety of which is incorporated herein by reference.

This application also relates to the following co-pending patent applications, the entirety of each of which is incorporated herein by reference: U.S. patent application Ser. No. 11/923,629, filed Oct. 24, 2007; and U.S. patent application Ser. No. 11/923,634, filed Oct. 24, 2007.

BACKGROUND OF THE INVENTION

When face-to-face communications are not practical, people often rely on one or more technological solutions to meet their communications needs. These solutions typically are designed to simulate one or more aspects of face-to-face communications. Traditional telephony systems enable voice communications between callers. Instant messaging (also referred to as "chat") communications systems enable users to communicate text messages in real time through instant message computer clients that are interconnected by an instant message server. Some instant messaging systems additionally allow users to be represented in a virtual environment by user-controllable graphic objects (referred to as "avatars"). Interactive virtual reality communication systems enable users in remote locations to communicate over multiple real-time channels and to interact with each other by manipulating their respective avatars in three-dimensional virtual spaces. What are needed are improved systems and methods for interfacing with spatial virtual communication environments.

BRIEF SUMMARY OF THE INVENTION

In one aspect, the invention features a method in accordance with which a spatial layout of zones of a virtual area in a network communication environment is displayed. A user can have a respective presence in each of one or more of the zones. Navigation controls and interaction controls are presented. The navigation controls enable the user to specify where to establish a presence in the virtual area. The interaction controls enable the user to manage interactions with one or more other communicants in the network communication environment. A respective presence of the user is established in each of one or more of the zones on response to input received via the navigation controls. Respective graphical representations of the communicants are depicted in each of the zones where the communicants respectively have presence.

The invention also features apparatus operable to implement the inventive methods described above and computer-readable media storing computer-readable instructions causing a computer to implement the inventive methods described above.

Other features and advantages of the invention will become apparent from the following description, including the drawings and the claims.

DETAILED DESCRIPTION OF THE INVENTION

Figure 1:
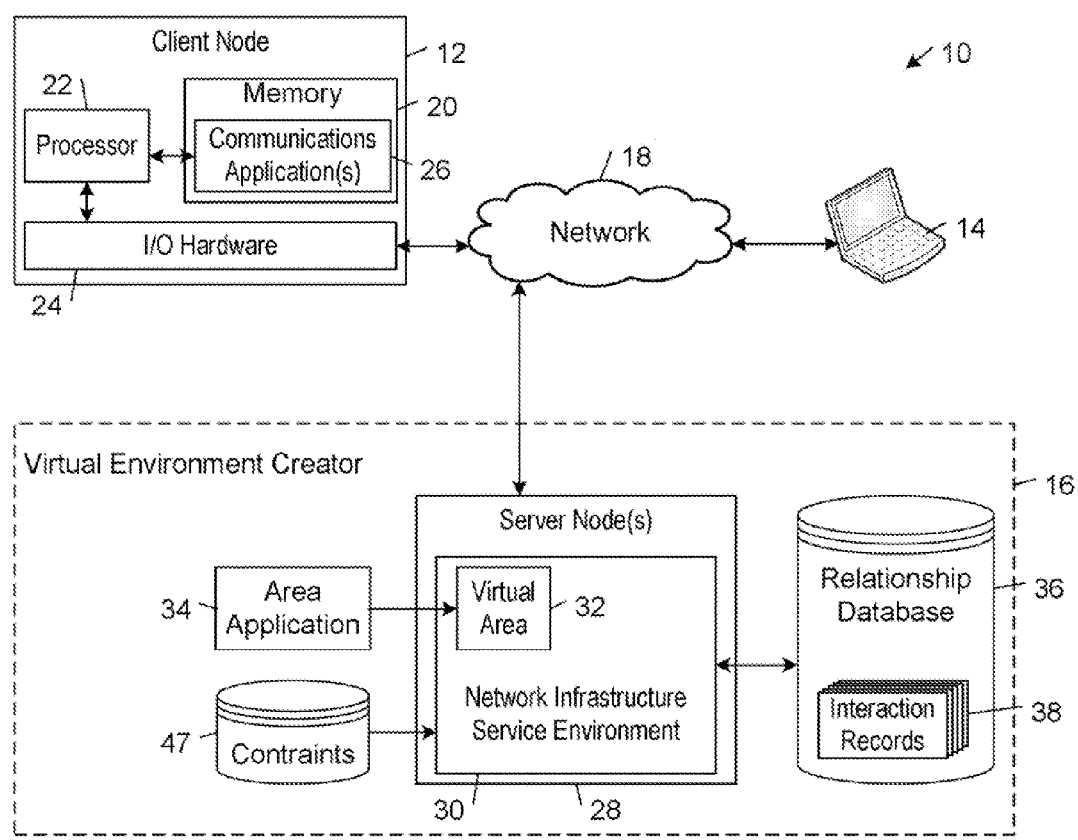
FIG. 1 is a diagrammatic view of an embodiment of a network communication environment that includes a first client network node, a second client network node, and a virtual environment creator.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Definition of Terms

A "communicant" is a person who communicates or otherwise interacts with other persons over one or more network connections, where the communication or interaction may or may not occur in the context of a virtual area. A "user" is a communicant who is operating a particular network node that defines a particular perspective for descriptive purposes.

A "realtime contact" of a user is a communicant or other person who has communicated with the user via a realtime communications platform.

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "computer data file" is a block of information that durably stores data for use by a software application.

A "database" is an organized collection of records that are presented in a standardized format that can be searched by computers. A database may be stored on a single computer-readable data storage medium on a single computer or it may be distributed across multiple computer-readable data storage media on one or more computers.

A "data sink" (referred to herein simply as a "sink") is any of a device (e.g., a computer), part of a device, or software that receives data.

A "data source" (referred to herein simply as a "source") is any of a device (e.g., a computer), part of a device, or software that originates data.

A "network node" (also referred to simply as a "node") is a junction or connection point in a communications network. Exemplary network nodes include, but are not limited to, a terminal, a computer, and a network switch. A "server" network node is a host computer on a network that responds to requests for information or service. A "client" network node is a computer on a network that requests information or service from a server. A "network connection" is a link between two communicating network nodes. The term "local network node" refers to a network node that currently is the primary subject of discussion. The term "remote network node" refers to a network node that is connected to a local network node by a network communications link. A "connection handle" is a pointer or identifier (e.g., a uniform resource identifier (URI)) that can be used to establish a network connection with a communicant, resource, or service on a network node. A "network communication" can include any type of information (e.g., text, voice, audio, video, electronic mail message, data file, motion data stream, and data packet) that is transmitted or otherwise conveyed from one network node to another network node over a network connection.

A "communicant interaction" is any type of direct or indirect action or influence between a communicant and another network entity, which may include for example another communicant, a virtual area, or a network service. Exemplary types of communicant interactions include communicants communicating with each other in realtime, a communicant entering a virtual area, and a communicant requesting access to a resource from a network service.

"Presence" refers to the ability and willingness of a networked entity (e.g., a communicant, service, or device) to communicate, where such willingness affects the ability to detect and obtain information about the state of the entity on a network and the ability to connect to the entity.

A "realtime data stream" is data that is structured and processed in a continuous flow and is designed to be received with no delay or only imperceptible delay. Realtime data streams include digital representations of voice, video, user movements, facial expressions and other physical phenomena, as well as data within the computing environment that may benefit from rapid transmission, rapid execution, or both rapid transmission and rapid execution, including for example, avatar movement instructions, text chat, realtime data feeds (e.g., sensor data, machine control instructions, transaction streams and stock quote information feeds), and file transfers.

A "virtual area" (also referred to as an "area" or a "place") is a representation of a computer-managed space or scene. Virtual areas typically are one-dimensional, two-dimensional, or three-dimensional representations; although in some embodiments a virtual area may correspond to a single point. Oftentimes, a virtual area is designed to simulate a physical, real-world space. For example, using a traditional computer monitor, a virtual area may be visualized as a two-dimensional graphic of a three-dimensional computer-generated space. However, virtual areas do not require an associated visualization to implement switching rules. A virtual area typically refers to an instance of a virtual area schema, where the schema defines the structure and contents of a virtual area in terms of variables and the instance defines the structure and contents of a virtual area in terms of values that have been resolved from a particular context.

A "virtual area application" (also referred to as a "virtual area specification") is a description of a virtual area that is used in creating a virtual environment. The virtual area application typically includes definitions of geometry, physics, and realtime switching rules that are associated with one or more zones of the virtual area.

A "virtual environment" is a representation of a computer-managed space that includes at least one virtual area and supports realtime communications between communicants.

A "zone" is a region of a virtual area that is associated with at least one switching rule or governance rule. A "switching rule" is an instruction that specifies a connection or disconnection of one or more realtime data sources and one or more realtime data sinks subject to one or more conditions precedent. A switching rule controls switching (e.g., routing, connecting, and disconnecting) of realtime data streams between network nodes communicating in the context of a virtual area. A governance rule controls a communicant's access to a resource (e.g., an area, a region of an area, or the contents of that area or region), the scope of that access, and follow-on consequences of that access (e.g., a requirement that audit records relating to that access must be recorded). A "renderable zone" is a zone that is associated with a respective visualization.

A "position" in a virtual area refers to a location of a point or an area or a volume in the virtual area. A point typically is represented by a single set of one-dimensional, two-dimensional, or three-dimensional coordinates (e.g., x, y, z) that define a spot in the virtual area. An area typically is represented by the three-dimensional coordinates of three or more coplanar vertices that define a boundary of a closed two-dimensional shape in the virtual area. A volume typically is represented by the three-dimensional coordinates of four or more non-coplanar vertices that define a closed boundary of a three-dimensional shape in the virtual area.

A "spatial state" is an attribute that describes where a user has presence in a virtual area. The spatial state attribute typically has a respective value (e.g., a zone_ID value) for each of the zones in which the user has presence.

A "placemark" is a stored reference (e.g., a hyperlink) to a location in a virtual area. A placemark typically can be selected to present a view of the associated location in the virtual area to a user. The verb "placemark" means the act or operation of creating a placemark.

In the context of a virtual area, an "object" is any type of discrete element in a virtual area that may be usefully treated separately from the geometry of the virtual area. Exemplary objects include doors, portals, windows, view screens, and speakerphone. An object typically has attributes or properties that are separate and distinct from the attributes and properties of the virtual area. An "avatar" is an object that represents a communicant in a virtual area.

The term "double-click" refers to the act or operation of entering or inputting an execution command (e.g., double-clicking the left computer mouse button or by single-clicking a user interface button associated with an execute command, e.g., enter zone or view object). The term "shift-click" refers to the act or operation of entering or inputting a selection command (e.g., clicking the left computer mouse button) while the Shift key of an alphanumeric input device is activated. The term "shift-double-click" refers to the act or operation of entering or inputting an execution command while the Shift key of an alphanumeric input device is activated.

As used herein, the term "includes" means includes but not limited to, the term "including" means including but not limited to. The term "based on" means based at least in part on.

II. Introduction

The embodiments that are described herein provide improved systems and methods for navigating and interacting in spatial virtual communication environments. These embodiments provide an interface that includes navigation controls that enable a user to navigate virtual areas and interaction controls that enable the user to interact with other communicants in the virtual areas. The navigation controls allow the user to change his or her focus (e.g., the current view of the virtual area or the current zone or zones where the user has presence) using a variety of intuitive point-and-click browsing methods in the context of a hierarchical spatial model of a virtual area. In some embodiments, the interface adaptively presents navigation controls and interaction controls that are appropriate to the user's needs in the context of the user's current focus.

III. Overview

A. An Exemplary Operating Environment

1. Introduction

FIG. 1 shows an embodiment of an exemplary network communications environment 10 that includes a first client network node 12, a second client network node 14, and a virtual environment creator 16 that are interconnected by a network 18. The first client network node 12 includes a computer-readable memory 20, a processor 22, and input/output (I/O) hardware 24. The processor 22 executes at least one communications application 26 that is stored in the memory 20. The second client network node 14 typically is configured in substantially the same way as the first client network node 12. The virtual environment creator 16 includes at least one server network node 28 that provides a network infrastructure service environment 30. The communications application 26 and the network infrastructure service environment 30 together provide a platform (referred to herein as "the platform") for creating a spatial virtual communication environment (also referred to herein simply as a "virtual environment").

In some embodiments, the network infrastructure service environment 30 manages sessions of the first and second client nodes 12, 14 in a virtual area 32 in accordance with a virtual area application 34. The virtual area application 34 is hosted by the virtual area 32 and includes a description of the virtual area 32. The communications applications 26 operating on the first and second client network nodes 12, 14 present respective views of the virtual area 32 in accordance with data received from the network infrastructure service environment 30 and provide respective interfaces for receiving commands from the communicants. The communicants typically are represented in the virtual area 32 by respective avatars, which move about the virtual area 32 in response to commands that are input by the communicants at their respective network nodes. Each communicant's view of the virtual area 32 typically is presented from the perspective of the communicant's avatar, which increases the level of immersion experienced by the communicant. Each communicant typically is able to view any part of the virtual area 32 around his or her avatar. In some embodiments, the communications applications 26 establish realtime data stream connections between the first and second client network nodes 12, 14 and other network nodes sharing the virtual area 32 based on the positions of the communicants' avatars in the virtual area 32.

The network infrastructure service environment 30 also maintains a relationship database 36 that contains records 38 of interactions between communicants. Each interaction record 38 describes the context of an interaction between a pair of communicants.

2. Network Environment

The network 18 may include any of a local area network (LAN), a metropolitan area network (MAN), and a wide area network (WAN) (e.g., the internet). The network 18 typically includes a number of different computing platforms and transport facilities that support the transmission of a wide variety of different media types (e.g., text, voice, audio, and video) between network nodes.

The communications application 26 (see FIG. 1) typically operates on a client network node that includes software and hardware resources which, together with administrative policies, user preferences (including preferences regarding the exportation of the user's presence and the connection of the user to areas and other users), and other settings, define a local configuration that influences the administration of realtime connections with other network nodes. The network connections between network nodes may be arranged in a variety of different stream handling topologies, including a peer-to-peer architecture, a server-mediated architecture, and hybrid architectures that combine aspects of peer-to-peer and server-mediated architectures. Exemplary topologies of these types are described in U.S. application Ser. Nos. 11/923,629 and 11/923,634, both of which were filed on Oct. 24, 2007.

3. Network Infrastructure Services

The network infrastructure service environment 30 typically includes one or more network infrastructure services that cooperate with the communications applications 26 in the process of establishing and administering network connections between the client nodes 12, 14 and other network nodes (see FIG. 1). The network infrastructure services may run on a single network node or may be distributed across multiple network nodes. The network infrastructure services typically run on one or more dedicated network nodes (e.g., a server computer or a network device that performs one or more edge services, such as routing and switching). In some embodiments, however, one or more of the network infrastructure services run on at least one of the communicants' network nodes. Among the network infrastructure services that are included in the exemplary embodiment of the network infrastructure service environment 30 are an account service, a security service, an area service, a rendezvous service, and an interaction service.

Account Service

The account service manages communicant accounts for the virtual environment. The account service also manages the creation and issuance of authentication tokens that can be used by client network nodes to authenticate themselves to any of the network infrastructure services.

Security Service

The security service controls communicants' access to the assets and other resources of the virtual environment. The access control method implemented by the security service typically is based on one or more of capabilities (where access is granted to entities having proper capabilities or permissions) and an access control list (where access is granted to entities having identities that are on the list). After a particular communicant has been granted access to a resource, that communicant typically uses the functionality provided by the other network infrastructure services to interact in the network communications environment 10.

Area Service

The area service administers virtual areas. In some embodiments, the area service remotely configures the communications applications 26 operating on the first and second client network nodes 12, 14 in accordance with the virtual area application 34 subject to a set of constraints 47 (see FIG. 1). The constraints 47 typically include controls on access to the virtual area. The access controls typically are based on one or more of capabilities (where access is granted to communicants or client nodes having proper capabilities or permissions) and an access control list (where access is granted to communicants or client nodes having identities that are on the list).

The area service also manages network connections that are associated with the virtual area subject to the capabilities of the requesting entities, maintains global state information for the virtual area, and serves as a data server for the client network nodes participating in a shared communication session in a context defined by the virtual area 32. The global state information includes a list of all the objects that are in the virtual area and their respective locations in the virtual area. The area service sends instructions that configure the client network nodes. The area service also registers and transmits initialization information to other client network nodes that request to join the communication session. In this process, the area service may transmit to each joining client network node a list of components (e.g., plugins) that are needed to render the virtual area 32 on the client network node in accordance with the virtual area application 34. The area service also ensures that the client network nodes can synchronize to a global state if a communications fault occurs. The area service typically manages communicant interactions with virtual areas via governance rules that are associated with the virtual areas.

Rendezvous Service

The rendezvous service manages the collection, storage, and distribution of presence information and provides mechanisms for network nodes to communicate with one another (e.g., by managing the distribution of connection handles) subject to the capabilities of the requesting entities. The rendezvous service typically stores the presence information in a presence database. The rendezvous service typically manages communicant interactions with each other via communicant privacy preferences.

Interaction Service

The interaction service maintains the relationship database 36 that contains the records 38 of interactions between communicants. For every interaction between communicants, one or more services of the network infrastructure service environment 30 (e.g., the area service) transmit interaction data to the interaction service. In response, the interaction service generates one or more respective interaction records and stores them in the relationship database. Each interaction record describes the context of an interaction between a pair of communicants. For example, in some embodiments, an interaction record contains an identifier for each of the communicants, an identifier for the place of interaction (e.g., a virtual area instance), a description of the hierarchy of the interaction place (e.g., a description of how the interaction room relates to a larger area), start and end times of the interaction, and a list of all files and other data streams that are shared or recorded during the interaction. Thus, for each realtime interaction, the interaction service tracks when it occurred, where it occurred, and what happened during the interaction in terms of communicants involved (e.g., entering and exiting), objects that are activated/deactivated, and the files that were shared.

The interaction service also supports queries on the relationship database 36 subject to the capabilities of the requesting entities. The interaction service presents the results of queries on the interaction database records in a sorted order (e.g., most frequent or most recent) based on virtual area. The query results can be used to drive a frequency sort of contacts whom a communicant has met in which virtual areas, as well as sorts of who the communicant has met with regardless of virtual area and sorts of the virtual areas the communicant frequents most often. The query results also may be used by application developers as part of a heuristic system that automates certain tasks based on relationships. An example of a heuristic of this type is a heuristic that permits communicants who have visited a particular virtual area more than five times to enter without knocking by default, or a heuristic that allows communicants who were present in an area at a particular time to modify and delete files created by another communicant who was present in the same area at the same time. Queries on the relationship database 36 can be combined with other searches. For example, queries on the relationship database may be combined with queries on contact history data generated for interactions with contacts using a communication system (e.g., Skype, Facebook, and Flickr) that is outside the domain of the network infrastructure service environment 30.

4. Virtual Areas

The communications application 26 and the network infrastructure service environment 30 typically administer the realtime connections with network nodes in a communication context that is defined by an instance of a virtual area. The virtual area instance may correspond to an abstract (non-geometric) virtual space that is defined with respect to abstract coordinates. Alternatively, the virtual area instance may correspond to a visual virtual space that is defined with respect to one-, two- or three-dimensional geometric coordinates that are associated with a particular visualization. Abstract virtual areas may or may not be associated with respective visualizations, whereas visual virtual areas are associated with respective visualizations.

As explained above, communicants typically are represented by respective avatars in a virtual area that has an associated visualization. The avatars move about the virtual area in response to commands that are input by the communicants at their respective network nodes. In some embodiments, the communicant's view of a virtual area instance typically is presented from the perspective of the communicant's avatar, and each communicant typically is able to view any part of the visual virtual area around his or her avatar, increasing the level of immersion that is experienced by the communicant.

Figure 2:
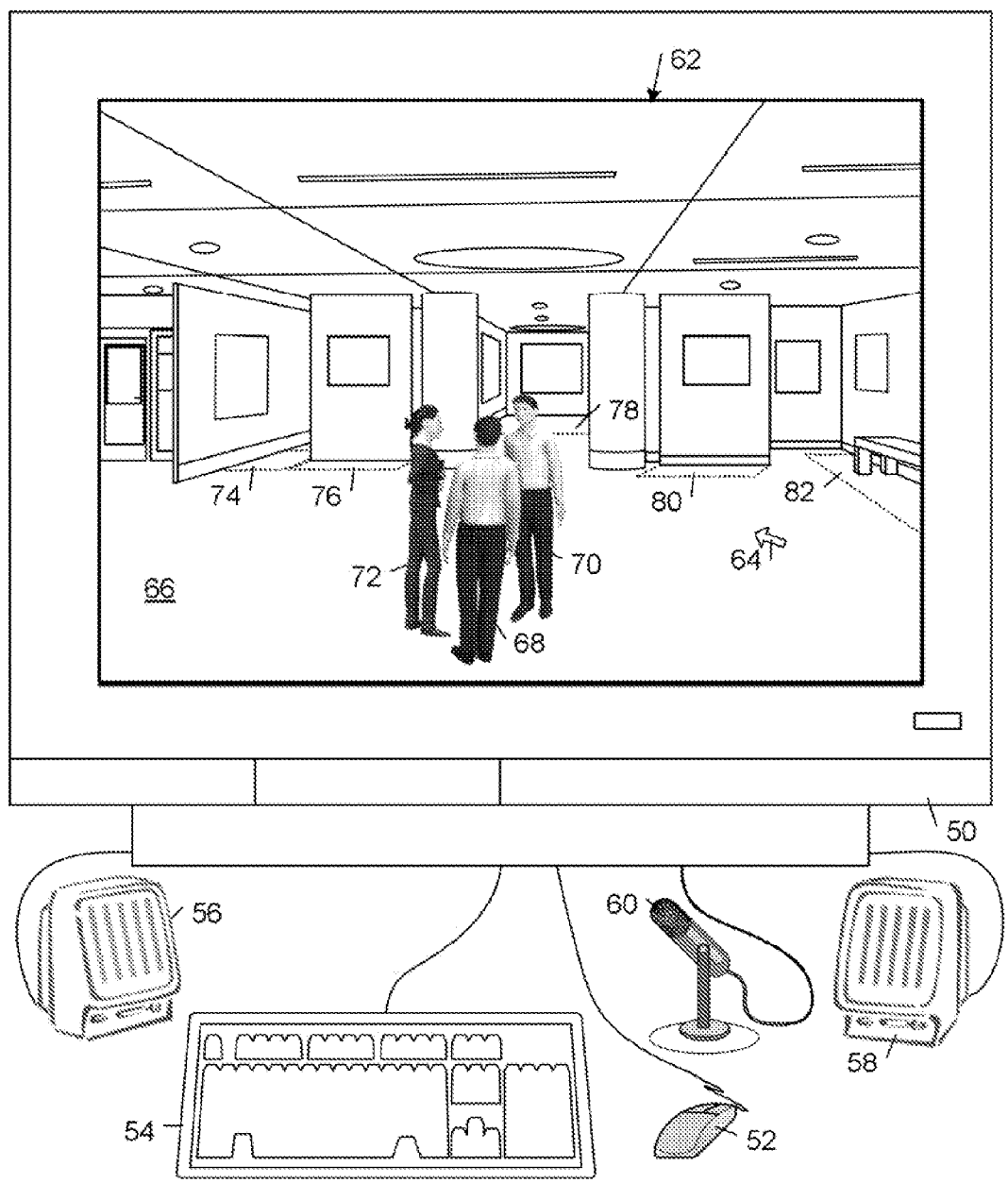
FIG. 2 is a diagrammatic view of an embodiment of a network node that includes a graphical user interface presenting a depiction of a virtual area.

FIG. 2 shows an embodiment of an exemplary network node that is implemented by a computer system 48. The computer system 48 includes a display monitor 50, a computer mouse 52, a keyboard 54, speakers 56, 58, and a microphone 60. The display monitor 50 displays a graphical user interface 62. The graphical user interface 62 is a windows-based graphical user interface that can include multiple windows, icons, and a pointer 64. In the illustrated embodiment, the graphical user interface 62 presents a two-dimensional depiction of a shared virtual area 66 that is associated with a three-dimensional visualization representing an art gallery. Communicants are represented in the virtual area 66 by respective avatars 68, 70, 72, each of which may have a respective role (e.g., a curator, an artist, and a visitor) in the context of the virtual area 66.

As explained in detail below, the virtual area 66 includes zones 74, 76, 78, 80, 82 that are associated with respective rules that govern the switching of realtime data streams between the network nodes that are represented by the avatars 68-72 in the virtual area 66. (During a typical communication session, the dashed lines demarcating the zones 74-82 in FIG. 2 are not visible to the communicants although there may be visual cues associated with such zone boundaries.) The switching rules dictate how local connection processes executing on each of the network nodes establishes communications with the other network nodes based on the locations of the communicants' avatars 68-72 in the zones 74-82 of the virtual area 66.

A virtual area is defined by a specification that includes a description of geometric elements of the virtual area and one or more rules, including switching rules and governance rules. The switching rules govern realtime stream connections between the network nodes. The governance rules control a communicant's access to resources, such as the virtual area itself, regions with the virtual area, and objects within the virtual area. In some embodiments, the geometric elements of the virtual area are described in accordance with the COLLADA—Digital Asset Schema Release 1.4.1 Apr. 2006 specification (available from http://www.khronos.org/collada/), and the switching rules are described using an extensible markup language (XML) text format (referred to herein as a virtual space description format (VSDL)) in accordance with the COLLADA Streams Reference specification described in U.S. application Ser. Nos. 11/923,629 and 11/923,634.

The geometric elements of the virtual area typically include physical geometry and collision geometry of the virtual area. The physical geometry describes the shape of the virtual area. The physical geometry typically is formed from surfaces of triangles, quadrilaterals, or polygons. Colors and textures are mapped onto the physical geometry to create a more realistic appearance for the virtual area. Lighting effects may be provided, for example, by painting lights onto the visual geometry and modifying the texture, color, or intensity near the lights. The collision geometry describes invisible surfaces that determine the ways in which objects can move in the virtual area. The collision geometry may coincide with the visual geometry, correspond to a simpler approximation of the visual geometry, or relate to application-specific requirements of a virtual area designer.

The switching rules typically include a description of conditions for connecting sources and sinks of realtime data streams in terms of positions in the virtual area. Each rule typically includes attributes that define the realtime data stream type to which the rule applies and the location or locations in the virtual area where the rule applies. In some embodiments, each of the rules optionally may include one or more attributes that specify a required role of the source, a required role of the sink, a priority level of the stream, and a requested stream handling topology. In some embodiments, if there are no explicit switching rules defined for a particular part of the virtual area, one or more implicit or default switching rules may apply to that part of the virtual area. One exemplary default switching rule is a rule that connects every source to every compatible sink within an area, subject to policy rules. Policy rules may apply globally to all connections between the client nodes or only to respective connections with individual client nodes. An example of a policy rule is a proximity policy rule that only allows connections of sources with compatible sinks that are associated with respective objects that are within a prescribed distance (or radius) of each other in the virtual area.

In some embodiments, governance rules are associated with a virtual area to control who has access to the virtual area, who has access to its contents, what is the scope of that access to the contents of the virtual area (e.g., what can a user do with the contents), and what are the follow-on consequences of accessing those contents (e.g., record keeping, such as audit logs, and payment requirements). In some embodiments, an entire virtual area or a zone of the virtual area is associated with a "governance mesh." In some embodiments, a governance mesh is implemented in a way that is analogous to the implementation of the zone mesh described in U.S. application Ser. Nos. 11/923,629 and 11/923,634. A governance mesh enables a software application developer to associate governance rules with a virtual area or a zone of a virtual area. This avoids the need for the creation of individual permissions for every file in a virtual area and avoids the need to deal with the complexity that potentially could arise when there is a need to treat the same document differently depending on the context.

In some embodiments, a virtual area is associated with a governance mesh that associates one or more zones of the virtual area with a digital rights management (DRM) function. The DRM function controls access to one or more of the virtual area or one or more zones within the virtual area or objects within the virtual area. The DRM function is triggered every time a communicant crosses a governance mesh boundary within the virtual area. The DRM function determines whether the triggering action is permitted and, if so, what is the scope of the permitted action, whether payment is needed, and whether audit records need to be generated. In an exemplary implementation of a virtual area, the associated governance mesh is configured such that if a communicant is able to enter the virtual area he or she is able to perform actions on all the documents that are associated with the virtual area, including manipulating the documents, viewing the documents, downloading the documents, deleting the documents, modifying the documents and re-uploading the documents. In this way, the virtual area can become a repository for information that was shared and discussed in the context defined by the virtual area.

Additional details regarding the specification of a virtual area are described in U.S. application Ser. Nos. 61/042,714 (which was filed on Apr. 4, 2008), 11/923,629 (which was filed on Oct. 24, 2007), and 11/923,634 (which was filed on Oct. 24, 2007).

5. Communications Application

In some embodiments, the communications application 26 includes:

a. local Human Interface Devices (HIDs) and audio playback devices;
b. a So3D graphical display, avatar, and physics engine;
c. a system database and storage facility.

a. Local Human Interface Devices (HIDs) and Audio Playback Devices

The local HIDs enable a communicant to input commands and other signals into the client network node while participating in a virtual area communications session. Exemplary HIDs include a computer keyboard, a computer mouse, a touch screen display, and a microphone.

The audio playback devices enable a communicant to playback audio signals that are received during a virtual area communications session. Exemplary audio playback devices include audio processing hardware (e.g., a sound card) for manipulating (e.g., mixing and applying special effects) audio signals, and speakers for outputting sounds.

b. So3D Graphical Display, Avatar, and Physics Engine

The So3D engine is a three-dimensional visualization engine that controls the presentation of a respective view of a virtual area and objects in the virtual area on a display monitor. The So3D engine typically interfaces with a graphical user interface driver and the HID devices to present the views of the virtual area and to allow the communicant to control the operation of the communications application 26.

In some embodiments, the So3D engine receives graphics rendering instructions from the area service. The So3D engine also may read a local communicant avatar database that contains images needed for rendering the communicant's avatar in the virtual area. Based on this information, the So3D engine generates a visual representation (i.e., an image) of the virtual area and the objects in the virtual area from the point of view (position and orientation) of the communicant's avatar in the virtual area. The visual representation typically is passed to the graphics rendering components of the operating system, which drive the graphics rendering hardware to render the visual representation of the virtual area on the client network node.

The communicant can control the presented view of the virtual area by inputting view control commands via a HID device (e.g., a computer mouse). The So3D engine updates the view of the virtual area in accordance with the view control commands. The So3D engine also updates the graphic representation of the virtual area on the display monitor in accordance with updated object position information received from the area service 26.

c. System Database and Storage Facility

The system database and storage facility stores various kinds of information that is used by the platform. Exemplary information that typically is stored by the storage facility includes the presence database, the relationship database, an avatar database, a real user id (RUID) database, an art cache database, and an area application database. This information may be stored on a single network node or it may be distributed across multiple network nodes.

6. Client Node Architecture

A communicant typically connects to the network 18 from a client network node. The client network node typically is implemented by a general-purpose computer system or a dedicated communications computer system (or "console", such as a network-enabled video game console). The client network node executes communications processes that establish realtime data stream connections with other network nodes and typically executes visualization rendering processes that present a view of each virtual area entered by the communicant.

Figure 3:
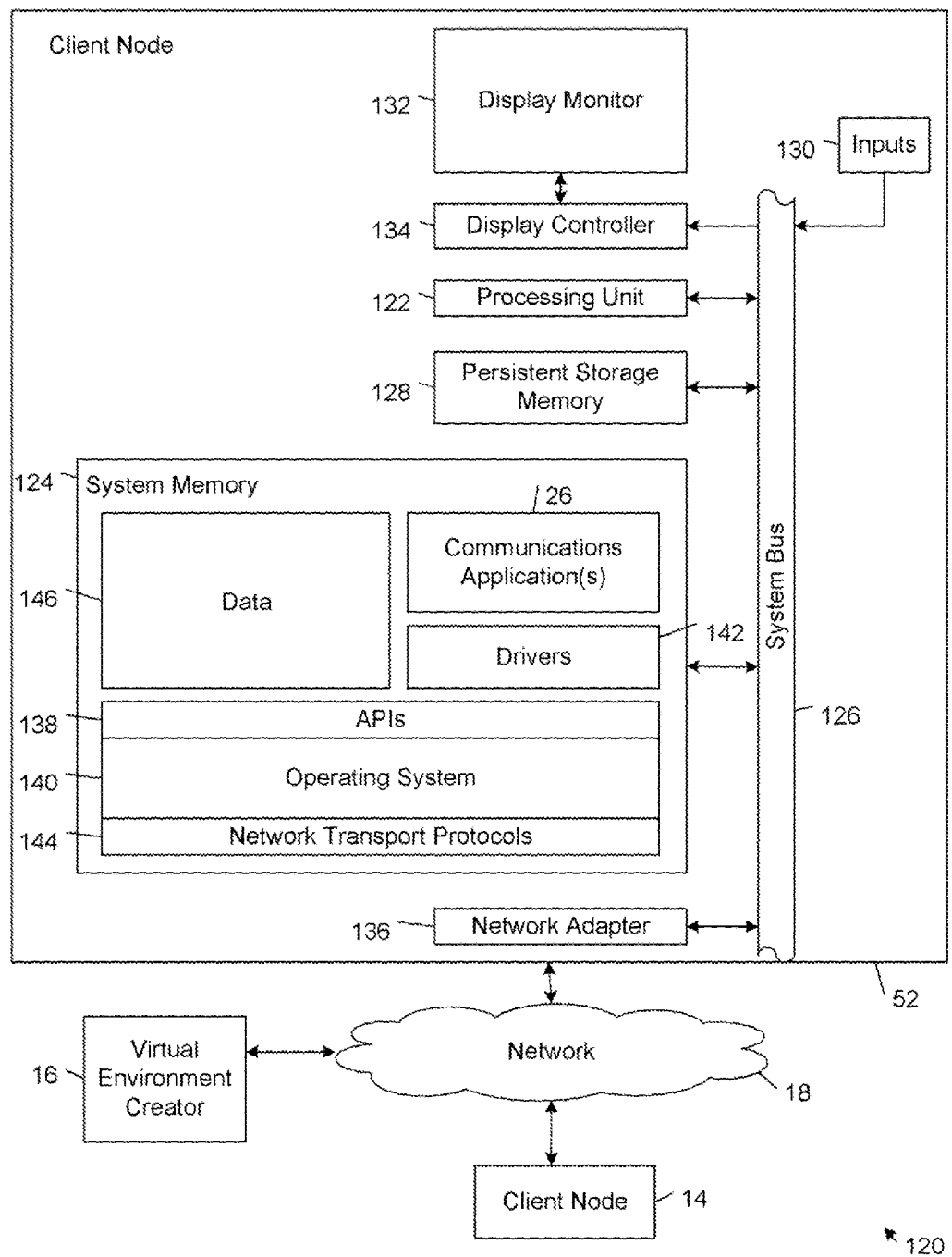
FIG. 3 is a block diagram of the network communication environment of FIG. 1 that shows components of an embodiment of a client network node.

FIG. 3 shows an embodiment of a client network node that is implemented by a computer system 120. The computer system 120 includes a processing unit 122, a system memory 124, and a system bus 126 that couples the processing unit 122 to the various components of the computer system 120. The processing unit 122 may include one or more data processors, each of which may be in the form of any one of various commercially available computer processors. The system memory 124 includes one or more computer-readable media that typically are associated with a software application addressing space that defines the addresses that are available to software applications. The system memory 124 may include a read only memory (ROM) that stores a basic input/output system (BIOS) that contains start-up routines for the computer system 120, and a random access memory (RAM). The system bus 126 may be a memory bus, a peripheral bus or a local bus, and may be compatible with any of a variety of bus protocols, including PCI, VESA, Microchannel, ISA, and EISA. The computer system 120 also includes a persistent storage memory 128 (e.g., a hard drive, a floppy drive, a CD ROM drive, magnetic tape drives, flash memory devices, and digital video disks) that is connected to the system bus 126 and contains one or more computer-readable media disks that provide non-volatile or persistent storage for data, data structures and computer-executable instructions.

A communicant may interact (e.g., input commands or data) with the computer system 120 using one or more input devices 130 (e.g. one or more keyboards, computer mice, microphones, cameras, joysticks, physical motion sensors such Wii input devices, and touch pads). Information may be presented through a graphical user interface (GUI) that is presented to the communicant on a display monitor 132, which is controlled by a display controller 134. The computer system 120 also may include other input/output hardware (e.g., peripheral output devices, such as speakers and a printer). The computer system 120 connects to other network nodes through a network adapter 136 (also referred to as a "network interface card" or NIC).

A number of program modules may be stored in the system memory 124, including application programming interfaces 138 (APIs), an operating system (OS) 140 (e.g., the Windows XP® operating system available from Microsoft Corporation of Redmond, Wash. U.S.A.), the communications application 26, drivers 142 (e.g., a GUI driver), network transport protocols 144, and data 146 (e.g., input data, output data, program data, a registry, and configuration settings).

7. Server Node Architecture

In some embodiments, the one or more server network nodes of the virtual environment creator 16 are implemented by respective general-purpose computer systems of the same type as the client network node 120, except that each server network node typically includes one or more server software applications.

In other embodiments, the one or more server network nodes of the virtual environment creator 16 are implemented by respective network devices that perform edge services (e.g., routing and switching).

B. Exemplary Communication Session

Referring back to FIG. 2, during a communication session, each of the client network nodes generates a respective set of realtime data streams (e.g., motion data streams, audio data streams, chat data streams, file transfer data streams, and video data streams). For example, each communicant manipulates one or more input devices (e.g., the computer mouse 52 and the keyboard 54) that generate motion data streams, which control the movement of his or her avatar in the virtual area 66. In addition, the communicant's voice and other sounds that are generated locally in the vicinity of the computer system 48 are captured by the microphone 60. The microphone 60 generates audio signals that are converted into realtime audio streams. Respective copies of the audio streams are transmitted to the other network nodes that are represented by avatars in the virtual area 66. The sounds that are generated locally at these other network nodes are converted into realtime audio signals and transmitted to the computer system 48. The computer system 48 converts the audio streams generated by the other network nodes into audio signals that are rendered by the speakers 56, 58. The motion data streams and audio streams may be transmitted from each of the communicant nodes to the other client network nodes either directly or indirectly. In some stream handling topologies, each of the client network nodes receives copies of the realtime data streams that are transmitted by the other client network nodes. In other stream handling topologies, one or more of the client network nodes receives one or more stream mixes that are derived from realtime data streams that are sourced (or originated) from other ones of the network nodes.

In some embodiments, the area service maintains global state information that includes a current specification of the virtual area, a current register of the objects that are in the virtual area, and a list of any stream mixes that currently are being generated by the network node hosting the area service. The objects register typically includes for each object in the virtual area a respective object identifier (e.g., a label that uniquely identifies the object), a connection handle (e.g., a URI, such as an IP address) that enables a network connection to be established with a network node that is associated with the object, and interface data that identifies the realtime data sources and sinks that are associated with the object (e.g., the sources and sinks of the network node that is associated with the object). The objects register also typically includes one or more optional role identifiers for each object; the role identifiers may be assigned explicitly to the objects by either the communicants or the area service, or may be inferred from other attributes of the objects or the user. In some embodiments, the objects register also includes the current position of each of the objects in the virtual area as determined by the area service from an analysis of the realtime motion data streams received from the network nodes associated with objects in the virtual area. In this regard, the area service receives realtime motion data streams from the network nodes associated with objects in the virtual area, tracks the communicants' avatars and other objects that enter, leave, and move around in the virtual area based on the motion data. The area service updates the objects register in accordance with the current locations of the tracked objects.

In the process of administering realtime data stream connections with other network nodes, the area service maintains for each of the client network nodes a set of configuration data, including interface data, a zone list, and the positions of the objects that currently are in the virtual area. The interface data includes for each object associated with each of the client network nodes a respective list of all the sources and sinks of realtime data stream types that are associated with the object. The zone list is a register of all the zones in the virtual area that currently are occupied by the avatar associated with the corresponding client network node. When a communicant first enters a virtual area, the area service typically initializes the current object positions database with position initialization information. Thereafter, the area service updates the current object positions database with the current positions of the objects in the virtual area as determined from an analysis of the realtime motion data streams received from the other client network nodes sharing the virtual area.

IV. Interfacing with a Spatial Virtual Communication Environment

A. Introduction

In addition to the local Human Interface Device (HID) and audio playback devices, the So3D graphical display, avatar, and physics engine, and the system database and storage facility, the communications application 26 also includes a graphical navigation and interaction interface (referred to herein as a "seeker interface") that interfaces the user with the spatial virtual communication environment. The seeker interface includes navigation controls that enable the user to navigate the virtual environment and interaction controls that enable the user to control his or her interactions with other communicants in the virtual communication environment. The navigation and interaction controls typically are responsive to user selections that are made using any type of input device, including a computer mouse, a touch pad, a touch screen display, a keyboard, and a video game controller. The seeker interface is an application that operates on each client network node. The seeker interface is a small, lightweight interface that a user can keep up and running all the time on his or her desktop. The seeker interface allows the user to launch virtual area applications and provides the user with immediate access to realtime contacts and realtime collaborative places (or areas). The seeker interface is integrated with realtime communications applications and/or realtime communications components of the underlying operating system such that the seeker interface can initiate and receive realtime communications with other network nodes. A virtual area is integrated with the user's desktop through the seeker interface such that the user can upload files into the virtual environment created by the virtual environment creator 16, use files stored in association with the virtual area using the native client software applications independently of the virtual environment while still present in a virtual area, and more generally treat presence and position within a virtual area as an aspect of their operating environment analogous to other operating system functions rather than just one of several applications.

Figure 4:
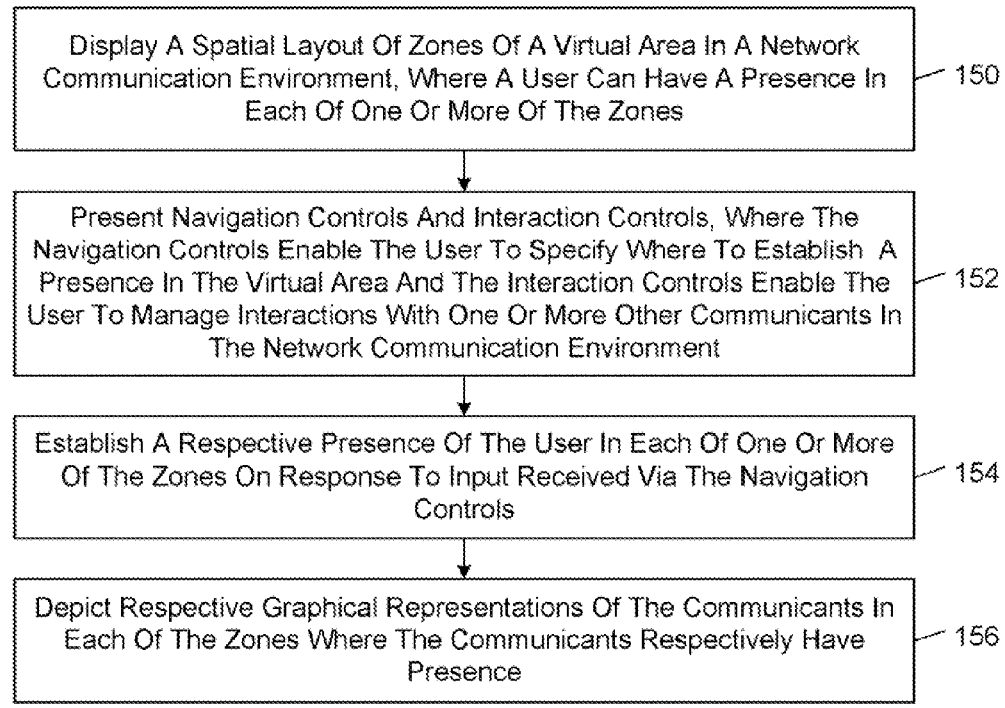
FIG. 4 is a flow diagram of an embodiment of a method of interfacing a user with a spatial communication environment.

FIG. 4 shows an embodiment of a method of interfacing the user with the spatial virtual communication environment. In accordance with this method, a spatial layout of zones of a virtual area in a network communication environment is displayed on the display monitor 132 (FIG. 4, block 150). A user can have a respective presence in each of one or more of the zones. Each of the zones can be used to define a respective spatial state in which the user can have a presence. The zones typically are associated with a respective identifier (zone_ID) and one or more rules governing one or more of the user's interactions with the virtual area and with other communicants. Navigation controls and interaction controls are presented on the display monitor 132 (FIG. 4, block 152). The navigation controls enable the user to specify where to establish a presence in the virtual area and the interaction controls enable the user to manage interactions with one or more other communicants in the network communication environment. A respective presence of the user is established in each of one or more of the zones in response to input received via the navigation controls (FIG. 4, block 154). In some embodiments, this process involves creating for each of the zones one or more interaction database records that associate a respective zone identifier (zone_ID) with each of the communicants that have a presence in the zone. Respective graphical representations of the communicants in each of the zones where the communicants respectively have presence are depicted on the display monitor 132 (FIG. 4, block 156). The communicants typically are represented by two- or three-dimensional avatar images, which may represent the communicants pseudo-realistically (e.g., with human-like forms) or iconographically (e.g., with circular or spherical sprites or other icons).

The spatial virtual communication environment typically can be modeled as a spatial hierarchy of places (also referred to herein as "locations") and objects. The spatial hierarchy includes an ordered sequence of levels ranging from a top level to a bottom level. Each of the places in a successive one of the levels of the spatial hierarchy is contained in a respective one of the places in a preceding one of the levels. Each of the objects in the spatial hierarchy is contained in a respective one of the places. The levels of the spatial hierarchy typically are associated with respective visualizations that are consistent with a geographical, architectural, or urban metaphor, and are labeled accordingly. The zones of each virtual area are defined by respective meshes, some of which define elements of a physical environment (e.g., spaces, such as rooms and courtyards, that are associated with a building) that may contain objects (e.g., avatars and props, such as view screen objects and conferencing objects).

The navigational controls of the seeker interface allow the user to traverse a path through the virtual environment in accordance with a navigational model that is tied to the underlying spatial hierarchy of places and objects. The network infrastructure service environment 30 records the path traversed by the user. In some embodiments, the network infrastructure service environment 30 records a history that includes a temporally ordered list of views of the virtual area that are presented to the user as the user navigates through the virtual area. Each view typically corresponds to a view of a respective renderable zone of the virtual area. In these embodiments, the navigation controls enable the user to move to selected ones of the zones in the history. The navigation controls also include a graphical representation of a depth path that shows the location in the spatial hierarchy that corresponds to the user's current view of the virtual area. In some embodiments, the graphical representation of the depth path includes a respective user-selectable link to a respective view of each of the preceding levels in the spatial hierarchical model of the virtual area above the current view.

The interaction controls of the seeker interface allow the user to manage interactions with other communicants. The interaction options that available to the user typically depend on the zones in which the user has a presence. In some embodiments, the interaction options that are available to communicants who have presence in a particular zone are different from the options that are available to other communicants who do not have presence in that zone. The level of detail and interactivity of the user typically depend on whether or not the user has a presence the particular zone. In one exemplary embodiment, if the user is outside the virtual area, the user is provided with a minimal level of detail of the interactions occurring within the virtual area (e.g., the user can see an outline of the floorplan, background textures, and plants of the area, but the user cannot see where other communicants are present in the area); if the user is within the virtual area but outside a particular zone of the area, the user is provided with a medium level of detail of the interactions occurring within the particular zone (e.g., the user can see where other communicants are present in the area, see a visualization of their current states—talking, typing a chat message, whether or not their headphones and microphones are turned-on—and see whether any of the view screens are active); if the user is within the particular zone of the area, the user is provided with full level of detail of the interactions occurring with the particular zone (e.g., the user can see a thumbnail of the file being shared on a view screen, hear and speak with other communicants in the area, and see elements of a log of chat messages that were generated by communicants in the zone). In some embodiments, the switching and governance rules that are associated with the zones of the virtual area control how the network infrastructure services distinguish between those who have presence in the particular zone from those who do not.

B. Navigating and Interacting in a Spatial Virtual Communication Environment

1. Basic Navigation and Interaction Model

Figure 5:
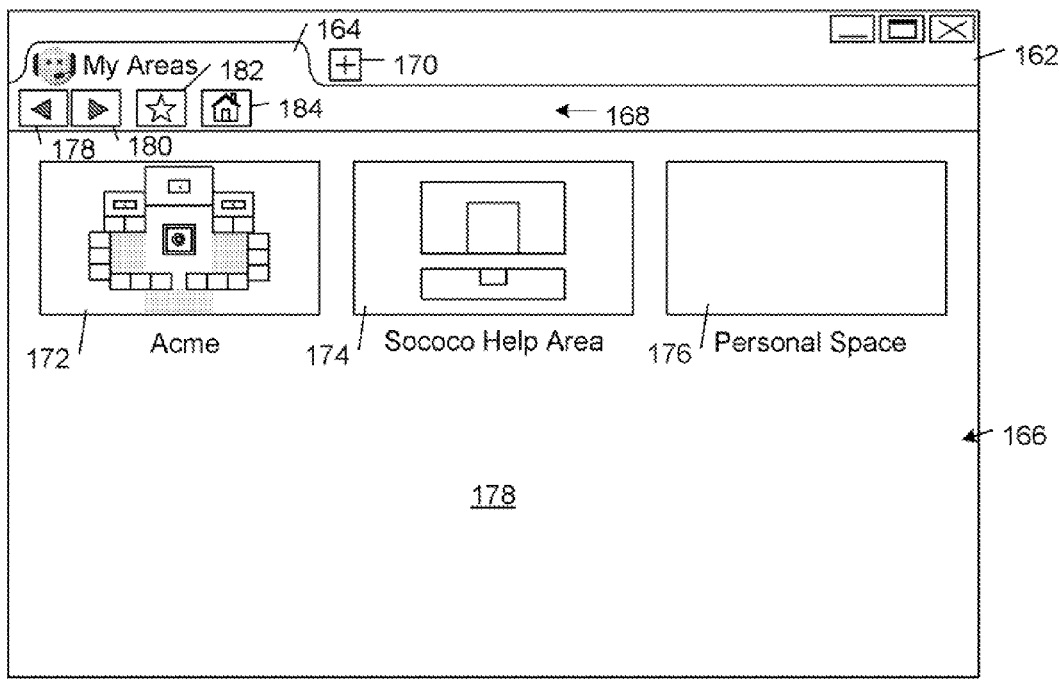
FIG. 5 is a diagrammatic view of an embodiment of a graphical user interface.

FIG. 5 shows an embodiment 160 of the seeker interface that is displayed in a window 162 and includes one or more tabs 164, each of which has a browsing area 166 and a toolbar 168.

Each of the tabs 164 typically is associated with a respective view of the virtual environment. In the illustrated embodiment, the view presented in the tab 164 (labeled "My Areas") is associated with a respective set of virtual areas, which may be a default set of virtual areas in the virtual environment or it may be a set of virtual areas that is identified by a respective filter on the interaction database. In particular, the tab 164 is associated with a set of three virtual areas (i.e., Acme, Sococo Help Area, and Personal Space), which may be a default set of areas that are associated with the user or may be identified by a filter that identifies all of the areas that are associated with the user (e.g., all of the areas in which the user has interacted). Additional tabs may be created by selecting the "+" button 170.

The browsing area 166 of each tab shows graphic representations of the elements of the virtual environment that are associated with the tab. For example, in the illustrated embodiment, the browsing area 166 shows top-level views 172, 174, 176 of the virtual areas that are associated with the tab 164. The user may navigate to the next lower level in the spatial hierarchical model of any of the virtual areas by selecting the corresponding graphic representation of the virtual area.

The toolbar 168 includes an adaptive set of navigational and interaction tools that automatically are selected by the seeker interface based on the current location of the user in the virtual environment. In the illustrated embodiment, the toolbar 168 includes a back button 178, a forward button 180, a placemarks button 182, and a home button 184. The back button 178 corresponds to a backward control that enables the user to incrementally move backward to preceding ones of the zones in the history of the zones that were traversed by the user. The forward button 180 corresponds to a forward control that enables the user to incrementally move forward to successive ones of the zones in the history of the zones that were traversed by the user. The placemarks button 182 provides a placemarking control for storing links to zones and a placemark navigation control for viewing a list of links to previously placemarked zones. In response to a user selection of the placemarking control, a placemark is created by storing an image of the location shown in the current view in association with a hyperlink to the corresponding location in the virtual area. In response to a user selection of the placemark navigation control, a placemarks window is presented to the user. The placemarks window includes live visualizations of all locations that have been placemarked by the user. Each of the images in the placemarks window is associated with a respective user-selectable hyperlink. In response to user selection of one of the hyperlinks in the placemarks window, a view of the virtual area corresponding to the location associated with the selected hyperlink is automatically displayed in the browsing area 166 of the seeker interface window 162. The home button 184 corresponds to a control that returns the user to a view of a designated "home" location in the virtual environment (e.g., the view shown in FIG. 5).

Figure 6:
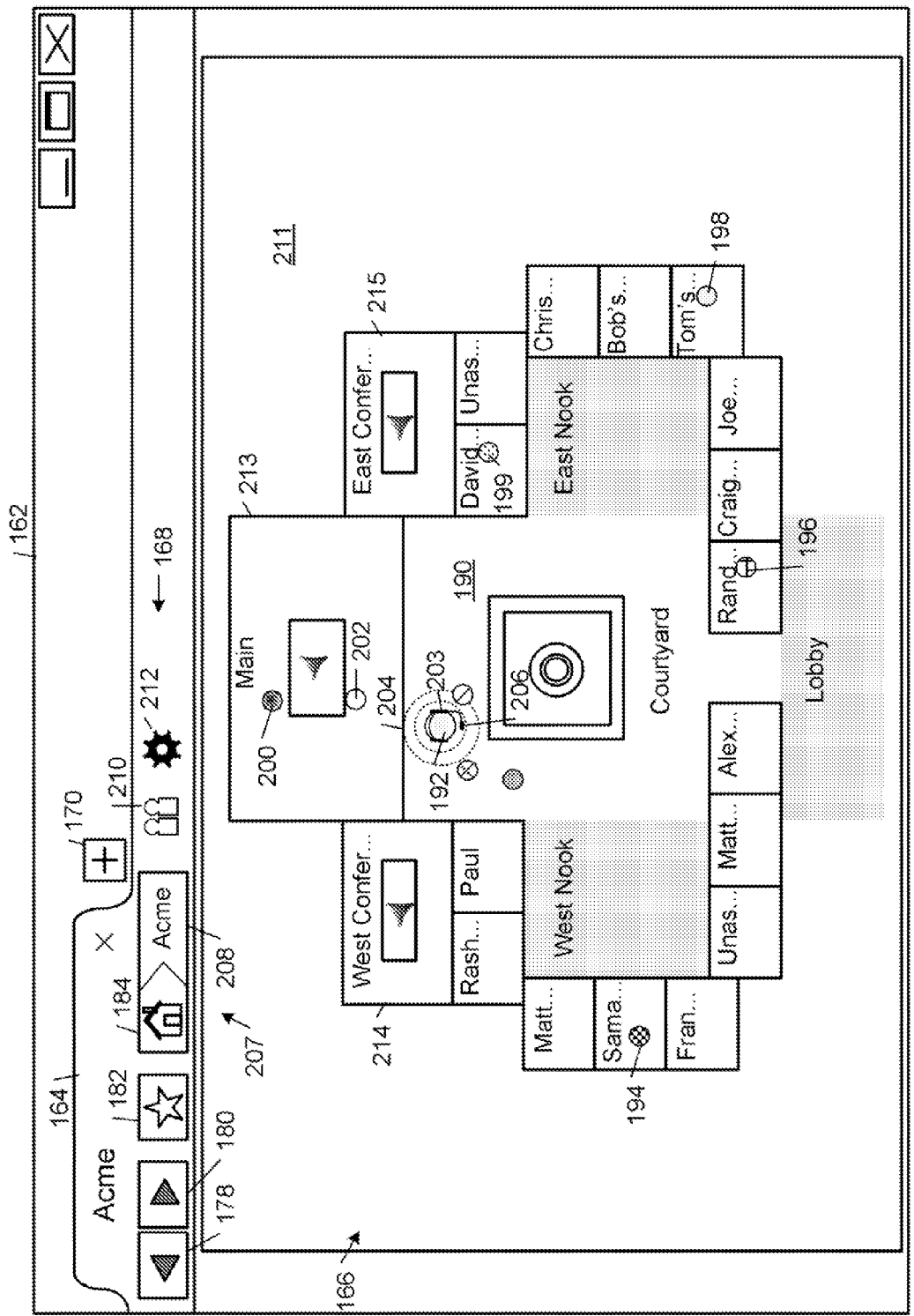
FIG. 6 is a diagrammatic view of an embodiment of a graphical user interface.

Referring to FIG. 6, in response to a user selection of the graphic representation 172 of the Acme virtual area shown in FIG. 5, the platform moves the user into a default zone of the virtual area, automatically establishes a presence for the user in the default zone, and automatically establishes a network connection between the user and each of the other communicants occupying the selected zone. Based on the switching rules established by the area designer, the platform multiplexes the specified realtime data streams (e.g., streams from the microphones and speakers) of all the communicants in default zone such that they can both see each others' sprites or avatars and communicate with (e.g., speak to and hear) each other.

The seeker interface shows a top or floorplan view of the Acme virtual area in the browsing area 166 of the tab 164 and provides the user with a default set of interaction options. In the illustrated embodiment, a presence automatically is established in a courtyard zone 190 of the virtual area, and the user's microphone and default speakers (e.g., headphones) are turned-on. In the floorplan view shown in FIG. 6, the user is represented by a circular sprite 192; the other users in the Acme virtual area also are represented by respective circular sprites 194-202. The state of the user's speakers is depicted by the presence or absence of a headphones graphic 203 on the user's sprite 192: when the speakers are on, the headphones graphic 203 is present and, when the speakers are off, the headphones graphic 203 is absent. The state of the user's microphone is depicted by the presence or absence of a microphone graphic 206 on the user's sprite 192 and a series of concentric circles 204 around the user's sprite 192: when the microphone is on, the microphone graphic 206 and the concentric circles 204 are present and, when the microphone is off, the microphone graphic 206 and the concentric circles 204 are absent. The headphones graphic 203, the concentric circles 204, and the microphone graphic 206 serve as visual reminders of the states of the user's sound playback and microphone devices.

In addition to the backward button 178, the forward button 180, the placemarks button 182, and the home button 184, the toolbar 168 also includes a series of one or more breadcrumb buttons 207 that originate from and include the home button 184. The breadcrumb buttons 207 correspond to a hierarchical sequence of successive, user-selectable links. Each of the successive links corresponds to a view of a respective level in the hierarchical model of the virtual area in which each successive level is contained by preceding ones of the levels. In the illustrated embodiment, the breadcrumb buttons 207 include the home button 184 and an Acme button 208 that corresponds to the current view of the Acme virtual area shown in FIG. 6. The breadcrumb buttons 207 provide the user with single button selection access to respective views of different levels of the virtual environment. The toolbar 168 additionally includes a button 210 and a settings button 212.

When an area is selected or in focus, the button 210 appears as an iconographic representation of two people and is labeled "members," and allows members and moderators to see the list of people associated with an area. When an audio or chat zone is in focus, the button 210 has a different image (e.g., an image of an arrow pointing downward onto a plane to represent the operation of getting) and is labeled "get". In response to a user selection of the button 210, a list of all the members of the Acme virtual area 166 is displayed in a user interface. The user may select any of the communicants in the list and click a get button that is presented in the user interface; in response, the platform transmits an invitation to the selected communicant to join the user in a designated one of the zones.

The settings button 212 provides the user with access to a set of controls for specifying default settings that are associated with the current area.

The user may navigate from the view of the Acme virtual area shown in FIG. 6 back to the view shown in FIG. 5 in a variety of different ways. For example, the user may select any of the back button 178, the home button 184, or any part of the zone 211 that is outside the boundary of the graphic representation of the Acme virtual area shown in FIG. 6.

The user may navigate to any of the zones of the Acme virtual area. In some embodiments, in order to move to a zone, the user transmits a command to execute one of the zones displayed on the monitor, (e.g., by selecting the zone and then clicking the Enter button (in the toolbar), or, as a shortcut, double-clicking the zone) and, in response, the platform depicts the user's avatar in the zone corresponding to the zone object. In response to the zone execution command, the seeker interface outlines the zone (indicating to the user that it is selected) and updates the breadcrumb buttons 207 to show the selected zone location in the hierarchy. Toolbar buttons specific to the selection will also appear to the right of the breadcrumb buttons 207.

The user also may interact with any objects (e.g., a screen, table, or file) that are present in a zone. In some embodiments, in order to interact with an object, the user transmits a command to execute one of the objects displayed on the monitor, (e.g., by selecting the object and then clicking the View button (in the toolbar), or, as a shortcut, double-clicking the object) and, in response, the platform performs an operation with respect to the object (e.g., present a zoomed-in view of the object, open an interaction interface window, etc.). In response to the object execution command, the seeker interface outlines or otherwise highlights the prop (indicating to the user that it is selected) and updates the breadcrumb buttons 207 to show the selected object location in the hierarchy. Toolbar buttons specific to the selection will also appear to the right of the breadcrumb buttons 207.

Figure 7:
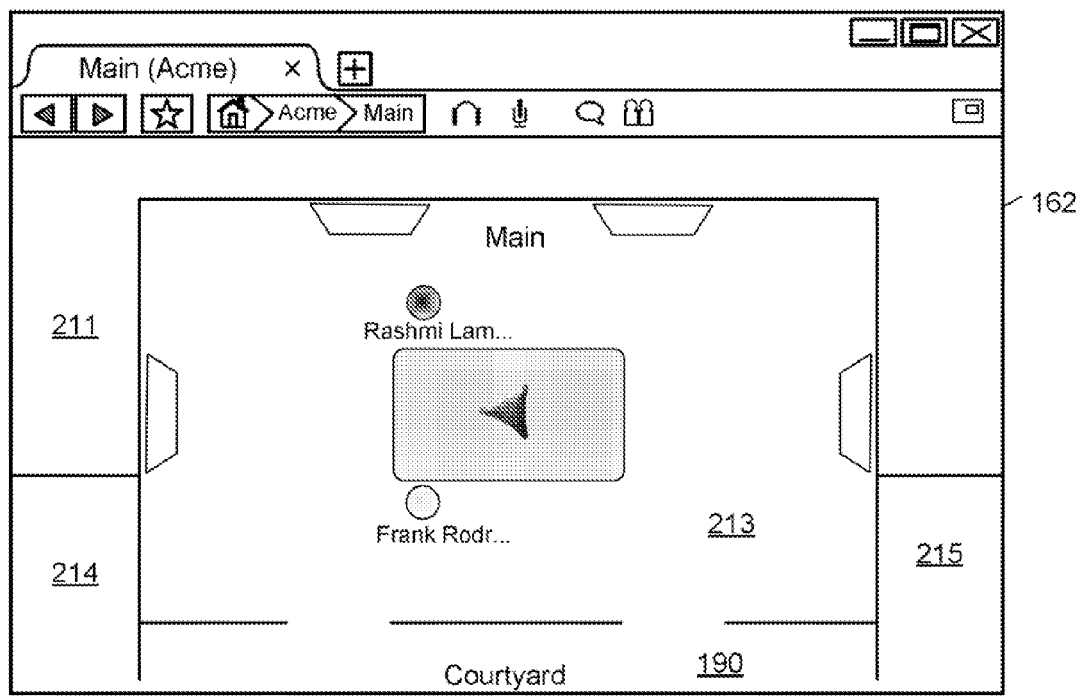
FIG. 7 is a diagrammatic view of an embodiment of a graphical user interface.
Figure 8:
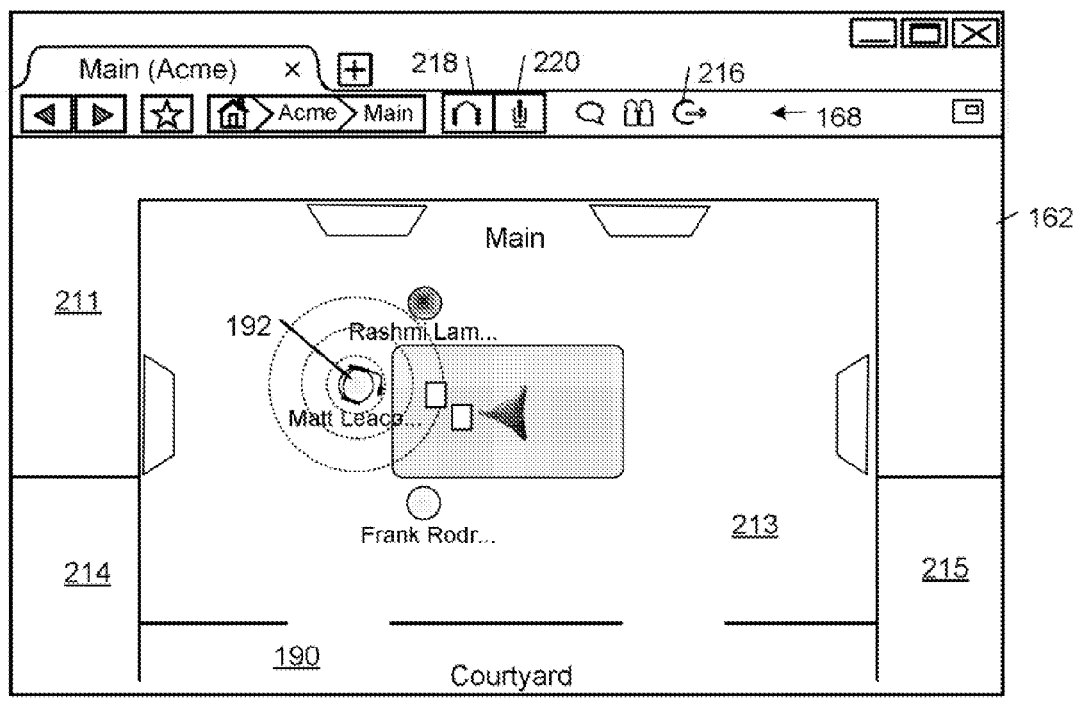
FIG. 8 is a diagrammatic view of an embodiment of a graphical user interface.

As shown in FIG. 7, in some embodiments, in response to the user entering a Main space 213, the platform automatically establishes a network connection between the user and each of the other communicants occupying the selected zone. The user also may enter (and thereby establish a presence in) a space by selecting the space and clicking the Enter button; this causes the platform to move the user's sprite from its current location (i.e., Courtyard) to the selected space (i.e., Main) (see FIG. 8). The settings of user's speakers and microphone typically do not change when the user is moved from one location to another.

Figure 9:
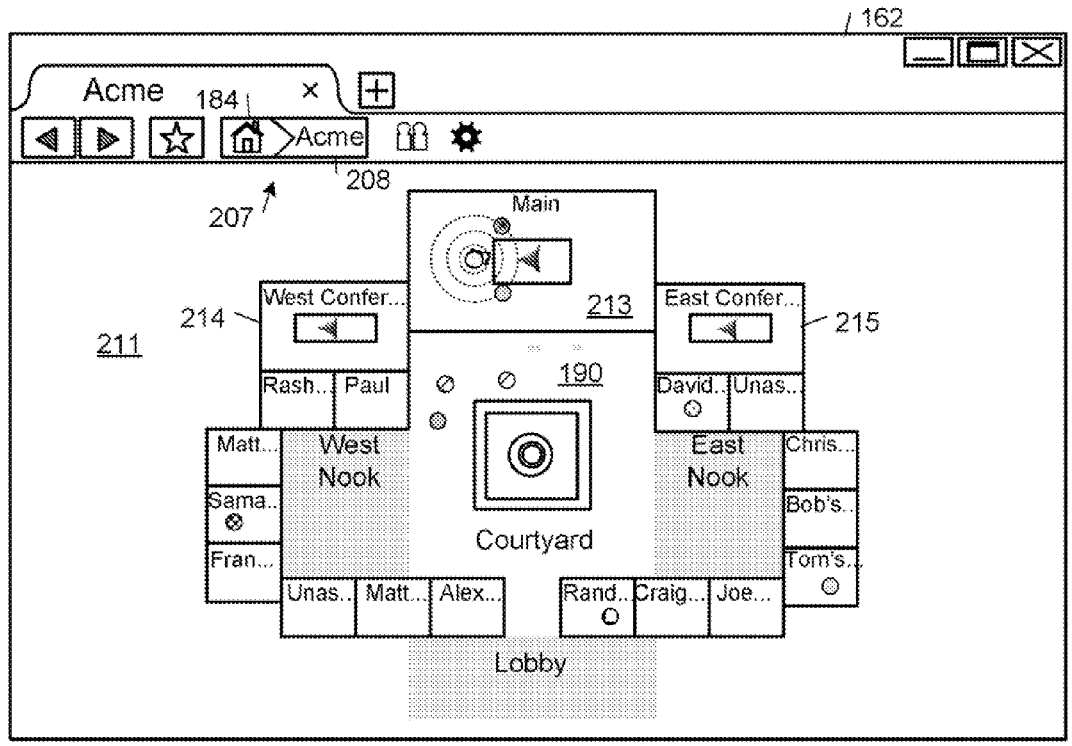
FIG. 9 is a diagrammatic view of an embodiment of a graphical user interface.
Figure 10:
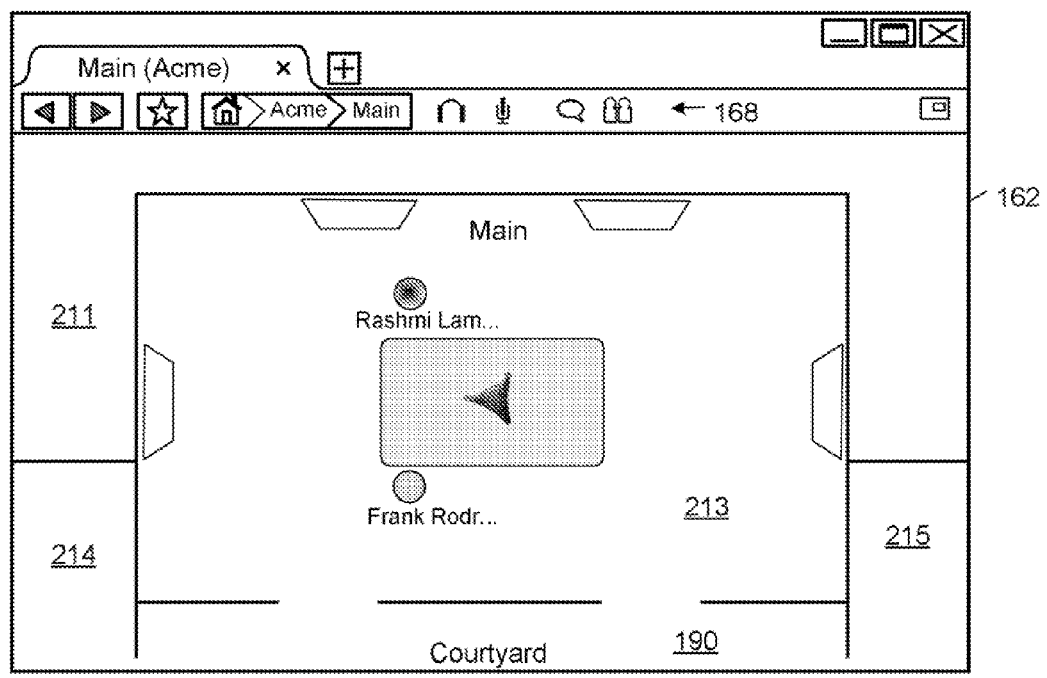
FIG. 10 is a diagrammatic view of an embodiment of a graphical user interface.

After the user has moved into the Main space 213 (see FIG. 8), the user may navigate to a different view of the virtual area by inputting a command to execute (typically double-clicking) any part of the current view surrounding the Main space 213. For example, in response to a user double-clicking of any part of the zone 211 that is outside the boundary of the Main space 213 and the Acme virtual area, the seeker interface displays the zoomed-out view of the Acme virtual area that is shown in FIG. 9. The user also may navigate to a different view of the virtual area by selecting another space in the virtual area (e.g., the West Conference space 214, the East Conference space 215, or the Courtyard space 190) and by clicking Enter, by double-clicking the zone, or by selecting one of the breadcrumb buttons 207 (e.g., the Acme breadcrumb button 208).

In some embodiments, navigating to a different view changes the user's presence state, whereas panning and zooming only changes the user's view state. In some cases, navigating will also change view state as a convenience to the user. The following examples illustrate this interface feature.

Example 1: User is in the Courtyard, selects Main, and clicks the Enter button (or double-clicks Main). The user is now present in the Main space and is no longer present in the Courtyard space. The user's view of the map doesn't change except to paint his avatar in his new position (and any other changes that relate to the capabilities he now has because of his new location).

Example 2: User is in Main, selects a Viewscreen, and clicks View (or double-clicks the Viewscreen). The user continues to be present in Main. The user's seeker window updates to show the contents of the Viewscreen.

In other embodiments, the navigation to a different view does not affect the presence of the user in the Main space 213.

Referring back to FIG. 8, in response to the context change resulting from the user's entry into the Main space 213, the toolbar 168 automatically is modified to include a leave button 216. In response to a user selection of the leave button 216, the user's presence in the Main space 213 is terminated and the user's avatar 192 is removed from the Main space 213, as shown in FIG. 9. After the user has left the Main space 213, the leave button 216 automatically is removed from the toolbar 168 because it is no longer relevant in the current selection.

Figure 11:
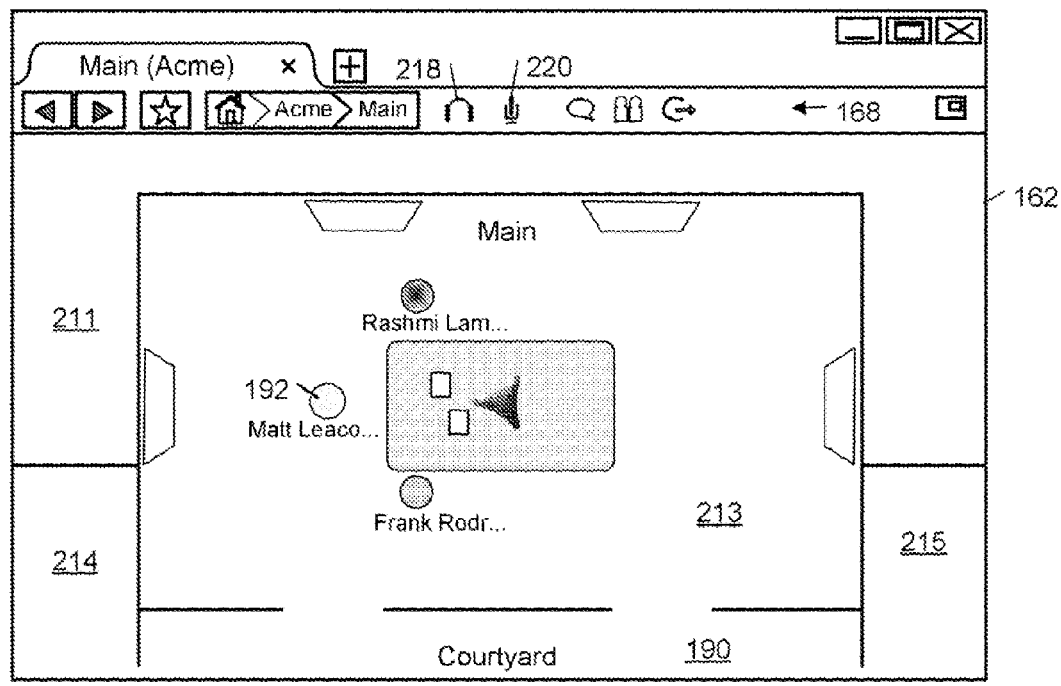
FIG. 11 is a diagrammatic view of an embodiment of a graphical user interface.

After the user has moved into the Main space 213 (see FIG. 8), the user may toggle one or both of the headphones button 218 and the microphone button 220 in order to selectively turn-on and turn-off one or both of the user's speakers and microphone. As shown in FIG. 11, the headphones graphic 203, the concentric circles 204 around the user's sprite 192, and the microphone graphic 206 on the user's sprite 192 are omitted when the user's speakers and microphone both are turned-off.

2. Chat Interaction Model

Figure 12:
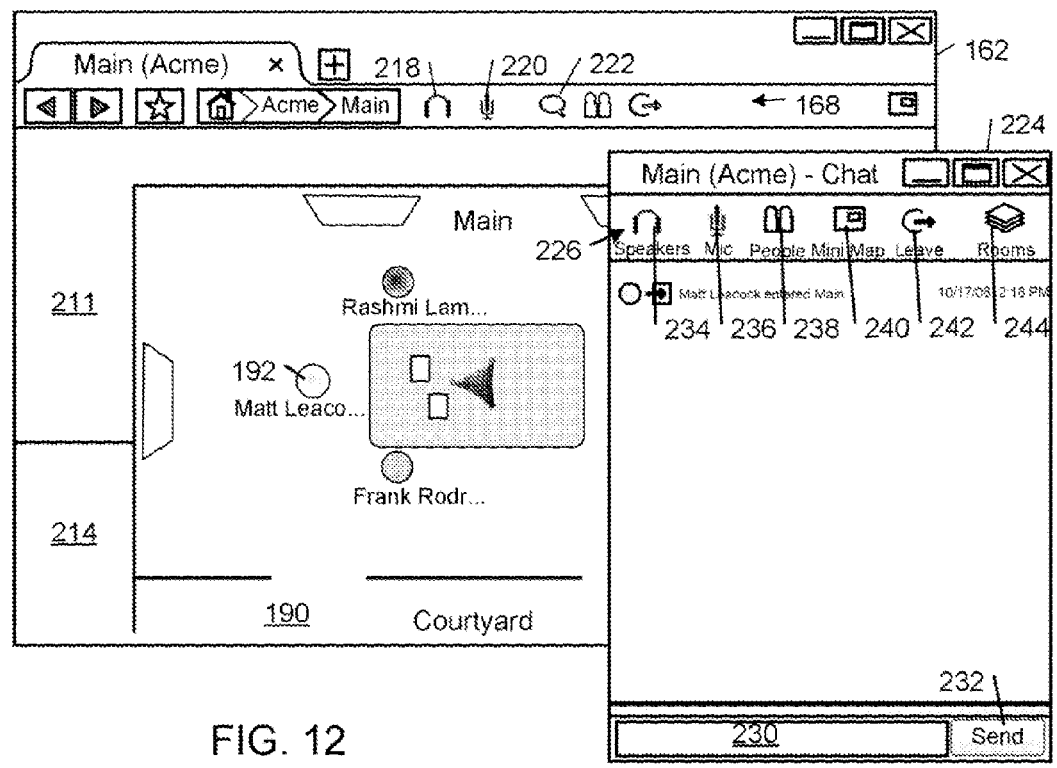
FIG. 12 is a diagrammatic view of an embodiment of a graphical user interface.
Figure 13:
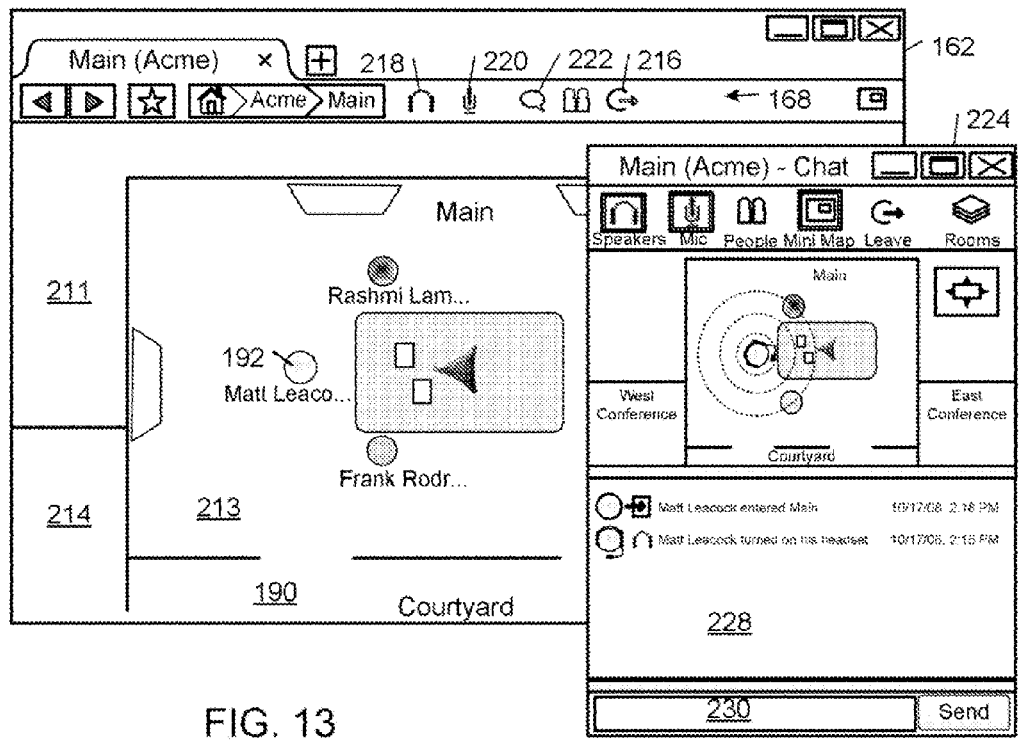
FIG. 13 is a diagrammatic view of an embodiment of a graphical user interface.
Figure 14:
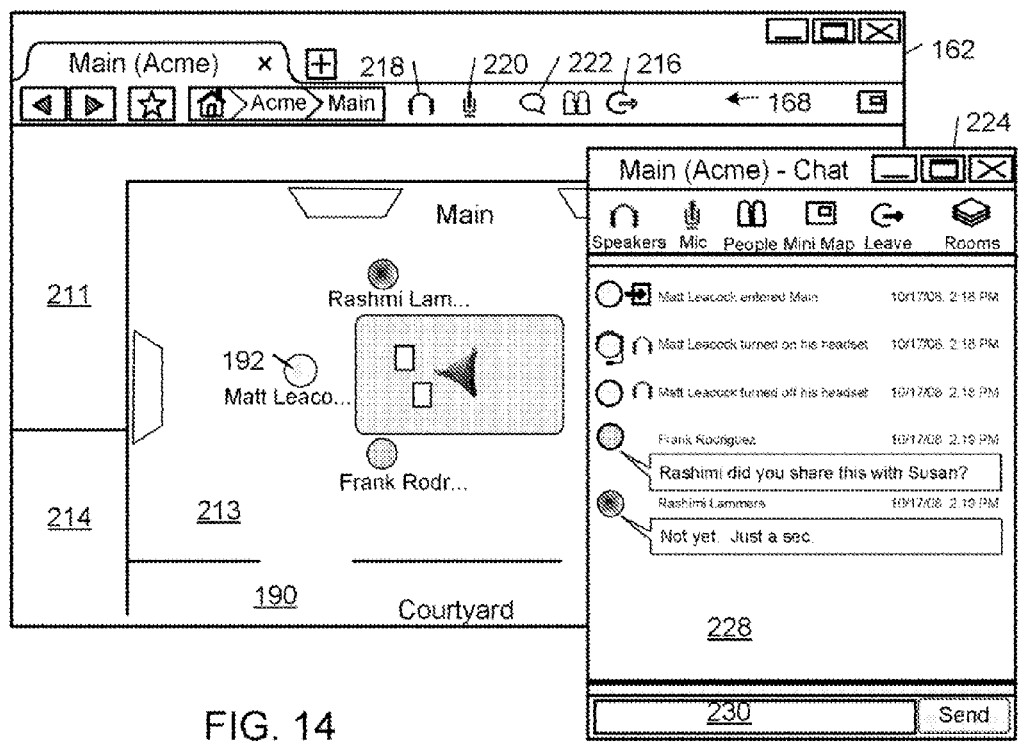
FIG. 14 is a diagrammatic view of an embodiment of a graphical user interface.

Referring to FIG. 12, the user may initiate a chat with the communicants in the zone by selecting a chat button 222 in the toolbar 168. In response to a user selection of the chat button 222, a separate chat window 224 is opened. The chat window 224 includes a toolbar 226, a chat log area 228, a text box 230, and a Send button 232. The toolbar 226 includes an independent set of navigation and interaction control buttons, including a headphones button 234 for toggling on and off the user's speakers, a microphone button 236 for toggling on and off the user's microphone, a get button 238 for getting people (discussed above), a minimap button 240 for opening a minimap view (discussed below), a leave button 242 for leaving the current zone (discussed above), and a rooms button 244 for opening a separate navigation interface window that displays a list of spaces (e.g., rooms) in the virtual area (discussed below). As shown in FIGS. 12-14, the chat log area 228 displays a log of events that are associated with the currently active space (i.e., Main) and sequences of text messages that the user has exchanged with other communicants in the currently active space (i.e., Main). An exemplary set of events that are recorded in the chat log area 228 include changes in the presence status of communicants in the currently active space and changes in the speaker and microphone settings of the communicants in the currently active space. The user may enter text messages in the text box 230 and transmit the text messages to the other communicants in the currently active space by selecting the Send button 232. In some embodiments, the communicants in a particular room zone send their chat message to all other communicants in a separate chat zone (which often shares a similar boundary with the room zone). In this way, a given room can have more than one chat zone and a chat zone can span more than one room if the needs of the application require it.

Figure 15:
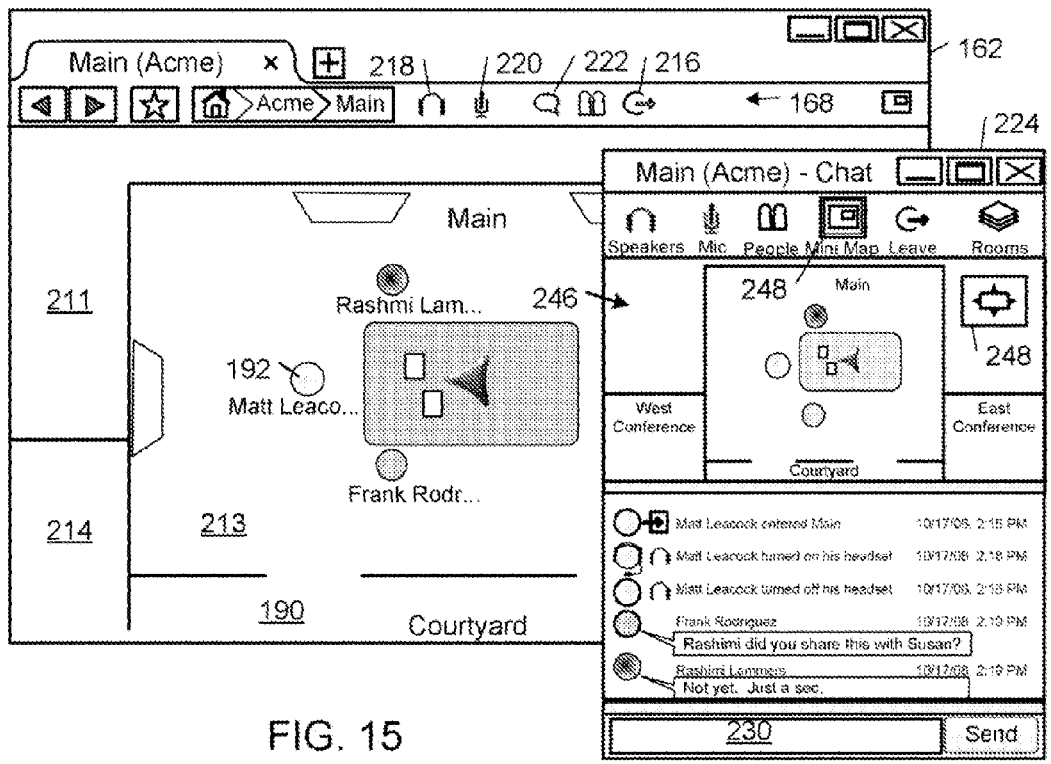
FIG. 15 is a diagrammatic view of an embodiment of a graphical user interface.

As shown in FIG. 15, the user may toggle the minimap button 240 in the chat window 224 to open a minimap 246 that shows a view of the currently active space in the chat window 224. The minimap view 246 shows a view of the currently active area (i.e., the Main space 213) as well as adjacent areas of the virtual area. The minimap 246 provides the same type of navigation functionality as the browsing area 166 of the tab 164. For example, the user may inputting a command to execute (typically by double-clicking) a space represented in the minimap 246 to navigate to the corresponding space of the virtual area; and the user also may inputting a command to execute (typically by double-clicking) a region surrounding the currently presented space in order to navigate to a view of the next higher level in the hierarchical spatial model of the virtual area. The minimap 246 also includes an open in seeker button 248 for opening the currently selected zone in the seeker window.

Figure 16:
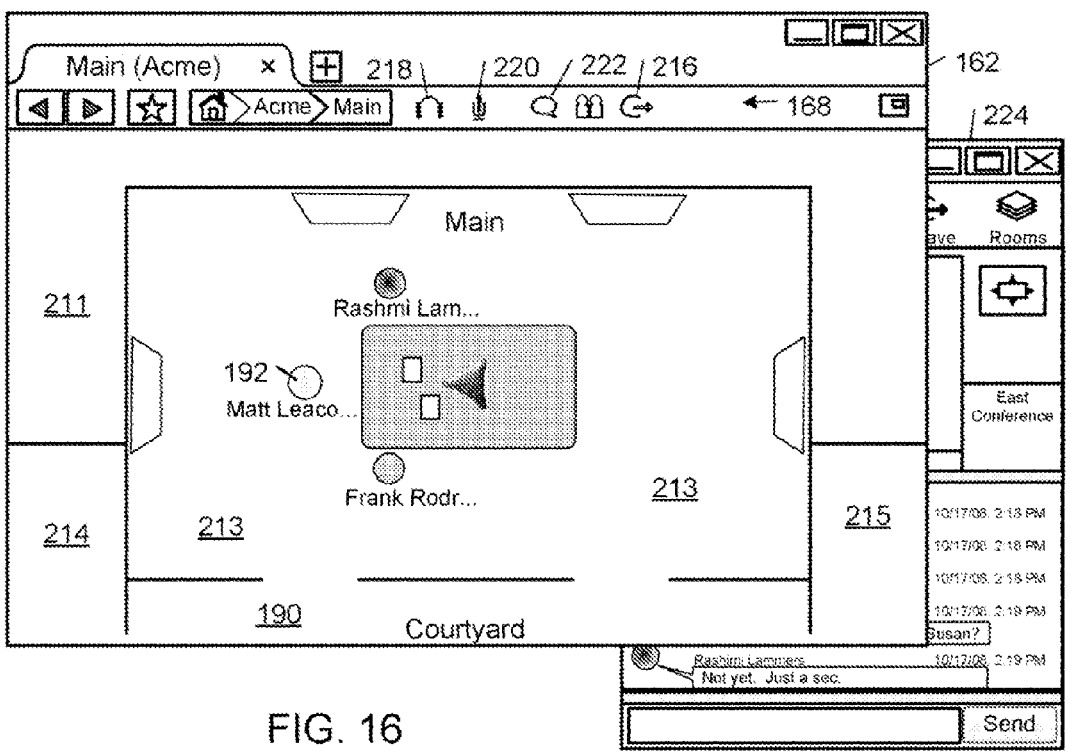
FIG. 16 is a diagrammatic view of an embodiment of a graphical user interface.
Figure 17:
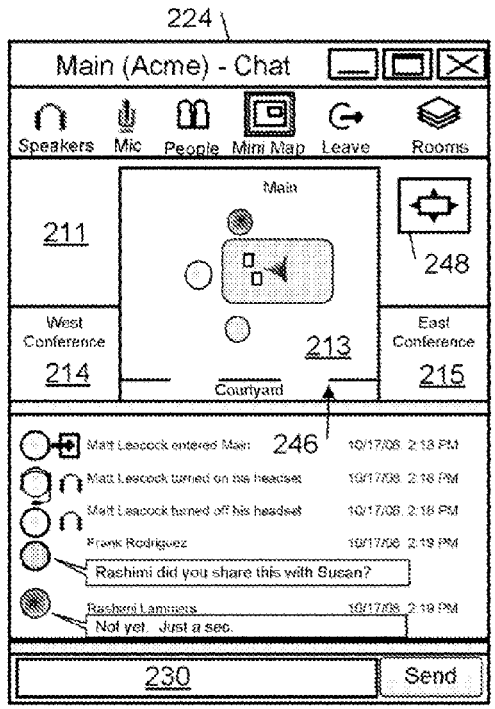
FIG. 17 is a diagrammatic view of an embodiment of a graphical user interface.
Figure 18:
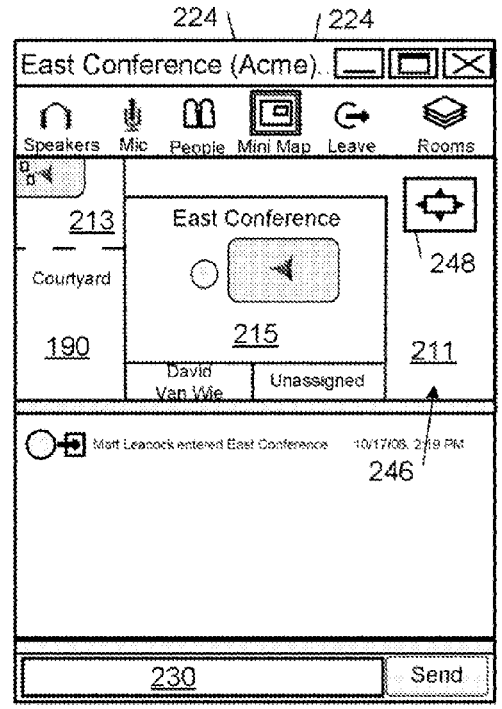
FIG. 18 is a diagrammatic view of an embodiment of a graphical user interface.

Referring to FIGS. 16-18, the chat window 224 is separate and distinct from the seeker interface window 168. The chat window 224 can overlap the seeker interface window 168 (FIG. 15) and vice versa (FIG. 16). The seeker interface window 168 can be closed, and the user can continue to interact with other communicants (FIG. 17) and navigate to other spaces in the virtual area (FIG. 18) using the interface controls available through the chat window 224. FIG. 18 shows the situation in which the user has navigated to a view of the East Conference space 215 by double-clicking on the corresponding region of the minimap 246, and the platform has established a presence for the user in the East Conference space 215.

3. Get Interaction Model

Figure 19:
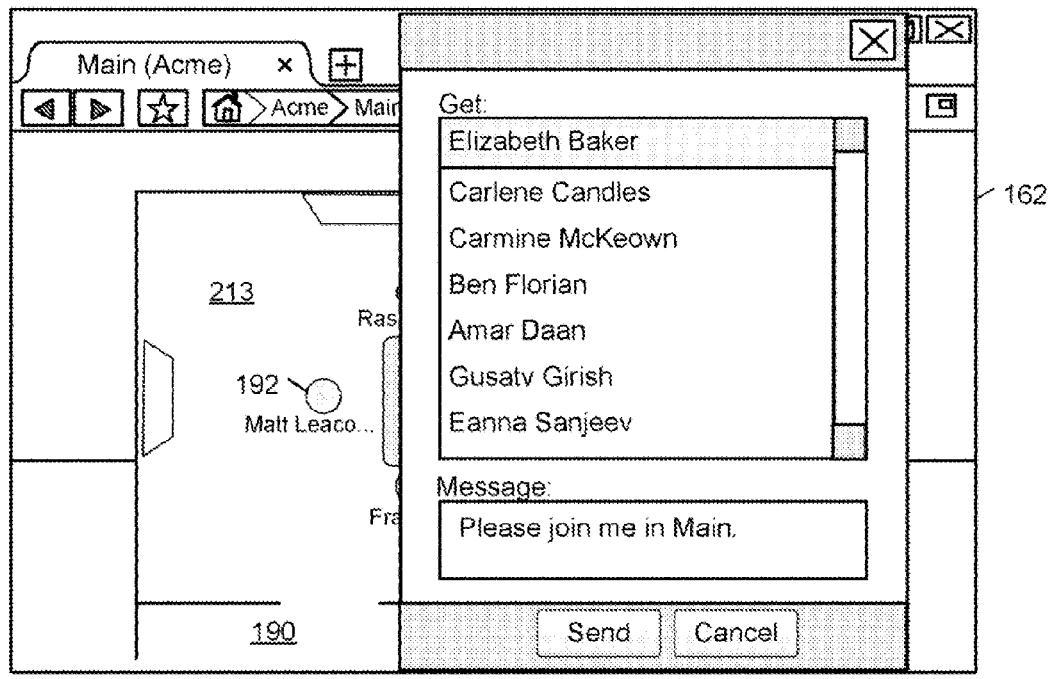
FIG. 19 is a diagrammatic view of an embodiment of a graphical user interface.

Referring to FIG. 19, in response to a user selection of the get button 210, a list of available communicants is displayed in a separate pop-up window 250. The get button 210 is presented in association with a respective one of the zones in which the user has presence. In response to a user selection of one of the communicants in the list of available communicants, the platform transmits an invitation to the selected communicant to join the user in the respective zone. For example, FIG. 19 shows a situation in which the get button 210 is presented in association with the Main space (where the user has a presence). The user has selected "Elizabeth Baker" in the list of available communicants displayed in the window 250. In response to the selection of the Send button 251, the platform transmits an invitation to the communicant associated with the name Elizabeth Baker to join the user in the Main space 213 (e.g., "Please join me in Main.").

4. Contacts Window

In some embodiments, the seeker interface additionally includes a contacts window that has a get button and a list of contacts that are associated with the user, along with an indication of respective ones of the zones in which the contacts have presence. The user can select one or more of the contacts in the list and, in response to a user selection of the get button, the system transmits an invitation to each of the selected contacts to join the user in a respective one of the zones in which the user has presence.

In some embodiments, the graphic representations of the other communicants in a space are selectable like other objects. For example, in response to a user selection of one of the graphical representations of the other communicants, the seeker interface displays a contacts window that contains information and user-selectable controls relating to the communicant associated with the selected graphical representation. The user selectable controls include a mute button that enables the user to selectively mute audio signals received from the communicant associated with the selected graphical representation.

Figure 20:
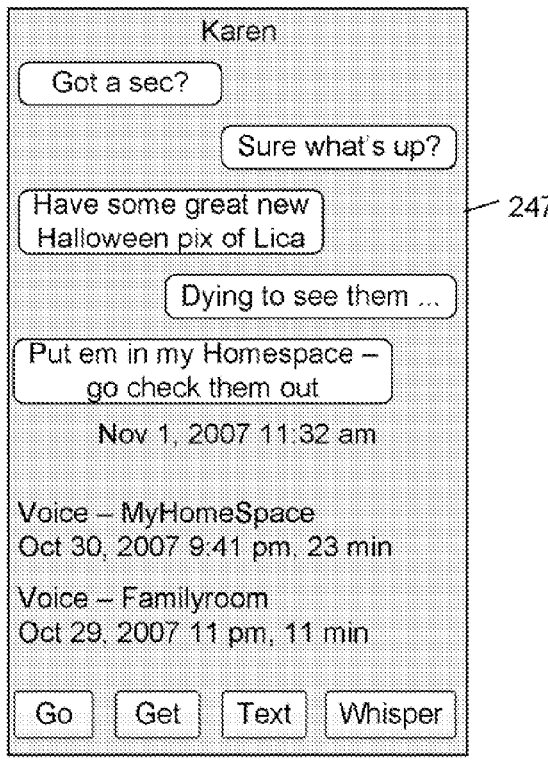
FIG. 20 is a diagrammatic view of an embodiment of a graphical user interface.

FIG. 20 shows an exemplary contacts window 247 that allows a user to view his or her communication history with any of his or her realtime contacts. In response to the positioning of a mouse pointer over the contact's avatar, the platform opens the contacts window 247, which displays all the recent communications history with that communicant (e.g., text chat, voice conversations, files shared etc). In the illustrated embodiment, the interface contains a recent text chat with Karen in which the messages between the user and Karen are listed vertically in chronological order, with the user's messages displayed in left-shifted message blocks and Karen's messages displayed in right-shifted message blocks. The interface also displays the basic methods for connecting with another user on Sococo:

Go—takes the user to the place where that contact is

Get—brings that communicant into the place the user is in

Text—sends an instant message

Whisper—sends a short voice message (scrap of voice) that is mixed into a contact's headset such that only the contact can hear it. The HUD shows the user where the contact is and what the contact is doing and, thereby, provides the user with useful context information that can inform the user's selection of the content of the voice message.

The platform typically includes smart defaults such that the user can Go or Get people that the user communicates with continuously, but might have to ask permission to Go to or Get a communicant that is a more casual contact. Additional details regarding the construction and operation of embodiments of this type are contained in U.S. Patent Application No. 61/042,714, filed Apr. 4, 2008 (see, e.g., § VII entitled "HEADS-UP DISPLAY").

5. Minimap Navigation and Interaction

Figure 21:
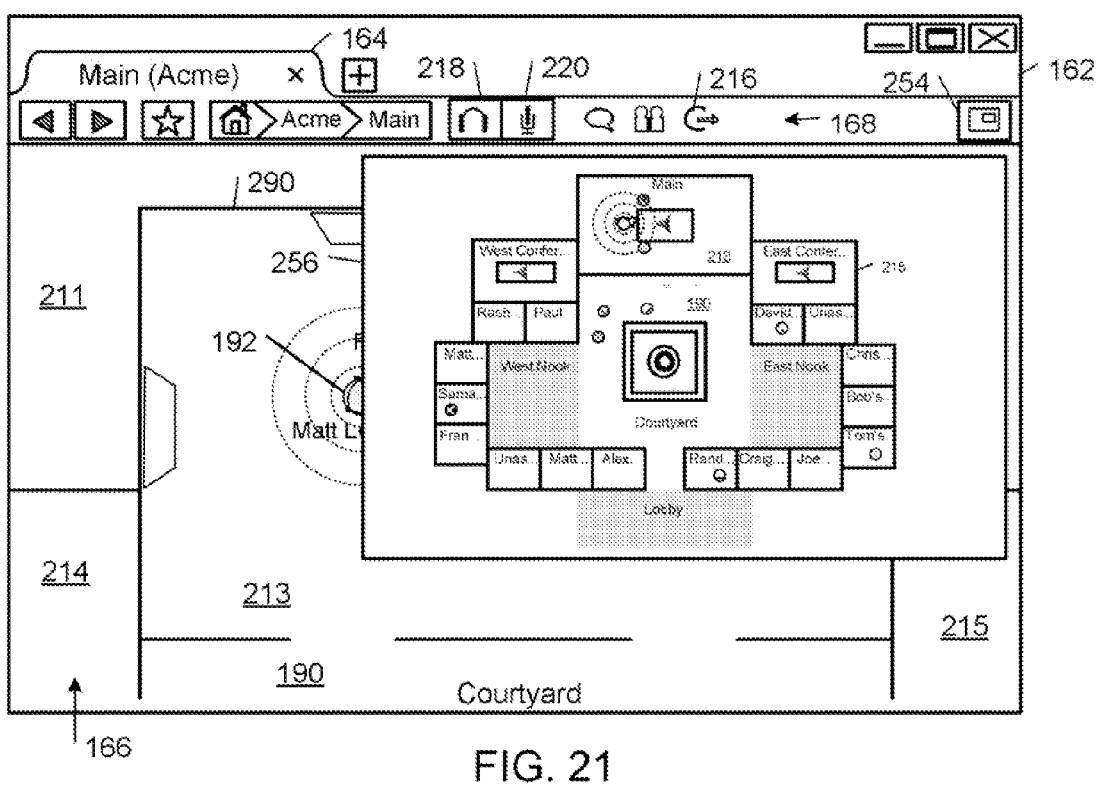
FIG. 21 is a diagrammatic view of an embodiment of a graphical user interface.

Referring to FIG. 21, in addition to the controls described above, the toolbar 168 also includes a minimap button 254. The user may select the minimap button 254 to open a minimap 256 that is overlaid on the view of the currently active space. The minimap 256 shows a view of the virtual area from a perspective that is one level higher in the hierarchical spatial model of a virtual area above the current view that is presented in the browsing area 166 of the tab 164. In the exemplary situation shown in FIG. 21, the currently active space is the Main space 213 and the view shown in the minimap 256 corresponds to the floorplan view of the Acme space, which is the next higher level in the hierarchical spatial model of the virtual area above the view of the Main space 213 shown in the browsing area 166. Every pixel in the minimap 256 is associated with a respective reference to a corresponding location in the view shown in the minimap 256. In response to a user inputting a command to execute (typically by double-clicking) of any part of the minimap 256, the seeker interface presents a view of the corresponding location in the browsing area 166 of the tab 164 and (if the target is a zone, moves the communicant to that new location). Thus, the user can double-click on any part of the West Conference space 214, the Courtyard space 190, the East Conference space 215, etc., and the seeker interface will present in the browsing area 166 a view of the selected space along with surrounding areas of the virtual area immediately adjacent the selected space and move the user's presence there.

The user also can select any of the objects in the currently active area, and the minimap 256 will update the toolbar to show commands relevant to the selection.

Figure 22:
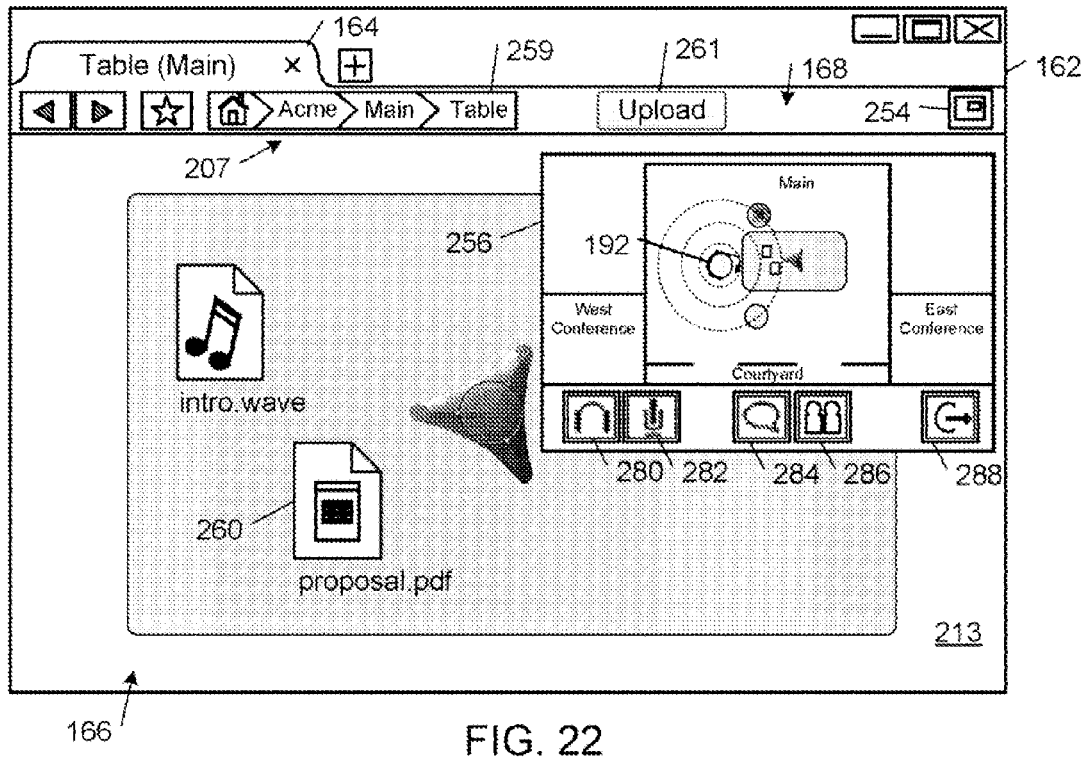
FIG. 22 is a diagrammatic view of an embodiment of a graphical user interface.

For example, FIG. 22 shows a situation in which the user has double-clicked a table object 258 in the view of the Main space 213 shown in FIG. 21. In response to the user's selection of the table object 258, the seeker interface presents in the browsing area 166 of the tab 164 a zoomed-in view of the table object 258 and the areas of the Main space 213 surrounding the table object 258. In addition, the seeker interface shows in the minimap 256 a view of the Main space 213 and the areas of the Acme space surrounding the Main space 213. The breadcrumb buttons 207 shown in the toolbar 168 of the tab 164 include a Table button 259 that corresponds to the current level in the hierarchical spatial model of the virtual area. The toolbar 168 also includes an upload button 261 that allows the user to upload a data file from the client node 12 to a repository that is maintained by the network infrastructure service environment 30. In response to a user selection of a data file to upload, the network infrastructure service environment 30 stores the uploaded file in the repository and creates a database record that associates the data file with the table object 258. Other communicants who enter the Main space 213 are able to view the contents of the uploaded data file and, subject to governance rules associated with the Main space 213, optionally may be able to modify or delete the data file.

Figure 23:
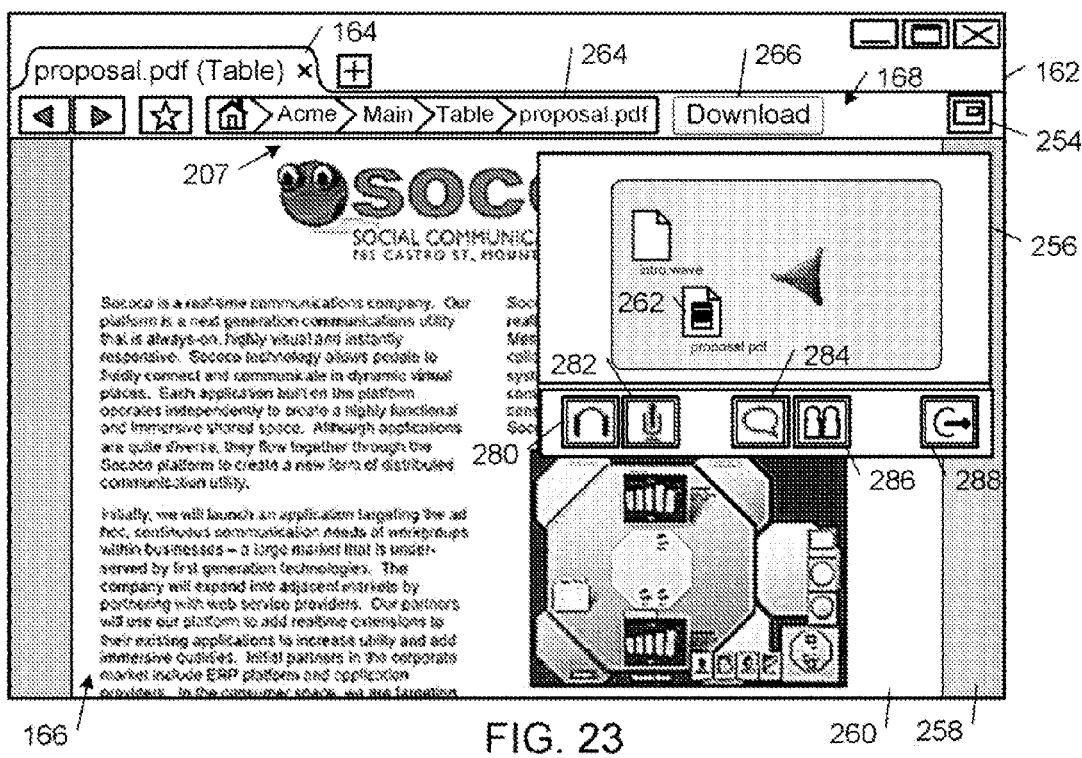
FIG. 23 is a diagrammatic view of an embodiment of a graphical user interface.

FIG. 23 shows a situation in which the user has selected a file object 260 on the table object 258 in the view of the Main space 213 shown in FIG. 21 and clicked View (or double-clicked the file object). In response to the user command, the seeker interface presents in the browsing area 166 of the tab 164 a zoomed-in view of the contents of the data file associated with the file object 260 and areas of the table object 258 surrounding the file object 260. In addition, the seeker interface shows in the minimap 256 a view of the table object 258 and areas of the Main space 213 surrounding the table object 258. The minimap 256 also shows a highlighted view 262 of the selected data file 260 on the table object 258. The breadcrumb buttons 207 shown in the toolbar 168 of the tab 164 include a proposal.pdf button 264 that corresponds to the current level in the hierarchical spatial model of the virtual area. The toolbar 168 also includes a download button 266 that allows the user to download the selected data file 260 from the repository that is maintained by the network infrastructure service environment 30 to the client node 12.

Figure 24:
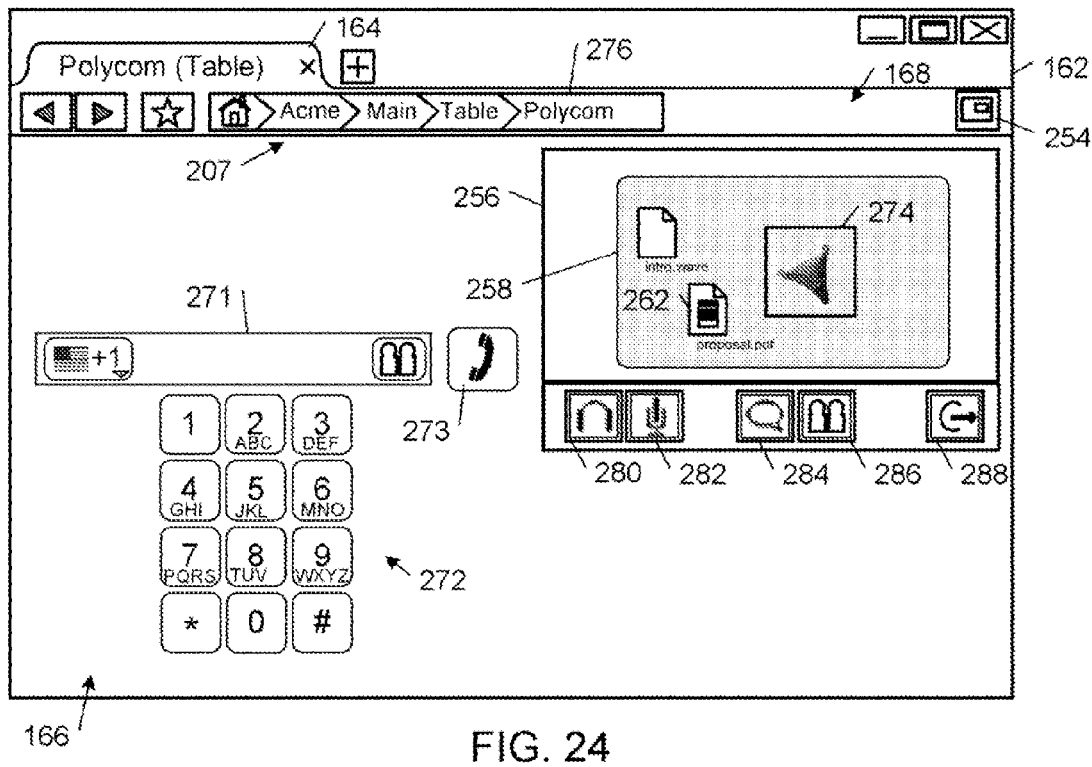
FIG. 24 is a diagrammatic view of an embodiment of a graphical user interface.

FIG. 24 shows a situation in which the user has double-clicked a conferencing object 270 on the table object 258 in the view of the Main space 213 shown in FIG. 21. In response to the user selection of the conferencing object 270, the seeker interface presents in the browsing area 166 of the tab 164 a view of a teleconferencing interface 272 and areas of the table object 258 surrounding the conferencing object 270. The teleconferencing interface 272 includes a text box 271 for receiving a telephone number and a dial button 273 for transmitting the telephone number to a telephony service that connects the client node 12 to a network node that is associated with the telephone number. The seeker interface also shows in the minimap 256 a view of the table object 258 and areas of the Main space 213 surrounding the table object 258. The minimap 256 also shows a highlighted view 274 of the selected conferencing object 270 on the table object 258. The breadcrumb buttons 207 shown in the toolbar 168 of the tab 164 include a Polycom button 276 that corresponds to the current level in the hierarchical spatial model of the virtual area.

As shown in FIGS. 21-24, at the room level of the hierarchical spatial model of the virtual area and lower, the minimap 256 is associated with the following interaction and navigation controls that operate as described above: a speakers button 280, a microphone button 282, a chat button 284, a get (or people) button 286, and a leave button 288.

In the embodiment shown in FIGS. 21-24, the minimap 256 is presented as a picture-in-picture view that is superimposed on the view of the successively lower view of the hierarchical spatial model of the virtual area that is presented in the browsing area 166 of the tab 164. In other embodiments, the minimap 256 may be presented in a separate and discrete window that may be tiled over or under the main window 162 or presented in a separate tab of the seeker interface window 162.

6. View Screen Objects

Figure 25:
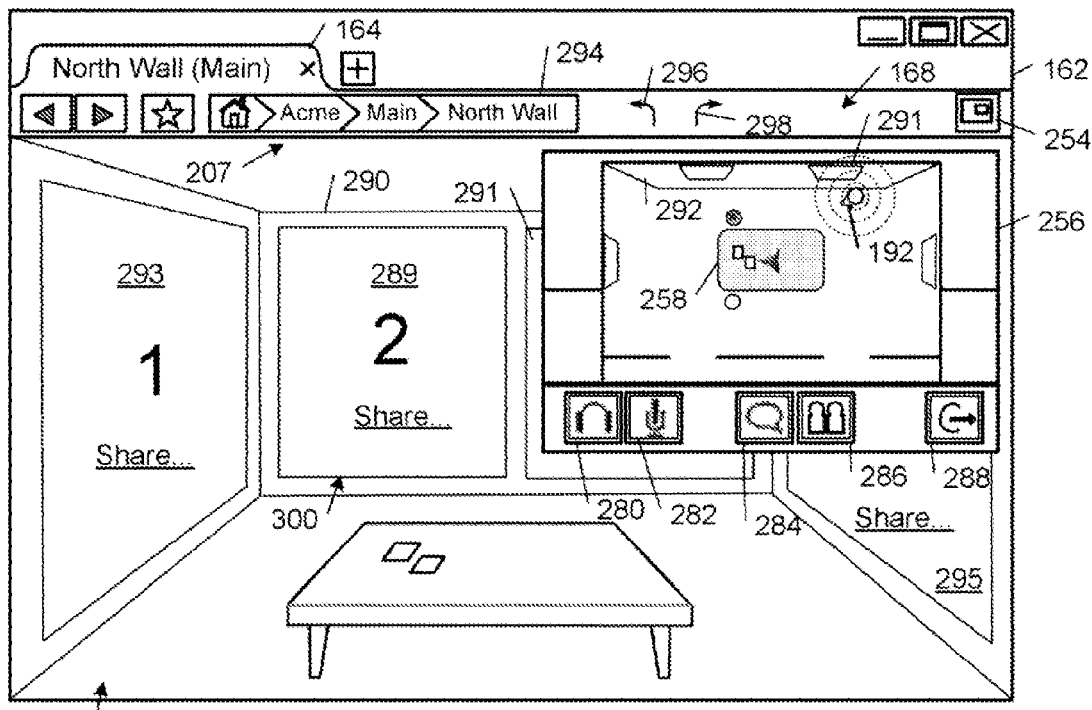
FIG. 25 is a diagrammatic view of an embodiment of a graphical user interface.

FIG. 25 shows a situation in which the user has double-clicked a wall object 290 in the view of the Main space 213 shown in FIG. 21.

In response to the user's command to execute the wall object 290, the seeker interface presents in the browsing area 166 of the tab 164 a 2.5-dimensional view of the contents of the wall object 290 and areas of the Main space 213 surrounding the wall object 290. In the embodiment shown in FIG. 25, the selected wall object 290 corresponds to a North Wall of the Main space 213. The North Wall contains a pair of view screen objects 289, 291 (labeled "2" and "3", respectively) that are presented on the North Wall object 290. The view screen objects 289, 291 can be used to present the contents of data files that are associated with the North Wall of the Main space 213. The 2.5-dimensional view also shows a West Wall object 293 and an East Wall object 295 that are located on the left and right sides of the North Wall object 290, respectively. Each of the West Wall object 293 and the East Wall object 295 includes a respective view screen object 293, 295 (labeled "1" and 4", respectively) that can be used to present the contents of respective data files.

The interface also shows in the minimap 256 a view of the Main space 213 and areas of the Acme space surrounding the Main space 213. The minimap 256 also shows a highlighted view 292 of the selected North Wall object 290 in the Main space 213.

The breadcrumb buttons 207 shown in the toolbar 168 of the tab 164 include a North Wall button 294 that corresponds to the current level in the hierarchical spatial model of the virtual area. The toolbar 168 includes a rotate left button 296 and a rotate right button 298 that allow the user to rotate the current view left and right by ninety degrees (90°) so that the user can view the contents of different walls of the Main space in the central viewing area of the 2.5-dimensional view of the Main space 213. The user also can double-click a different one of the walls that are shown in the minimap 256 in order to change the contents that are presented in the central viewing area of the 2.5-dimensional view of the Main space 213.

Figure 26:
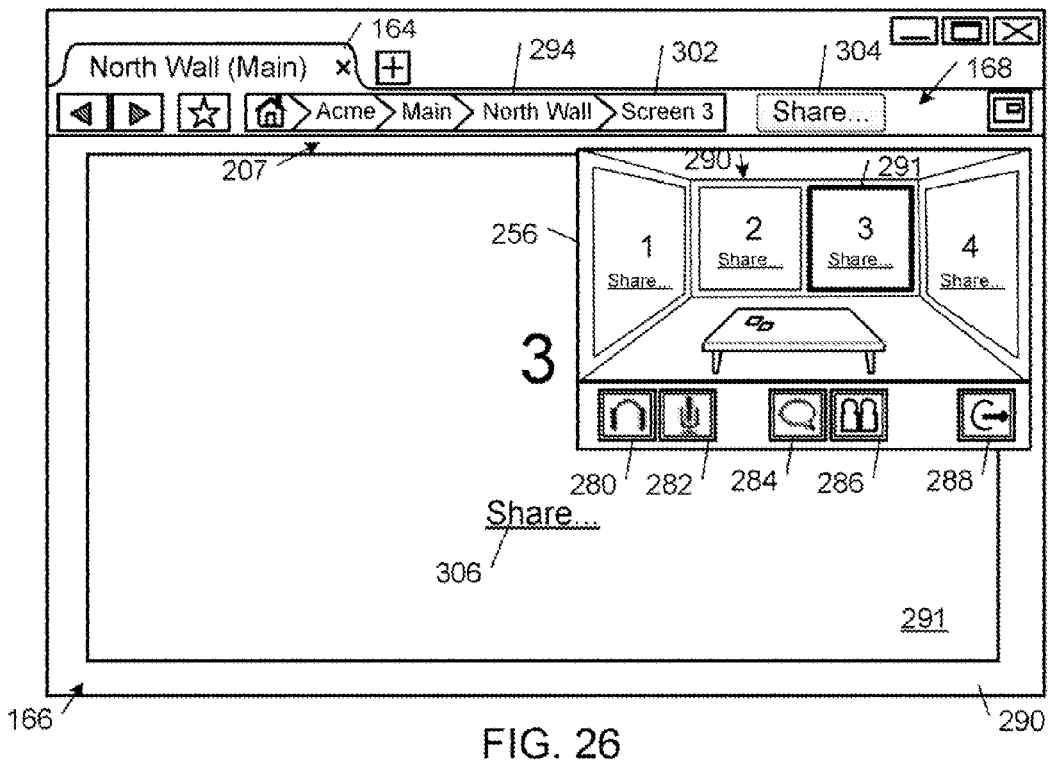
FIG. 26 is a diagrammatic view of an embodiment of a graphical user interface.
Figure 27:
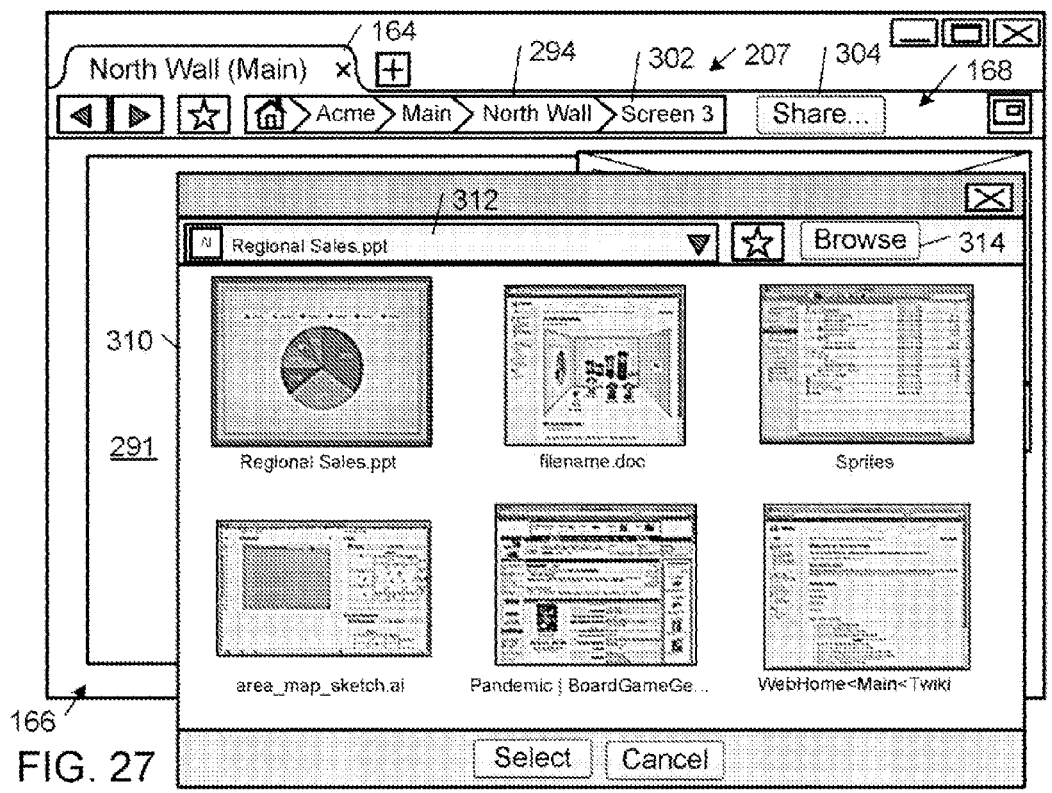
FIG. 27 is a diagrammatic view of an embodiment of a graphical user interface.

FIG. 26 shows the seeker interface after the user has selected the view screen object 291 (labeled "3") on the North Wall in the view of the Main space 213 shown in FIG. 25. The user may have executed the view screen object 291 either by double-clicking any part of the view screen object 291 shown in the central viewing area of the 2.5-dimensional view shown in the browsing area 166 of the tab 164 or by double-clicking the corresponding view screen object in the minimap 256 shown in FIG. 25. In response to the user double-clicking on the view screen object 291 shown in FIG. 25, the browsing area 166 of the tab 164 shows a zoomed-in view of the view screen object 291 and areas of the North Wall object 290 surrounding the view screen object 291, as shown in FIG. 26. The user may double-click on any of the areas of the North Wall object 290 surrounding the view screen object 291 in the browsing area 166 shown in FIG. 26 in order to return to the browsing area and minimap views of the Main space 213 that are shown in FIG. 25, in which the user's avatar 192 has moved from adjacent the table object 258 to a position adjacent the selected viewscreen object 291. In the embodiment shown in FIG. 26, the minimap 256 shows a 2.5-dimensional view of the contents of the wall object 290 along with areas of the Main space surrounding the wall object 290; this view corresponds to the preceding level in the hierarchical spatial model of the virtual area. The breadcrumb buttons 207 include a Screen 3 button 302 that corresponds to the current level in the hierarchical spatial model of the virtual area. The toolbar 168 includes a Share button 304 that allows a user to designate a shared data file whose contents will be presented on the view screen object 291 (i.e., Screen 3) and thereby allow all communicants in the Main space 213 to simultaneously share the data file. The view screen object 291 shown in the browsing area 166 includes a Share link 306 that also allows the user to designate the shared data file.

In response to a user selection of the Share button 304 or the Share link 306, the seeker interface opens a separate Select Source interface window 310 that allows the user to designate a data file whose contents will be shared on the view screen object 291. The Select Source interface includes a text box 312 for receiving a data file identifier (e.g., a local data file storage path name or a Uniform Resource Identifier (URI)) and a Browse button 314 that enables the user to browse different locations for the data file identifier. The data file identifier may be located on the client node 12 or another network node. The Select Source interface window 310 also includes a favorites button 316 that allows the user to browse a list of previously bookmarked files, applications, or URIs for the data file identifier.

Figure 28:
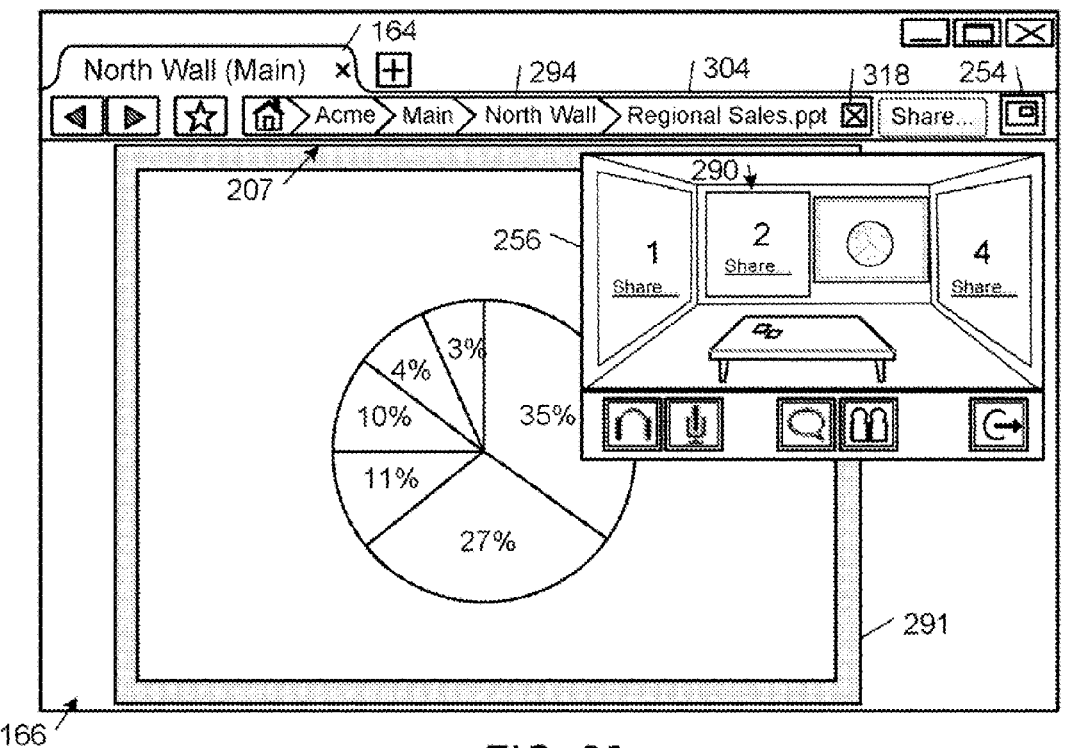
FIG. 28 is a diagrammatic view of an embodiment of a graphical user interface.

Referring to FIG. 28, after the user has selected a data file identifier in the Select Source interface, the contents of the selected data file are displayed on the view screen object 291 in both the browsing area 166 and the minimap 256. In the illustrated embodiment, the designated data file corresponds to a PowerPoint® data file that contains a slide of a pie chart. The user can terminate the presentation of the data file on the view screen object 291 by selecting the clear icon 318.

7. Multiple Presence

Users are able to concurrently have a respective presence in multiple locations in a virtual area. In this way, users can monitor and participate in the interactions occurring in multiple locations at the same time. In some embodiments, the user establishes a respective presence in each of multiple locations by inputting a copy presence command through the seeker interface. In some embodiments, the user inputs the copy presence command either by shift-clicking the target zone where the user intends to establish an additional presence or by shift-clicking a reference (e.g., a hyperlink) to the target zone (e.g., by shift-double-clicking a breadcrumb or placemark that is linked to the target zone). Note that the user can shift-double click an object or zone (since clicking would merely select it), whereas the user can merely shift-click a reference, since the reference can't be selected. In response to receipt of a copy presence command in connection with a user selection of one of the zones displayed on the monitor, the system depicts a respective graphical representation of the user in the selected zone while continuing to depict a respective graphical representation of the user in each of the zones where the user had presence before the selection of the zone. In some embodiments, each of the graphical representations of the user is depicted in a respective view that is presented in a separate window on the display. The windows may be associated with respective user-selectable tabs and, in response to a user selection of any of the tabs, the seeker interface displays only content of the window respectively associated with the selected tab in a common display area.

Figure 29:
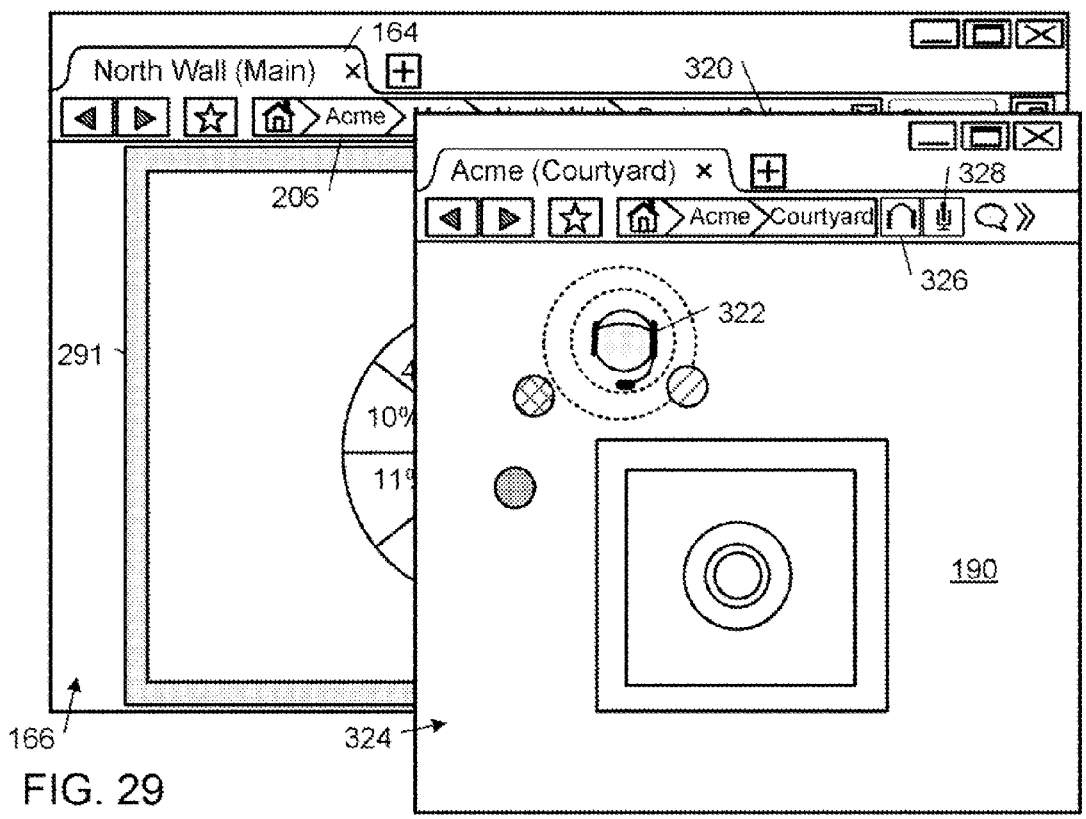
FIG. 29 is a diagrammatic view of an embodiment of a graphical user interface.

FIG. 29 shows the situation in which the user has shift-clicked a link to the Courtyard space 190 via the seeker interface window 162 shown in FIG. 28 (e.g., by using the placemarks navigation control). In response to the shift-click selection of the Courtyard space link, the platform creates a second seeker interface window 320 that is independent and discrete from the first seeker interface window 162. The second seeker interface window 320 is identical in all respects to the first seeker interface window 162, except that it shows a copy 322 of the user's sprite in the view of the Courtyard space 190 that is presented in the browsing area 324 of the second seeker interface window 320. The second seeker interface window 320 includes one or more tabs, each of which has a respective browsing area and a toolbar. The toolbar includes a back button, a forward button, a placemarks button, and a home button. The toolbar also includes a speakers button 326, which enable the user to independently control local (i.e., at the client node 12) sound rendering of audio associated with the Courtyard space 190, and a microphone button 328, which allows the user to turn-on and turn-off the microphone at the client node 12. In some embodiments, the platform allows the user to selectively transmit local microphone signals to only one of the zones in which the user has presence at a time.

Figure 30:
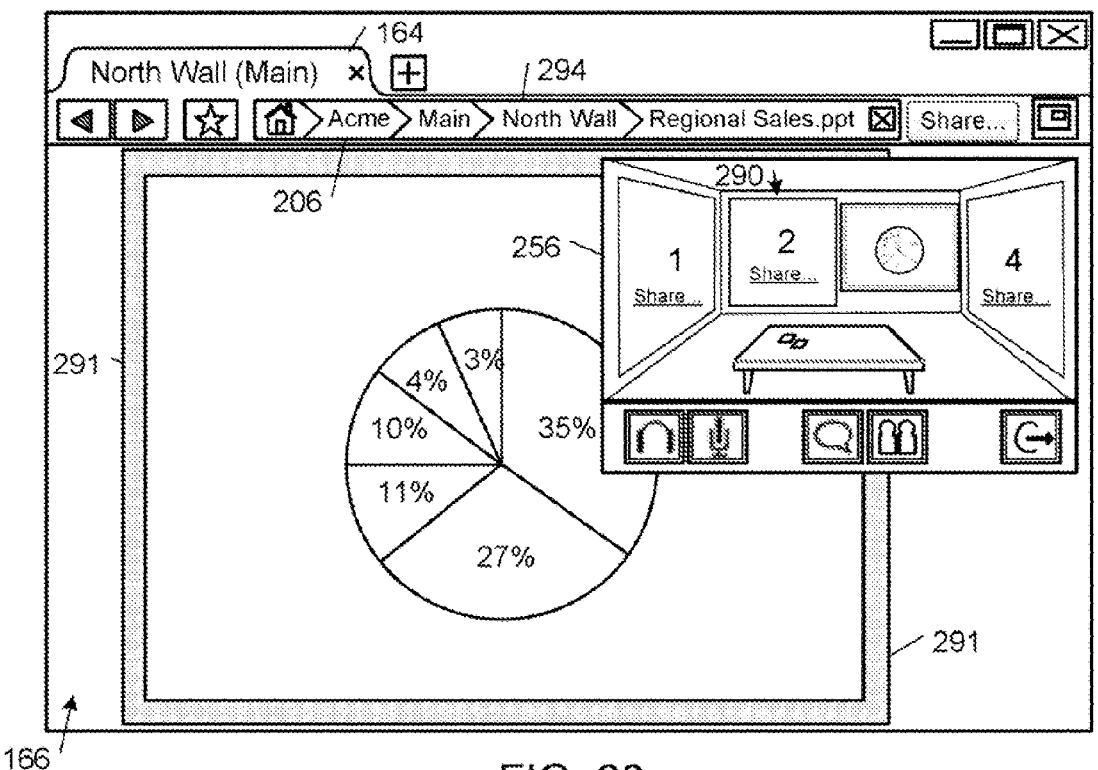
FIG. 30 is a diagrammatic view of an embodiment of a graphical user interface.
Figure 31:
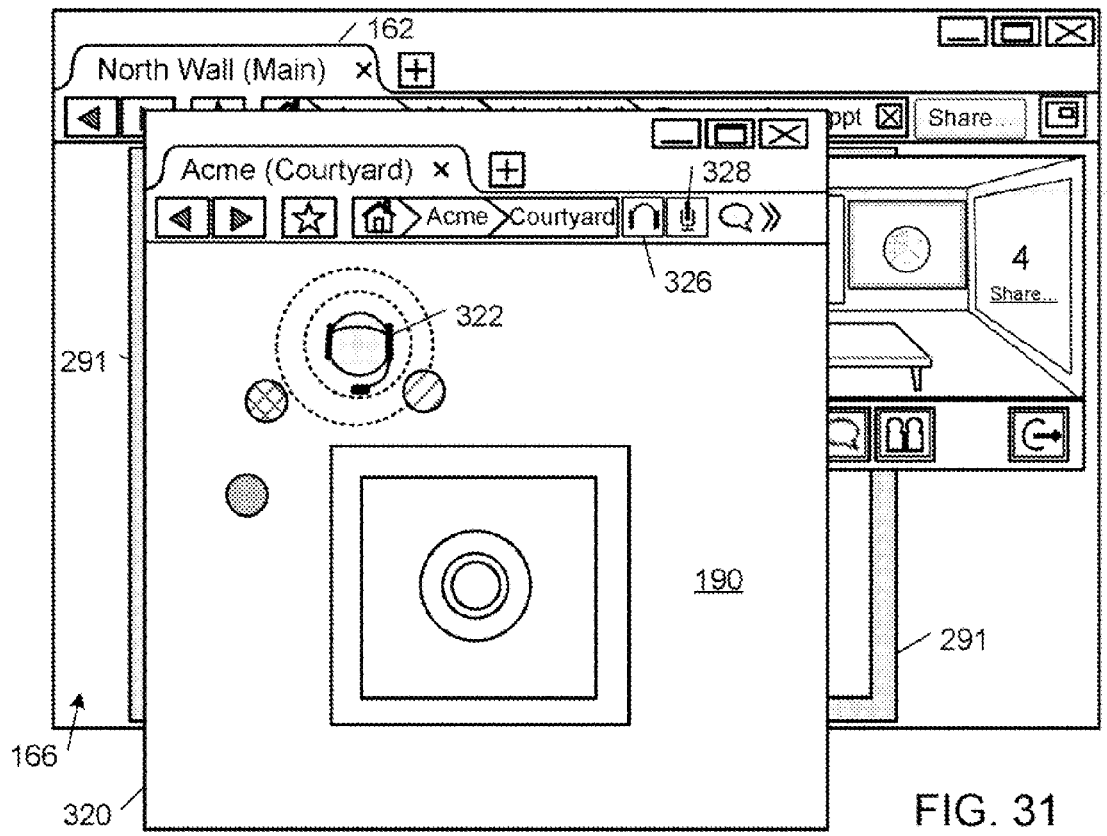
FIG. 31 is a diagrammatic view of an embodiment of a graphical user interface.

The user can manipulate the second seeker interface window 320 independently of the first seeker interface window 162. For example, the user can close the second seeker interface window 320 without affecting the first seeker interface window 162 as shown in FIG. 30. The user also can move the second seeker interface window 320 to a different location on the display relative to the first window 162 as shown in FIG. 31. Other window operations (e.g., resizing, tiling over or under other windows) also can be performed on the second seeker interface window 320.

8. Browsing Areas and Spaces

Figure 32:
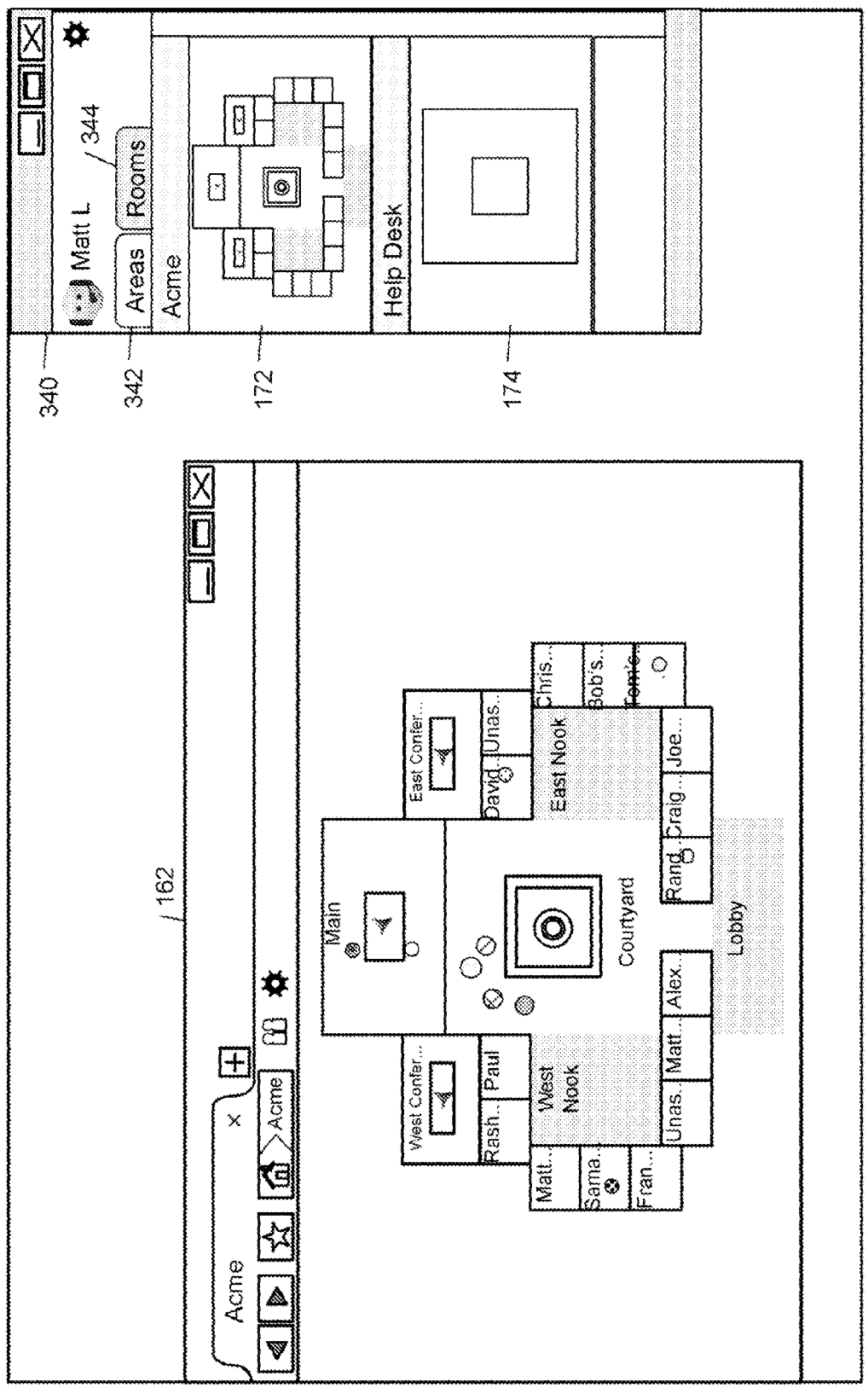
FIG. 32 is a diagrammatic view of an embodiment of a graphical user interface.
Figure 33:
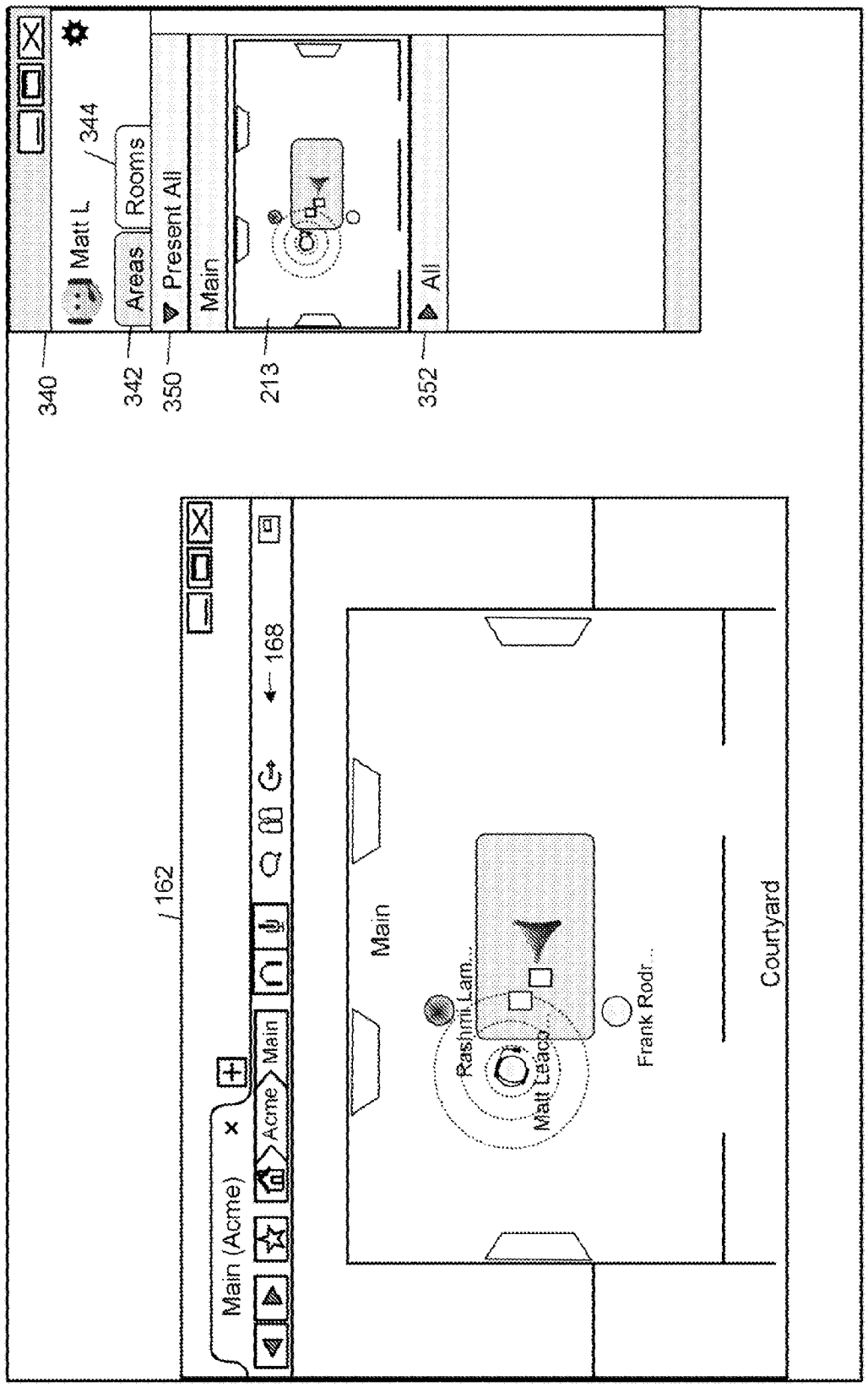
FIG. 33 is a diagrammatic view of an embodiment of a graphical user interface.

Referring to FIGS. 32 and 33, in addition to the seeker interface window 162, some embodiments allow the user to open a separate navigation interface window 340 that provides the user with additional tools for navigating the virtual environment. The navigation interface window 340 includes an Areas tab 342 and a Rooms tab 344.

As shown in FIG. 32, the Areas tab 342 shows a list of graphical representations of the virtual areas that are associated with the user (e.g., the Acme area 172 and the Sococo Help Desk 174). The virtual area list may be a static list or it may be generated dynamically based on the results of a query on the relationship database 36 for virtual areas that are associated with the user. In response to the user's selection of any of the graphical representations of the virtual areas shown in the Areas tab 342, the system automatically updates the view that is displayed in the seeker interface window 162, the user's presence state, and the user's network connections to reflect the user's entry into the selected area.

As shown in FIG. 33, the Rooms tab 344 shows a set of floating windows 350, 352 each of which is associated with a filtered list of the renderable zones of one or more of the virtual areas that are associated with the user. In the illustrated embodiment, the "Present At" window 350 is associated with a list of graphical representations of all the renderable zones in which the user has a respective presence, and the "All" window 352 is associated with a list of all of the renderable zones in each of the virtual areas in which the user has a respective presence. Additional filtered lists of spaces are possible. For example, in some embodiments, the Rooms tab 344 includes a floating window that is associated with a list of graphical representations of all the renderable zones of a virtual area that are active (i.e., that have at least one person in them). In some embodiments, the Rooms tab 344 includes a floating window that is associated with a list of graphical representations of all the renderable zones that the user has associated with a placemark (e.g., a zone corresponding to the user's office). In response to the user's selection of any of the graphical representations of the zones shown in the Rooms tab 344, the system automatically updates the view in the seeker interface window 162, the user's presence state, and the user's network connections to reflect the user's entry into the selected zone.

9. Notifications

Figure 34:
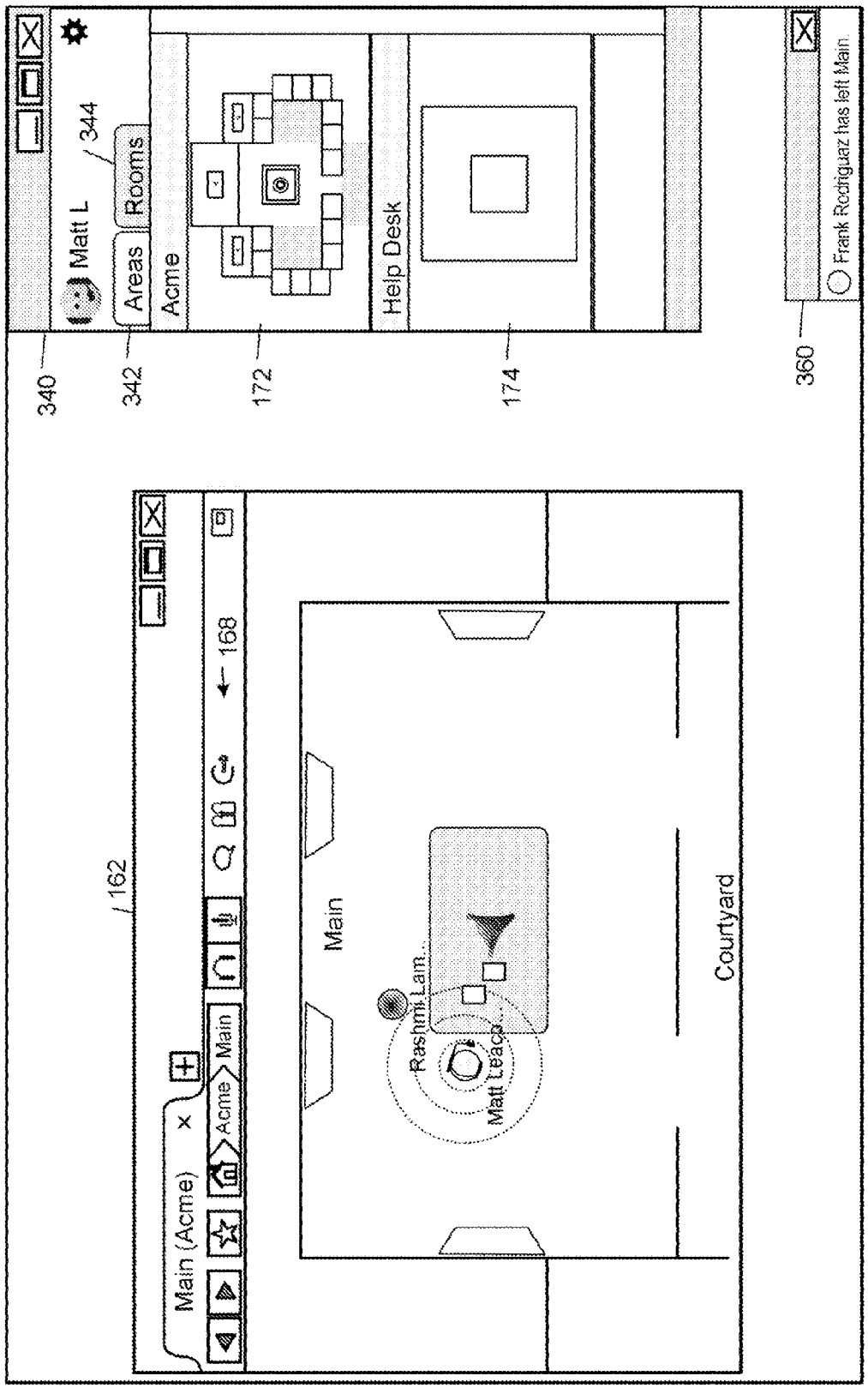
FIG. 34 is a diagrammatic view of an embodiment of a graphical user interface.
Figure 35:
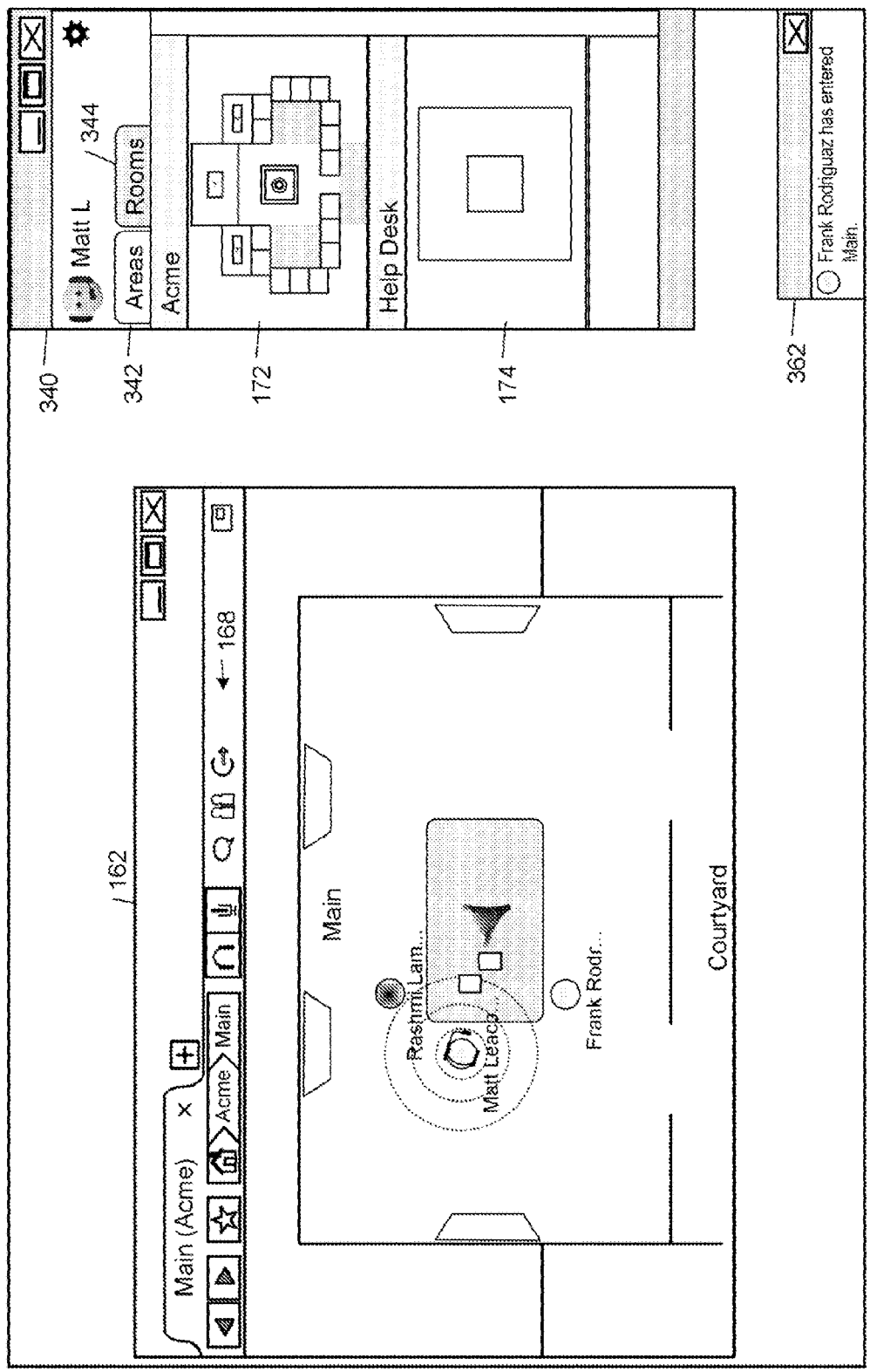
FIG. 35 is a diagrammatic view of an embodiment of a graphical user interface.
Figure 36:
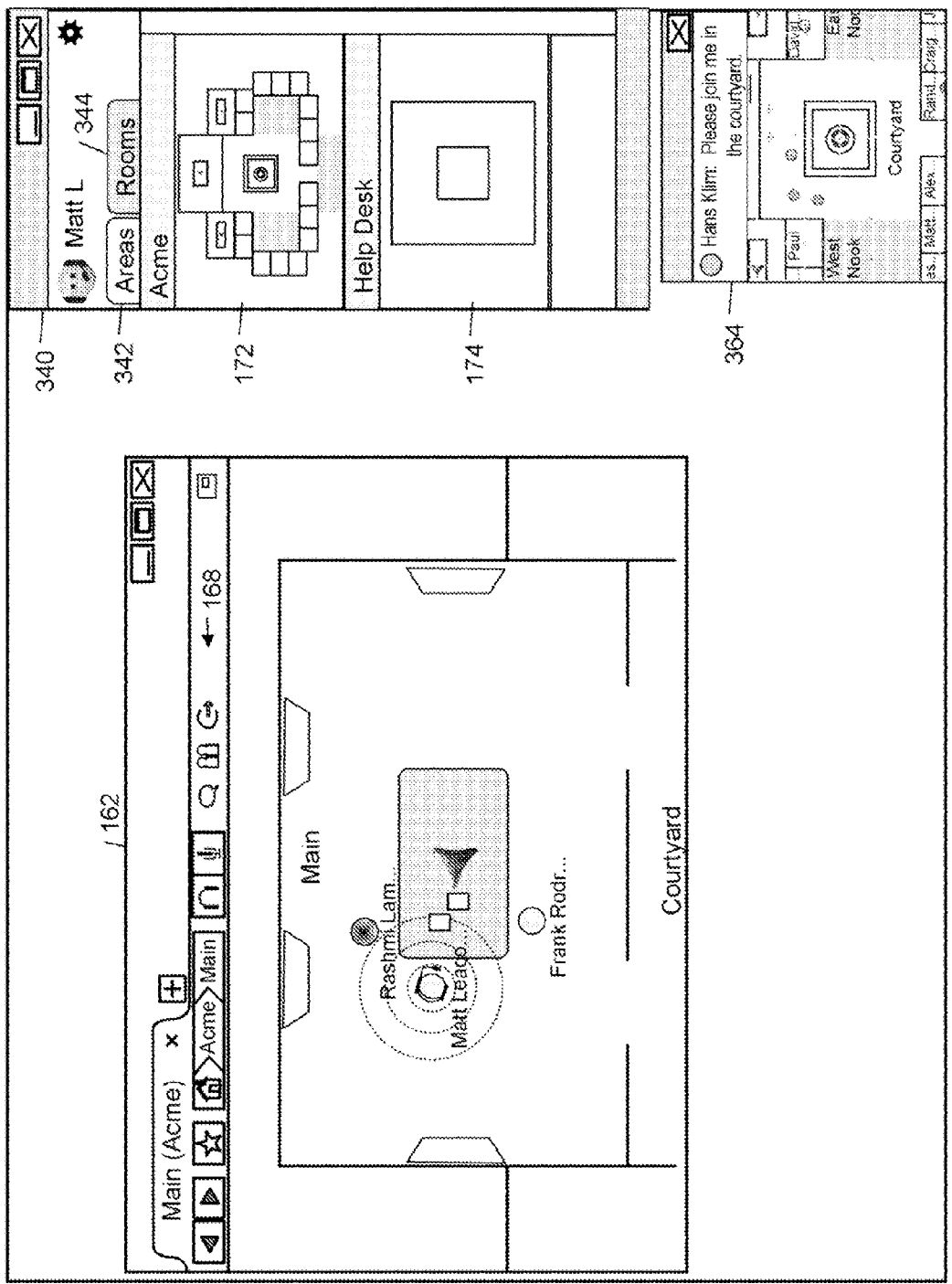
FIG. 36 is a diagrammatic view of an embodiment of a graphical user interface.

Referring to FIGS. 34, 35, and 36, some embodiments display various notifications of events occurring in the zones of one or more virtual areas. Each notification window typically describes a single event that is associated with a respective one of the zones (e.g., reception of a new chat message, reception of an invitation to join another communicant in a particular zone, and a change in a communicant's presence state in a zone). For example, FIG. 34 shows an embodiment in which a notification window 360 is displayed each time a communicant leaves a renderable zone in which the user has a respective presence (e.g., "Frank Rodriguez has left Main"). FIG. 35 shows an embodiment in which a notification window 362 is displayed each time a communicant enters a renderable zone in which the user has a respective presence (e.g., "Frank Rodriguez has entered Main"). FIG. 36 shows an embodiment in which a notification window 364 is displayed each time the user receives an invitation to join another communicant in a particular zone (e.g., a message from Hand Kim to "Please join me in the courtyard").

In some embodiments, the notification windows 360, 362 are implemented by so-called "toast" windows that dynamically pops up out of corner of the user's desktop.

In some embodiments, the notification window includes a hyperlink to the respective zone that is the subject of the notification. For example, in the embodiment shown in FIG. 36, the notification window 364 includes a minimap 366 that shows a graphical representation of the Courtyard space 190 that is associated with a hyperlink reference to the Courtyard space 190. In response to a user selection of the hyperlink, the platform moves the graphical representation of the user to the respective zone (e.g., the Courtyard space 190) from the zone (e.g., the Main space 213) where the user had presence before the selection and establishes a presence for the user in the respective zone (e.g., the Courtyard space 190).

V. Conclusion

The embodiments that are described herein provide improved systems and methods for navigating and interacting in spatial virtual communication environments. These embodiments provide an interface that includes navigation controls that enable a user to navigate virtual areas and interaction controls that enable the user to interact with other communicants in the virtual areas. The navigation controls allow the user to change his or her focus (e.g., the current view of the virtual area or the current zone or zones where the user has presence) using a variety of intuitive point-and-click browsing methods in the context of a hierarchical spatial model of a virtual area. In some embodiments, the interface adaptively presents navigation controls and interaction controls that are appropriate to the user's needs in the context of the user's current focus.

Other embodiments are within the scope of the claims.

The invention claimed is:

1. A method in a network communication environment comprising a network service implemented by at least one server network node and supporting realtime communications between a user and one or more other communicants who are operating respective network nodes and are present in a virtual area comprising a zone, the method comprising:

in a graphical user interface, displaying graphical representations of the virtual area, a first viewscreen object in the zone of the virtual area, a second viewscreen object in the zone of the virtual area, and avatars representing the user and one or more other communicants who are co-present with the user in the virtual area;

based on first input in connection with the first viewscreen object provided by a communicant who is present in the zone, simultaneously sharing renderings of contents of a first data file from the network node of the communicant who provided the first input with one or more other ones of the communicants who are present in the zone of the virtual area; and concurrently with the sharing of the renderings of the contents of the first data file, based on second input in connection with the second viewscreen object provided by a communicant who is present in the zone of the virtual area, simultaneously sharing renderings of contents of a second data file from the network node of the communicant who provided the second input with one or more other ones of the communicants who are present in the zone of the virtual area.

2. The method of claim 1, wherein the sharing of the renderings of contents of the first data file is initiated by input of the user in connection with the first viewscreen object, and the sharing of the renderings of contents of the second data file is initiated by input of the user in connection with the second viewscreen object.

3. The method of claim 2, wherein the renderings of contents of the first data file in connection with the first viewscreen object are viewable by ones of the communicants who are co-present with the user in the zone of the virtual area, and the renderings of contents of the second data file in connection with the second viewscreen object are viewable by ones of the other communicants who are co-present with the user in the zone of the virtual area.

4. The method of claim 1, wherein the sharing of the renderings of contents of the first data file is initiated by input of the user in connection with the first viewscreen object, and the sharing of the renderings of contents of the second data file is initiated by input of one of the other communicants who is co-present with the user in the zone of the virtual area in connection with the second viewscreen object.

5. The method of claim 4, wherein the renderings of contents of the first data file in connection with the first viewscreen object are viewable by ones of the communicants who are co-present with the user in the zone of the virtual area, and the renderings of contents of the second data file in connection with the second viewscreen object are viewable by the user and ones of the other communicants who are co-present with the user in the zone of the virtual area.

6. The method of claim 1, further comprising: based on the first input in connection with the first viewscreen object, depicting a visual indication that the communicant who provided the first input is sharing renderings of contents of the first data file.

7. The method of claim 6, further comprising: based on the second input in connection with the second viewscreen object, showing a visual indication that the communicant who provided the second input is sharing renderings of contents of the second data file.

8. The method of claim 7, wherein the depicting comprises showing an avatar of the communicant who provided the first input adjacent the graphical representation of the first viewscreen object in the graphical representation of the virtual area, and the showing comprises showing an avatar of the communicant who provided the second input adjacent the graphical representation of the second viewscreen object in the graphical representation of the virtual area.

9. The method of claim 1, wherein the virtual area comprises multiple zones, and each of the zones supports establishment of communication sessions between network nodes of communicants who are co-present in the zone.

10. The method of claim 9, wherein the displaying comprises displaying a spatial layout of respective ones of the zones in the graphical representation of the virtual area with the zones being demarcated by respective visual boundaries in the spatial layout.

11. The method of claim 10, wherein each of ones of the zones is associated with at least one respective viewscreen object, and each viewscreen object is represented by a graphical representation of a viewscreen and is associated with functionality for sharing renderings of contents of data files between the network nodes of communicants who are co-present present in the associated zone.

12. The method of claim 1, wherein:
the first input comprises user selection of the graphical representation of the first viewscreen object in the zone of the virtual area;
based on the user selection of the graphical representation of the first viewscreen object, displaying a sharing interface for selecting data to be shared with other communicants in the zone in connection with the first viewscreen object; and
based on user selection of the data to be shared in connection with the sharing interface, sharing the renderings of the contents of the first data file from the network node of the user with the network node of another one of the communicants who are present in the zone of the virtual area.

13. The method of claim 1, wherein the sharing of the renderings of contents of the first data file comprises sharing the renderings of contents of the first data file from the network node of the user with the network node of another one of the communicants who subscribed to the sharing based on respective input provided in connection with the first viewscreen object.

14. The method of claim 13, wherein the sharing of the renderings of contents of the second data file comprises: based on user input provided in connection with the first viewscreen object, receiving by the network node of the user the sharing of the renderings of contents of the second data file from the network node of the communicant who provided the second input.

15. The method of claim 14, wherein the sharing of the renderings of contents of the second data file comprises: by the network node of the user, displaying the shared renderings of the contents of the second data file received from the network node of the communicant who provided the second input.

16. The method of claim 1, wherein the sharing of the renderings of contents of the first data file comprises: based on user input provided in connection with the first viewscreen object, receiving by the network node of the user the sharing of the renderings of contents of the first data file from the network node of the communicant who provided the first input.

17. The method of claim 1, further comprising: by the network node of the user, displaying the shared renderings of the contents of the first data file in the graphical user interface, and displaying the shared renderings of the contents of the second data file in the graphical user interface.

18. The method of claim 17, further comprising: by the network node of the user, switching between the displaying of the shared renderings of the contents of the first data file and the displaying of the shared renderings of the contents of the second data file based on user input in connection with the first and second viewscreen objects.

19. A method in a network communication environment in which a user and one or more other communicants operating respective network nodes establish respective presences in virtual locations in which the communicants are represented by respective avatars, the method comprising:
displaying graphical representations of a virtual area, a first viewscreen object in the virtual area, a second viewscreen object in the virtual area, and the avatars of the user and one or more of the other communicants who are co-present with the user in the virtual area;
based on communicant input in connection with the first viewscreen object, simultaneously sharing renderings of contents of a first data file among ones of the communicants who are co-present in the virtual area;
based on communicant input in connection with the second viewscreen object, simultaneously sharing renderings of contents of a second data file among ones of the communicants who are co-present in the virtual area; and
based on the communicant input in connection with the first viewscreen object, depicting a visual indication that the respective communicant is sharing renderings of contents of the first data file, wherein the depicting comprises moving an avatar of the respective communicant to a position adjacent the graphical representation of the first viewscreen object in the graphical representation of the virtual area.

20. At least one non-transitory computer-readable medium having computer-readable program code embodied therein, the computer-readable program code adapted to be executed by a computer to perform operations in a network communication environment comprising a network service implemented by at least one server network node and supporting realtime communications between a user and one or more other communicants who are operating respective network nodes and are present in a virtual area comprising a zone, the operations comprising:
in a graphical user interface, displaying graphical representations of the virtual area, a first viewscreen object in the zone of the virtual area, a second viewscreen object in the zone of the virtual area, and avatars representing the user and one or more other communicants who are co-present with the user in the virtual area;
based on first input in connection with the first viewscreen object provided by a communicant who is present in the zone of the virtual area, simultaneously sharing renderings of contents of a first data file from the network node of the communicant who provided the first input with one or more other ones of the communicants who are present in the zone of the virtual area; and
concurrently with the sharing of the renderings of the contents of the first data file, based on second input in connection with the second viewscreen object provided by a communicant who is present in the zone of the virtual area, simultaneously sharing renderings of contents of a second data file from the network node of the communicant who provided the second input with one or more other ones of the communicants who are present in the zone of the virtual area.

* * * * *